United States Patent [19]
Hattori et al.

[11] Patent Number: 5,532,929
[45] Date of Patent: Jul. 2, 1996

[54] APPARATUS FOR CONTROLLING VEHICLE DRIVING POWER

[75] Inventors: Tatsuya Hattori; Makoto Nishida, both of Susono; Masuji Oshima, Kariya; Hiroyuki Yoshida, Inazawa, all of Japan

[73] Assignee: Toyota Jidosha Kabushiki Kaisha, Toyota, Japan

[21] Appl. No.: 167,601

[22] Filed: Dec. 14, 1993

[30] Foreign Application Priority Data

| | | | |
|---|---|---|---|
| Dec. 16, 1992 | [JP] | Japan | 4-336323 |
| Feb. 26, 1993 | [JP] | Japan | 5-037772 |
| Feb. 26, 1993 | [JP] | Japan | 5-037773 |
| Feb. 26, 1993 | [JP] | Japan | 5-037774 |
| Feb. 26, 1993 | [JP] | Japan | 5-037775 |
| Feb. 26, 1993 | [JP] | Japan. | 5-037776 |
| Feb. 26, 1993 | [JP] | Japan | 5-037777 |
| Feb. 26, 1993 | [JP] | Japan | 5-037778 |
| Feb. 26, 1993 | [JP] | Japan | 5-037779 |
| Feb. 26, 1993 | [JP] | Japan | 5-037780 |
| Feb. 26, 1993 | [JP] | Japan | 5-037781 |
| Feb. 26, 1993 | [JP] | Japan | 5-037786 |
| Jul. 30, 1993 | [JP] | Japan | 5-190562 |

[51] Int. Cl.[6] ............................ F02D 41/04
[52] U.S. Cl. ............... 364/431.07; 395/905; 123/361
[58] Field of Search ............ 364/426.01, 431.04, 364/431.07, 431.01, 426.04; 395/905; 123/352, 361

[56] References Cited

U.S. PATENT DOCUMENTS

| | | | |
|---|---|---|---|
| 4,671,235 | 6/1987 | Hosaka | 123/352 |
| 4,727,838 | 3/1988 | Osbiage et al. | 123/361 |
| 4,984,545 | 1/1991 | Kaneyasu et al. | 123/399 |
| 5,133,021 | 7/1992 | Carpenter et al. | 382/15 |
| 5,200,898 | 4/1993 | Yuhara et al. | 364/431.05 |
| 5,285,523 | 2/1994 | Takahashi | 395/22 |
| 5,361,213 | 11/1994 | Fujieda et al. | 364/431.08 |
| 5,410,477 | 4/1995 | Ishii et al. | 364/424.01 |

FOREIGN PATENT DOCUMENTS

| | | |
|---|---|---|
| 1-294925 | 11/1989 | Japan . |
| 3-156601 | 7/1991 | Japan . |
| 3-235723 | 10/1991 | Japan . |
| 4-314940 | 11/1992 | Japan . |

*Primary Examiner*—Michael Zanelli
*Attorney, Agent, or Firm*—Kenyon & Kenyon

[57] ABSTRACT

An engine controller includes a accelerator stroke detector, vehicle speed and vehicle acceleration sensors, first and second model learning units and a drive control unit. The first model learning unit constructs a vehicle acceleration model that exhibits and updates vehicle acceleration characteristics as required by a driver. The first unit includes a first learning program for updating acceleration model, and generates a first output (Gx) in response to the detected accelerator stroke and vehicle speed according to the first program. The first unit calculates a deviation (ΔG) between the detected vehicle acceleration (G) and the first output (Gx), and modifies the first output (Gx) to decrease the deviation (ΔG) to provide an updated acceleration model as required by the driver. The second model learning unit is for constructing a sensitivity model used to regulate the opening angle of an engine throttle valve. The second unit includes a second learning program for updating the sensitivity model and generating a second output (Thx) in response to the detected accelerator stroke and vehicle speed. As a consequence, the output (Thx) is modified to decrease the deviation (ΔG) which provides for an update to the sensitivity model. The drive control unit controls the throttle angle referring to a target value determined on the basis of the second output (Thx).

52 Claims, 49 Drawing Sheets

[For learning acceleration model]

[For learning throttle sensitivity model]

[For learning throttle sensitivity model]

APPARATUS FOR CONTROLLING VEHICLE DRIVING POWER

BACKGROUND OF THE INVENTION

1. Field of the Invention

The present invention relates generally to a vehicle driving power controller which controls power output of a vehicle so that acceleration of the vehicle approaches the acceleration requested by a driver.

2. Description of the Related Art

Generally, a vehicle equipped with an engine and wheels is required to operate under a variety of running conditions (e.g., various road surface and weather conditions) including those imposed on the vehicle by the driver. The quickness and smoothness of the vehicle's response to changing control input is highly desired. Conventional technology controls vehicular driving power based on the magnitude or stroke of urged accelerator pedal manipulated in part by the driver.

Japanese Unexamined Patent Publication No. 1-294925 discloses a driving power controller which estimates a target acceleration based upon the magnitude of the urged accelerator pedal (i.e., accelerator opening angle) manipulated by the driver. The controller computes a difference or deviation between the estimated target acceleration and actual acceleration. The controller also adjusts an opening degree (i.e., degree of angle) of an engine throttle valve by reference to a data map correlating the computed deviation and estimated target acceleration. Therefore, the actual vehicle acceleration is controlled to approach the target acceleration.

However, any uniform estimate for a target acceleration is set in the data map using only the correlation between the accelerator angle and vehicle speed. Thus, any particular preset target acceleration referenced in the data map may not always match the acceleration or driving power desired by an individual driver according to his or her own driving habit, be it slow, fast or any combination of the two.

Japanese Unexamined Patent Publication No. 4-314940 discloses a technology which solves the above-described drawbacks, improves efficiency of memory usage in the controller and speeds up the computation of target acceleration. According to this technology, an opening angle of a linkless type throttle valve is controlled according to the magnitude of the urged accelerator pedal (i.e., accelerator stroke) manipulated by the driver. A backup RAM in the controller stores data in two dimensional map style for determining the target acceleration in response to the accelerator stroke. Accordingly, the controller controls the opening angle of the throttle valve so that the actual vehicular acceleration approaches the target acceleration determined by reference to the data map, thereby controlling the vehicle driving power.

With conventional technology, the change in the accelerator stroke relative to the actual vehicular acceleration is presumed by the controller to be requested by the driver from sensed changes in the degree of acceleration. The controller corrects data to be stored in the data map so as to minimize the deviation between the requested acceleration by the driver and the target acceleration determined through the data map. The controller re-stores the corrected data in a backup RAM. Data in the data map is revised by correcting the target acceleration relative to the above-described deviation. In other words, the controller receives target acceleration data in response to changes in the accelerator stroke. Since target acceleration data is automatically updated to account for the changes in the magnitude of acceleration required by the driver, the controller calculates a target acceleration corresponding to a particular driver's needs or characteristics.

However, even in this conventional technology, target acceleration data is only corrected or modified and old map data is simply replaced with corrected data to update the target acceleration data. That is, when target acceleration data is to be updated in the data map, it is done so only within the confines of a certain narrow accelerator stroke range for a particular time. For example, when the vehicle is cruising at a constant speed, the controller updates only the target acceleration data corresponding to the accelerator stroke which currently fits the constant cruising speed. Likewise, when the vehicle undergoes sudden acceleration, the target acceleration data is updated by the controller only according to the specific region of the accelerator's stroke range.

According to the above-described manner by which data is updated in the data map, only that portion of the target data corresponding to the limited accelerator stroke region is correctly updated. This results in only a partially updated data map with part of the map containing updated data and part containing old data. Put differently, even if the certain regions of the data map contain updated target acceleration data, because those regions are updated only with respect to a specific accelerator stroke range, other regions of the data map contain target data that remains outdated or uncorrected. Consequently, discontinuities in target acceleration data may form in the data map with respect to a particular range of the accelerator's stroke. Unfortunately, when vehicular drive power is controlled by means of a data map having such discontinuous data, the vehicle is often unresponsive, or at least, insufficiently responsive to the changing acceleration needs of the driver and specifically to the changes in the stroke of the accelerator.

SUMMARY OF THE INVENTION

Accordingly, it is a primary objective of the present invention to provide an improved vehicle driving power control apparatus responsive to changes in the stroke of the vehicle's accelerator irrespective of an individual's driving habits or changes in road conditions. The improved control apparatus enables the data used for the feedback control of vehicle driving power to be continuous throughout the entire region of the acceleration stroke.

To achieve the foregoing and other objects and in accordance with the purpose of the present invention, an improved apparatus is provided for controlling the driving power of a vehicle.

The vehicle includes an engine or motor mounted thereon, a power adjuster such as a throttle valve for gasoline engine system, and a power manipulator such as an accelerator with a pedal. The power adjuster is for regulating power output from the engine given any particular level of engine power, depending on a control parameter set for the power adjuster. The power manipulator is in turn manipulated by the vehicle's driver to regulate the engine's power output.

The improved control apparatus comprises a manipulation detector, speed detector, acceleration detector, first and second model learning units and drive control unit.

The manipulation detector detects the amount of driver manipulated power and outputs a signal indicative of the detected manipulation amount. The speed detector is mounted on the vehicle and detects the speed of the vehicle to output a signal indicative of the detected vehicle speed. The acceleration detector is mounted on the vehicle and detects the acceleration of the vehicle to output a signal indicative of the detected vehicle acceleration.

The first model learning unit constructs a vehicle acceleration model by processing vehicle acceleration data in response to the driver's changing acceleration needs. The first unit determines the relationship among three factors: the manipulated power amount determined by the power manipulator, the vehicle's speed and the vehicle's acceleration. The first unit includes a first program that updates the unit's generated acceleration model. The first unit then generates a first output (Gx) in response to the detected power manipulation value and the detected speed of the vehicle. The first unit calculates a deviation ($\Delta G$) from among the detected vehicle acceleration (G) transmitted from the acceleration detector, the acceleration (G) being selected as reference data, and the first output (Gx). The first unit further normalizes the first output (Gx) to decreaae the deviation ($\Delta G$), and thus provides an update to the acceleration model.

The second model learning unit constructs a sensitivity model used to regulate the power adjuster's control parameter. The second model determines the relation among the manipulation amount of the power manipulator, the vehicle speed and the control parameter. A second learning program is provided in the second unit for updating the sensitivity model and generating a second output (Thx) in response to the detected manipulation amount and detected vehicle speed. The second unit then normalizes the second output (Thx) to decrease the deviation ($\Delta G$) calculated by the first model learning unit, and thereby updates the sensitivity model.

The drive control unit controls the power adjuster which in turn controls the vehicle's driving power. The drive control unit determines and adjusts the control parameter by reference to a target control parameter determined from the second output (Thx) transmitted from the second model learning unit.

It is preferred according to the present invention that each of the first and second learning programs incorporate neural network technology. Each program in the first and second model learning units utilizes at least one weighting coefficient as variable data for use in neural net so as to decrease the calculated deviation ($\Delta G$).

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

FIG. 1 is a schematic diagram showing the structure of the driving power control apparatus of a vehicle;

FIG. 2 is a block diagram showing the electrical configuration of a neuro computer and a throttle computer;

FIG. 3 is a structural diagram showing the conceptual configuration of a multi-layer neural network adapted to a neuro computer for learning an acceleration model;

FIG. 4 is a structural diagram showing the conceptual configuration of a multi-layer neural network adapted to a neuro computer to learn a throttle sensitivity model;

FIG. 5 is a characteristic diagram showing the characteristic of an "acceleration model";

FIG. 6 is a characteristic diagram showing the characteristic of a "throttle sensitivity model";

FIG. 7 is a characteristic diagram showing the characteristic of "throttle sensitivity";

FIG. 8 is a flowchart illustrating a "learning control routine", which is executed by the neuro computer;

FIG. 9 is a flowchart illustrating a "throttle angle control routine", which is executed by the throttle computer;

FIG. 10 is a time chart showing a change in an acceleration signal when a low-pass filter is not used in the neuro computer of the first embodiment; and FIG. 11 is a time chart showing a change in an acceleration signal when a low-pass filter is used in the neuro computer of the first embodiment.

FIG. 12 is a schematic diagram showing the structure of the driving power control apparatus of a vehicle;

FIG. 13 is a conceptual structural diagram of a map used by a model learning computer at the time of learning an acceleration model;

FIG. 14 is a conceptual structural diagram of a map used by the model learning computer at the time of learning a throttle sensitivity model; and FIG. 15 is a convenient map used in explaining the conceptual structures of the individual maps in FIGS. 13 and 14.

FIG. 16 is a schematic diagram showing the structure of the driving power control apparatus of a vehicle;

FIG. 17 is a block diagram showing the electrical configuration of a throttle computer and a neuro computer;

FIG. 18 is a flowchart illustrating a "learning control routine", which is executed by the neuro computer;

FIG. 19 is a characteristic diagram showing a map used in converging the throttle sensitivity to a reference value;

FIG. 20 is a time chart showing a change in throttle sensitivity and a change in the number of adjustments of the throttle sensitivity when throttle sensitivity converges to a particular reference value; and FIG. 21 is a time chart showing a change in throttle sensitivity.

FIG. 22 is a flowchart illustrating a "learning control routine", which is executed by a neuro computer;

FIG. 23 is a flowchart illustrating a "throttle angle control routine", which is executed by a throttle computer; and FIG. 24 is a time chart showing a change in throttle sensitivity, etc. when a vehicle changes it's driving state from an initial accelerating speed to a constant cruising speed.

FIG. 25 is a schematic diagram showing the configuration of the driving power control apparatus of a vehicle;

FIG. 26 is a block diagram showing the electrical configuration of a throttle computer and a neuro computer;

FIG. 27 is a flowchart illustrating a "learning control routine", which is executed by the neuro computer;

FIG. 28 is a detailed flowchart illustrating a part of the "learning control routine" in FIG. 27;

FIG. 29 is a flowchart illustrating a "throttle angle control routine" executed by the throttle computer; and FIG. 30 is a time chart showing a change in throttle sensitivity, etc. when a vehicle changes it's driving state from an initial starting acceleration to a cruising speed.

FIG. 31 is a schematic diagram showing the configuration of the driving power control apparatus of a vehicle;

FIG. 32 is a block diagram showing the electrical configuration of a throttle computer and a neuro computer;

FIG. 33 is a flowchart illustrating a "learning control routine", which is executed by the neuro computer;

FIG. 34 is a flowchart illustrating the continuation of the "learning control routine", in FIG. 33, which is executed by the neuro computer;

FIG. 35 is a flowchart illustrating a "throttle angle control routine" which is executed by the throttle computer; and FIG. 36 is a time chart showing a change in throttle sensitivity, etc. from when a vehicle accelerates in the forward direction to when a vehicle accelerates in the reverse direction.

FIG. 37 is a flowchart illustrating a "learning control routine", which is executed by a neuro computer; and FIG. 38 is a time chart showing a change in throttle sensitivity.

FIG. 39 is a schematic diagram showing the configuration of the driving power control apparatus of a vehicle;

FIG. 40 is a block diagram showing the electrical configuration of a throttle computer and a neuro computer;

FIG. 41 is a flowchart illustrating a "learning control routine", which is executed by the neuro computer;

FIG. 42 is a time chart showing the correlation between an initial throttle sensitivity and a final throttle sensitivity, in light of a flag and reset switch operation; and FIG. 43 is a flowchart illustrating a "throttle angle control routine", which is executed by the throttle computer.

FIG. 44 is a flowchart illustrating a "learning control routine", which is executed by a neuro computer; and FIG. 45 is a time chart showing a change in an actual acceleration stroke while a vehicle is running.

FIG. 46 is a structural diagram showing the conceptual configuration of a multi-layer neural network adapted to a neuro computer to learn a throttle sensitivity model;

FIG. 47 is a flowchart illustrating a "learning control routine", which is executed by the neuro computer;

FIG. 48 is a characteristic diagram showing the relationship between the correction coefficient and throttle sensitivity;

FIG. 49 is a time chart showing a change in throttle sensitivity; and

FIG. 50 is another time chart showing a change in throttle sensitivity.

FIG. 51 is a structural diagram showing the conceptual configuration of a multi-layer neural network adapted to a neuro computer to learn a throttle sensitivity model;

FIG. 52 is a characteristic diagram showing the characteristic of a "throttle sensitivity model";

FIG. 53 is a characteristic diagram showing the characteristic of "throttle sensitivity";

FIG. 54 is a flowchart illustrating a "learning control routine", which is executed by the neuro computer;

FIG. 55 is a time chart showing a change in throttle sensitivity; and

FIG. 56 is yet another time chart showing a change in throttle sensitivity.

FIG. 57 is a structural diagram showing the conceptual configuration of a multi-layer neural network adapted to a neuro computer to learn a throttle sensitivity model;

FIG. 58 is a flowchart illustrating a "learning control routine", which is executed by the neuro computer;

FIG. 59 is a time chart showing a change in throttle sensitivity; and

FIG. 60 is a time chart showing a change in throttle sensitivity.

FIG. 61 is a flowchart illustrating a "learning control routine", which ms executed by a neuro computer; and FIG. 62 is a time chart showing a change in throttle sensitivity.

DETAILED DESCRIPTION OF THE PREFERRED EMBODIMENTS

The first to thirteenth embodiments of the present invention will be described below referring to the accompanying drawings.

First Embodiment

A first embodiment of this invention will now be described with reference to FIGS. 1 through 11.

Figure 1:
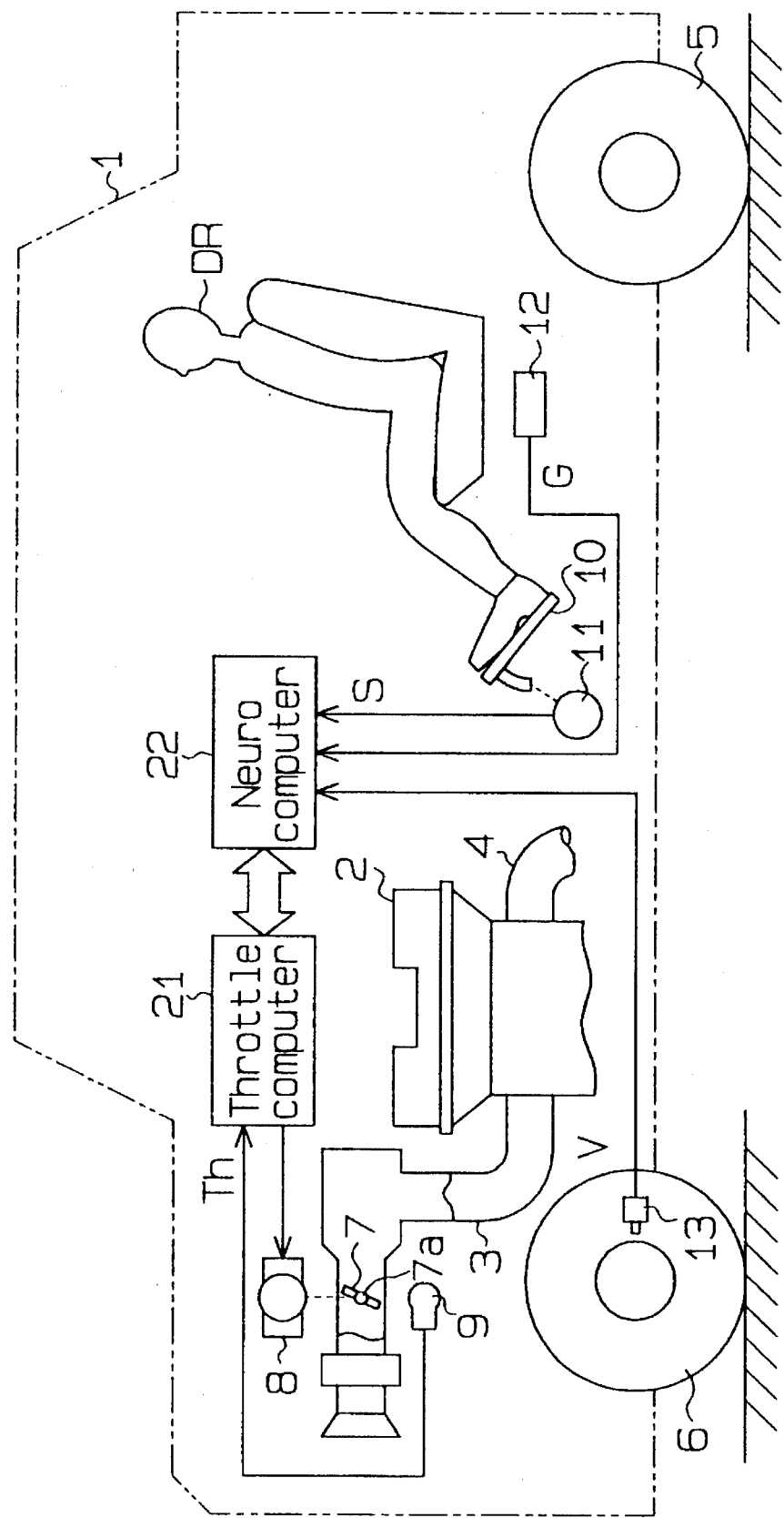
FIGS. 1 through 11 illustrate a first embodiment of the present invention.

As shown in FIG. 1, a gasoline engine 2 is mounted at the front portion of a vehicle 1. The engine 2 has a plurality of in-line cylinders. A fuel mixture consisting of air and fuel is fed via an air intake passage 3 in a combustion chamber to each cylinder in the engine 2, and then is ignited and burnt by an ignition plug to move the piston, crankshaft, etc. This action provides the output of the engine 2. The gas generated by the combustion moves out of the cylinder through an exhaust passage 4.

The crankshaft of the engine 2 is drivably coupled to a pair of rear wheels 5 through a transmission, a propeller shaft, a differential gear, a drive shaft, etc. A pair of front wheels 6 are interlocked with the manipulation of a steering wheel provided at the driver's seat.

A throttle valve 7 is supported pivotable midway along the air intake passage 3 by a pivot 7a. This pivot 7a is coupled to a DC motor 8, provided in the vicinity of the throttle valve 7. As the DC motor 8 is driven, the throttle valve 7 rotates integrally with the pivot 7a. Through this rotation, the angle of the throttle valve 7 (throttle angle Th)

is adjusted. This angle adjustment regulates the amount of air received by each combustion chamber of the engine from the air intake passage 3, and also controls the output of the engine 2.

A throttle sensor is positioned in the proximity of the throttle valve 7 to detect the throttle angle Th. An accelerator pedal 10 is provided at the driver's seat in the vehicle 1. This accelerator pedal 10 is manipulated by a driver DR to control the output of the engine 2 as needed. Provided in the vicinity of the accelerator pedal 10 is an accelerator pedal sensor 11 for detecting the acceleration stroke S or the amount of the manipulation.

An acceleration sensor 12 is included near the center of the vehicle to detect the forward or backward acceleration G of the vehicle 1. The front wheel 6 is provided with a vehicle speed sensor 13 for detecting the vehicle speed v of the vehicle 1 in accordance with the number of rotations of the front wheels 6.

A throttle computer 21 and a neuro computer 22 are used to properly control the opening/closing of the throttle valve 7 in response to the request made by the driver DR. The computer 21 is connected to the DC motor 8 and the throttle sensor 9. The design of computer 22 is structured using the neural network technology. Connected to the computer 22 are the accelerator pedal sensor 11, the acceleration sensor 12 and the vehicle speed sensor 13. Both computers 21 and 22 are mutually connected.

Figure 2:
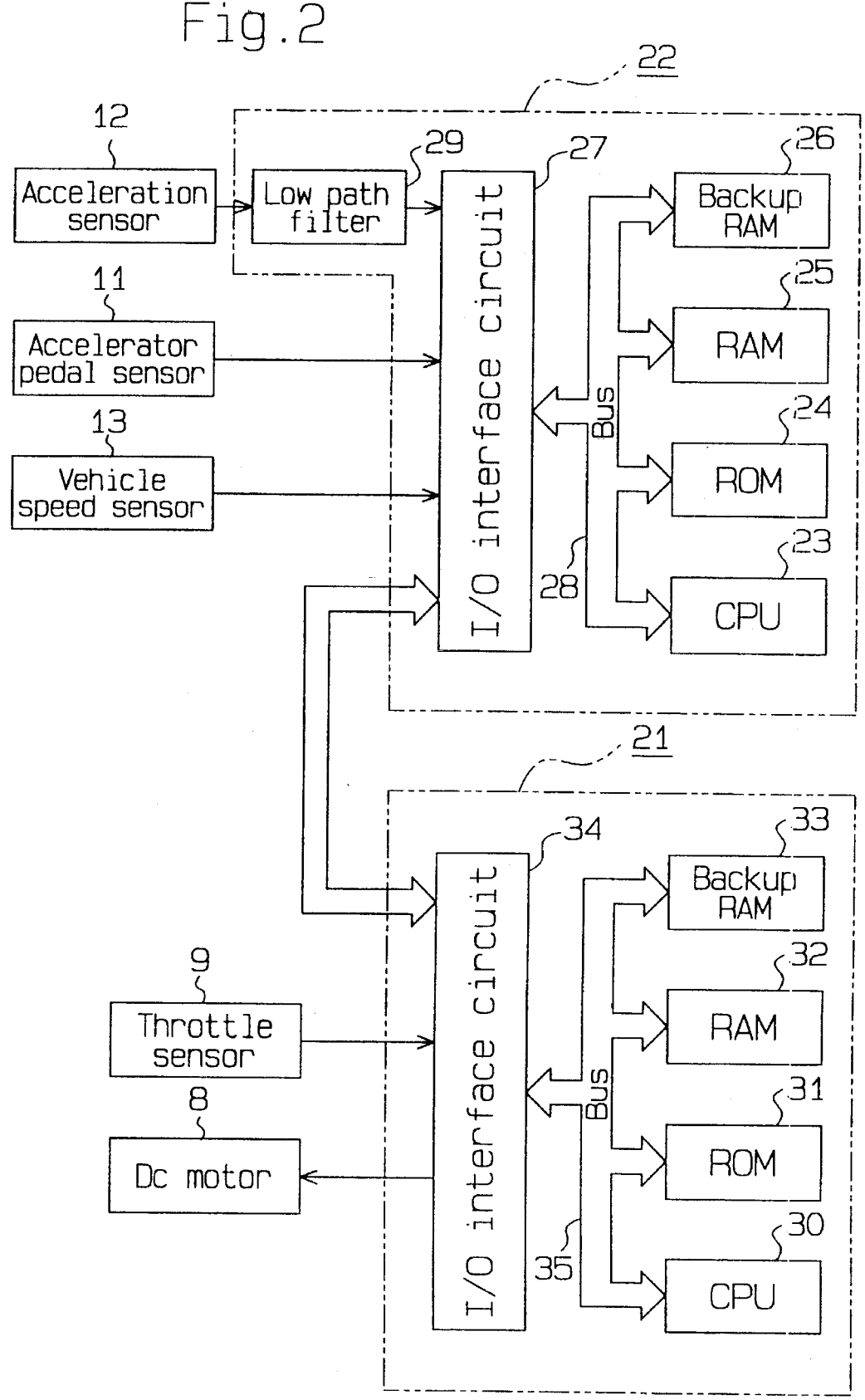

As shown in FIG. 2, the computer 22 includes a central processing unit (CPU) 23, a read only memory (ROM) 24, a random access memory (RAM) 25, a backup RAM 26 and an input/output (I/O) interface circuit 27. Those units are mutually connected by a bus 28. The ROM 24 holds in advance a learning control program based on the neural network technology and initial data. The CPU 23 executes various kinds of operations in accordance with the learning control program and initial data. The CPU 23 also has a counter function. The RAM 25 temporarily stores the results of the operations executed by the CPU 23. The backup RAM 26 is backed up by a battery to hold various types of data in the RAM 25 even after power supply to the computer 22 is stopped.

The accelerator pedal sensor 11 and the vehicle speed sensor 13 are connected to the I/O interface circuit 27. The acceleration sensor 12 is also connected to the I/O interface via a low-pass filter 29. The filter 29 freely passes that component of the detection signal provided by the acceleration sensor 12, which has a lower frequency than a predetermined cutoff reference frequency, and greatly attenuates a high frequency. The computer 21 is connected to the I/O interface circuit 27.

The CPU 23 receives, as input values, various signals from the individual sensors 11 to 13 via the I/O interface circuit 27. Based on the input values, the CPU 23 executes learning control of an "acceleration model" in response to changes in vehicle acceleration occasioned by the driver DR, in accordance with the aforementioned learning control program. The CPU 23 also executes learning control of a "throttle sensitivity model" according to this "acceleration model." The CPU 23 sends out the learning results to the computer 21 via the I/O interface circuit 27.

The configuration of the computer 21 is basically the same as that of the computer 22. The computer 21 comprises a CPU 30, a ROM 31, a RAM 32, a backup RAM 33, an I/O interface circuit 34 and a bus 35. The DC motor 8, the throttle sensor 9 and the computer 22 are connected to the I/O interface circuit 34. A throttle angle control program is stored in advance in the ROM 31. This program controls the opening/closing of the throttle valve 7 based on the learning result of the computer 22 or values that are separately set therein.

The CPU 30 receives, as input values, data of the learning results coming from the computer 22 via the I/O interface circuit 34. The CPU 30 receives, as an input value, a signal sent from the throttle sensor 9 via the I/O interface circuit 34. Based on those input values, the CPU 30 properly controls the DC motor 8 in accordance with the aforementioned throttle angle control program.

The conceptual structure of the neural network technology adapted to the computer 22 will be discussed below.

Figure 3:
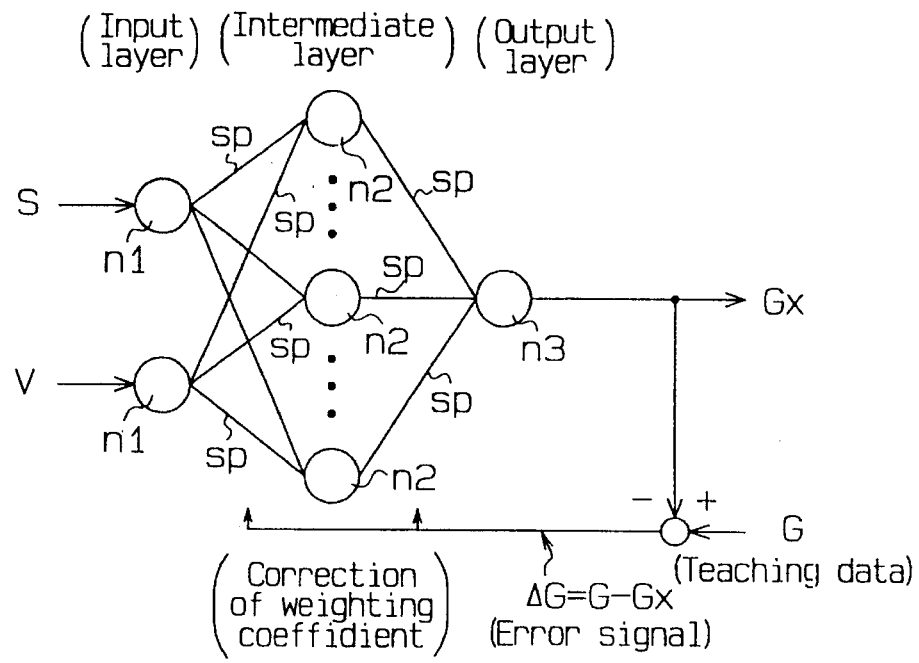
Figure 4:
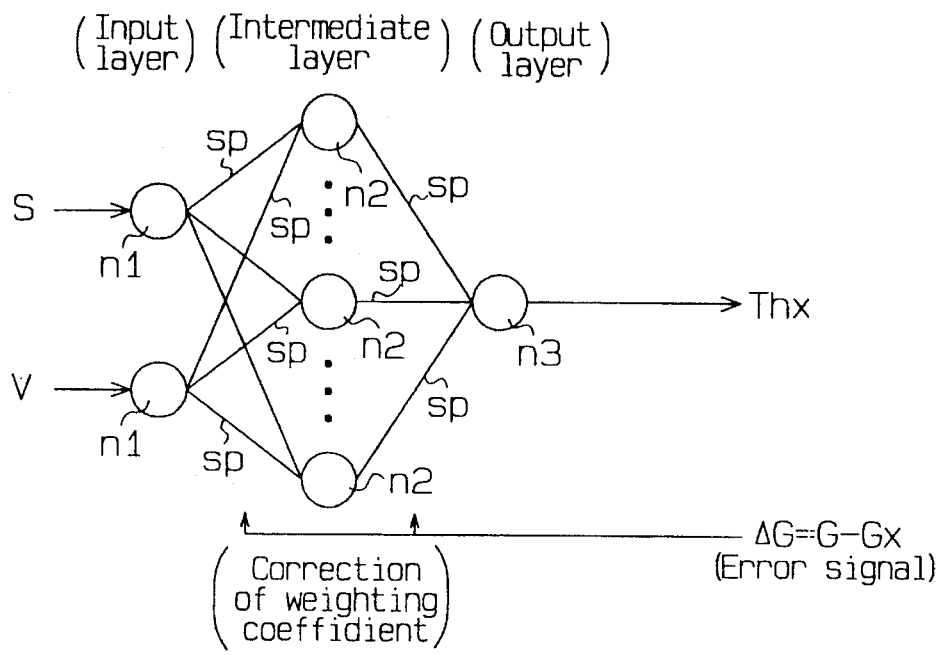

The network technology in the first embodiment includes two multi-layer neural networks as shown in FIGS. 3 and 4. The two networks have substantially the same structure; each network includes an "input layer" having two neurons n1, an "intermediate layer" having two to ten neurons n2, and an "output layer" having a single neuron n3. The individual neurons n1, n2 and n3 in the individual layers coupled together by synapses sp. In each network, signals flow in one direction from the "input layer" to the "intermediate layer", and from the "intermediate layer" to the "output layer". At each of the neurons n1, n2 and n3 of the individual layers, the neuron state is determined on the basis of the signal received from the preceding layer, and the signal is sent to the next layer. The output result of each network is the state value of the neuron n3 of the "output layer".

The network shown in FIG. 3 is for learning the acceleration model. In this network, the acceleration stroke S detected by the accelerator pedal sensor 11 is input to one of the neurons n1 of the "input layer". The vehicle speed V, detected by the vehicle speed sensor 13, is input to the other neuron n1. The output result of the network, or the state value of the neuron n3 of the "output layer", is an acceleration model output Gx.

In this network, the "weighting coefficients" of the synapses sp are corrected based on the acceleration model output Gx. In making the correction, the acceleration G of the vehicle detected by the acceleration sensor 12 is used as "teaching data" and the acceleration model output Gx is compared with the "teaching data". In other words, the vehicle's particular acceleration occasioned by the driver DR is represented by the actual acceleration G of the vehicle 1, and this acceleration G is used as "teaching data" that is to be compared with the acceleration model output Gx. An acceleration deviation ΔG (=G−Gx), obtained by the comparison of the acceleration model output Gx with the acceleration G, is treated as an "error signal". The "weighting coefficients" of all the synapses sp are corrected to make the error portion of this "error signal" smaller.

Figure 5:
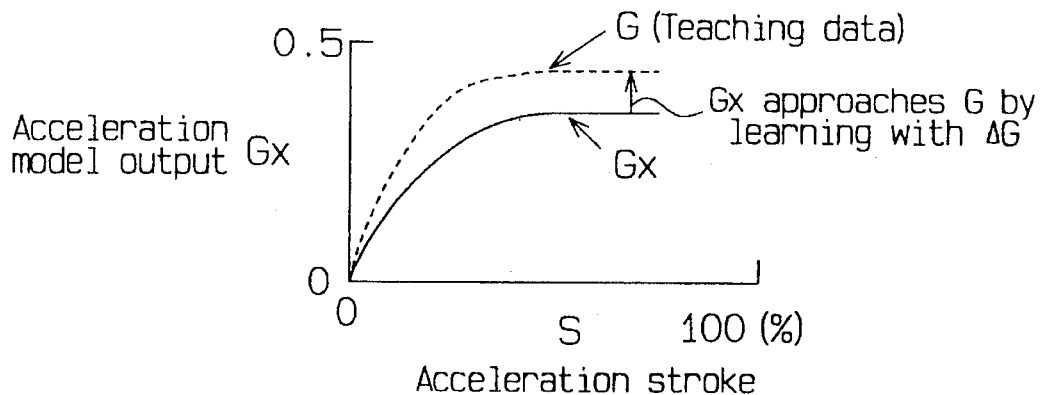

Neuro computer 22 learns the relationship among the acceleration stroke S, the vehicle speed V and the acceleration G as the "acceleration model" when driver DR occasions changes to the vehicle's acceleration and when deviation in the "teaching data" become smaller. That is, the "acceleration model" is learned as illustrated in FIG. 5 when the acceleration model output Gx approaches the acceleration G.

The network shown in FIG. 4 is for learning the throttle sensitivity model. In this network, the acceleration stroke S is input to one of the neurons n1 of the "input layer" and the vehicle speed V is input to the other neuron n1. The output result of the network, or the state value of the neuron n3 of the "output layer", is a throttle sensitivity model output Thx.

In this network, the deviation (acceleration deviation ΔG) between the acceleration G and the acceleration model output Gx is an "error signal". The "weighting coefficients" of all the synapses sp are corrected so as to make the error portion of this "error signal" smaller. In other words, the relationship among the acceleration stroke S, the vehicle speed V and the throttle angle Th is learned as the "throttle sensitivity model" according to throttle changes occasioned by the driver DR. This sensitivity model is designed to make the error portion of the "error signal" smaller. That is, the "throttle sensitivity model" is learned as the characteristic shown in FIG. 6.

Figure 7:
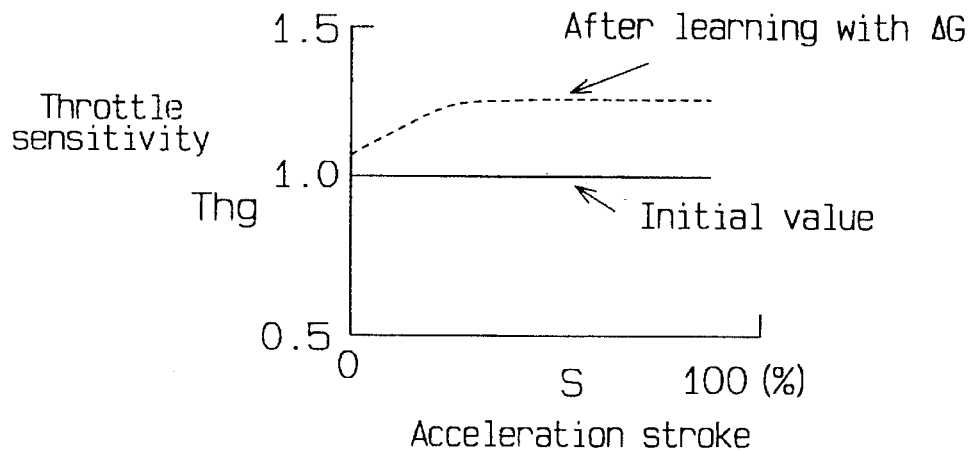

The above-described conceptual structure of the neural network is merely given for the sake of convenience. The core of the network lies in the learning control program, which is stored in advance in the ROM 24 of the computer 22. The network is realized by mathematical operations in the learning control program. A typical "error feedback learning algorithm" is applied to the learning control program. In the first embodiment, the learning control program is prepared to finally obtain the relationship between the acceleration stroke S and the throttle sensitivity Thg as shown in FIG. 7.

Figure 8:
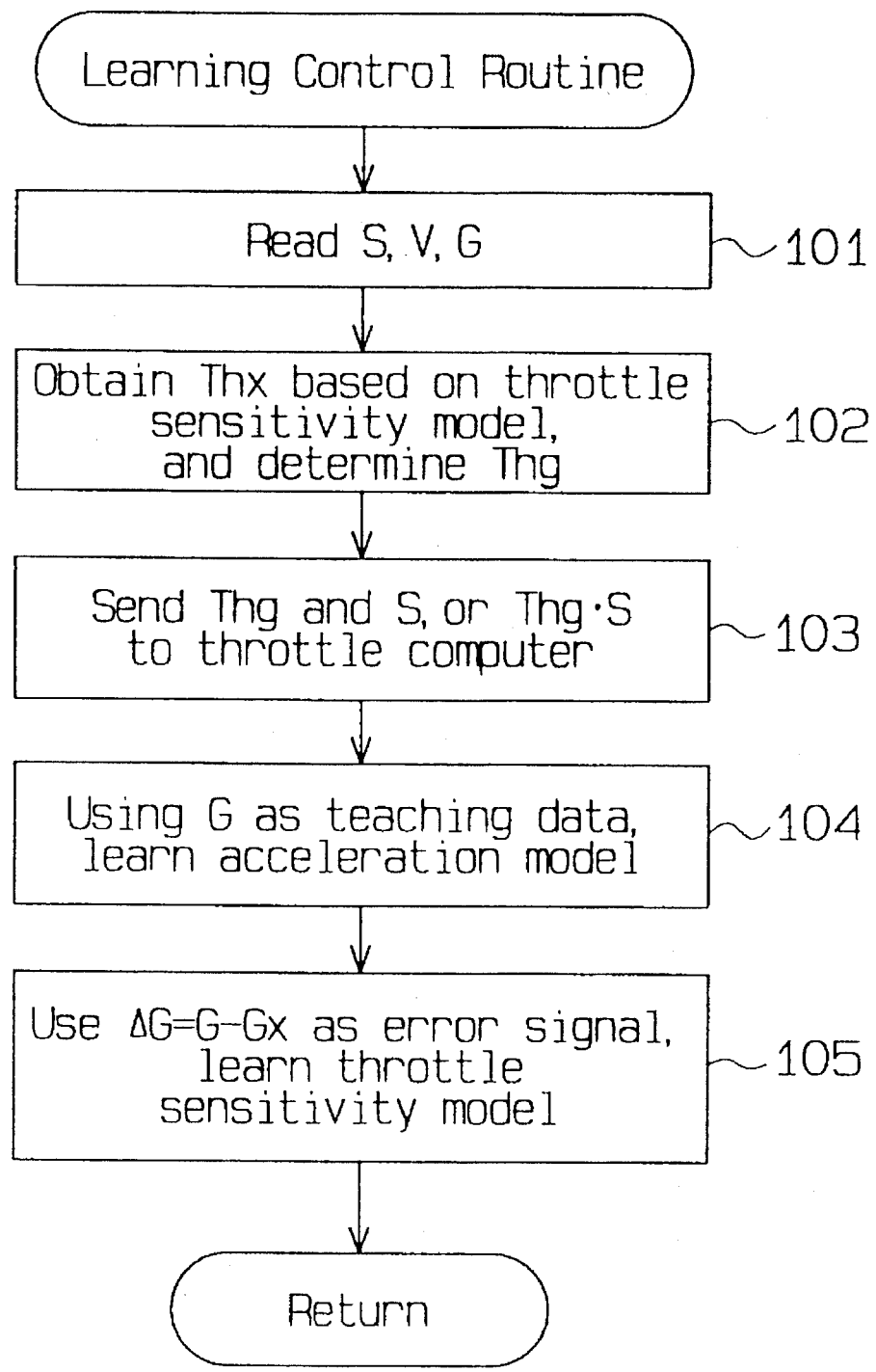

A description will now be given of operations for learning the "acceleration model", the "throttle sensitivity model" and other models that are executed by the computer 22. FIG. 8 shows a flowchart illustrating the "learning control routine" in the learning control program, which is run by the computer 22. This routine is executed repeatedly at a given period, for example, "0.1 sec", once the routine starts.

When "0.1 sec" passes from the initialization of the previous "learning control routine" cycle, the computer 22 reads the acceleration stroke S, acceleration G and vehicle speed V based on various signals from the accelerator pedal sensor 11, acceleration sensor 12 and vehicle speed sensor 13 in step 101.

In the next step 102, the computer 22 executes the learning of the "throttle sensitivity model" to obtain the throttle sensitivity model output Thx and determines the throttle sensitivity Thg based on that value Thx. More specifically, the computer 22 acquires the throttle sensitivity model output Thx from the characteristic (see FIG. 6) of the already learned "throttle sensitivity model" based on the acceleration stroke S and vehicle speed V as input values, and determines the throttle sensitivity Thg by the following equation (1).

$$Thg = \alpha 1 + Thx * K \quad (1)$$

where $\alpha 1$ is a reference value that is set to "1.0" in the first embodiment and K is a positive constant.

The computer 22 sends the throttle sensitivity Thg and acceleration stroke S to the computer 21 in step 103. Alternatively, the computer 22 multiplies the throttle sensitivity Thg by the acceleration stroke S to obtain a target throttle angle Thg.S and sends the value to the computer 21.

Next, the computer 22 learns the "acceleration model" from changes in the vehicle's acceleration occasioned by the driver DR in step 104. More specifically, the computer 22 sets the acceleration G of the vehicle 1, detected by the acceleration sensor 12, as "teaching data". In addition, the computer 22 learns the relationship among the acceleration stroke S, the vehicle speed V and the acceleration G as the "acceleration model", occasioned by the driver's DR continued alteration of the vehicle's acceleration and compares it against the previously learned "teaching data". Computer 22 can thereby learn by reducing the number of inherent deviations among the data comprising the "teaching data".

Suppose that the curve indicated by the solid line in FIG. 5 is the characteristic of the current "acceleration model". Also suppose that the driver DR pushes the accelerator pedal 10 down to run the vehicle 1 faster and the acceleration G of the vehicle 1 becomes greater than the current acceleration model output Gx. The acceleration G at this time is the newly occasioned acceleration, and the current characteristic indicated by the solid line in FIG. 5 is altered to a new characteristic indicated by the broken line. That is, the whole relationship among the acceleration stroke S, the vehicle speed V and the acceleration model output Gx is learned as a continuous model. This characteristic will not be partially discontinuous.

When the vehicle speed V is "0", as shown in FIG. 5, the relationship among the entire range of the acceleration stroke S, the entire range of the vehicle speed V and the acceleration G of the vehicle 1 is learned from the "acceleration model".

The computer 22 then obtains the deviation (acceleration deviation ΔG) between the acceleration G and the acceleration model output Gx, and learns the "throttle sensitivity model" using that value as an "error signal" in step 105. In other words, the computer 22 learns the relationship among the acceleration stroke S, the vehicle speed V and the throttle angle Th as the "throttle sensitivity model" in such a way as to reduce the error portion of the error signal".

Figure 6:
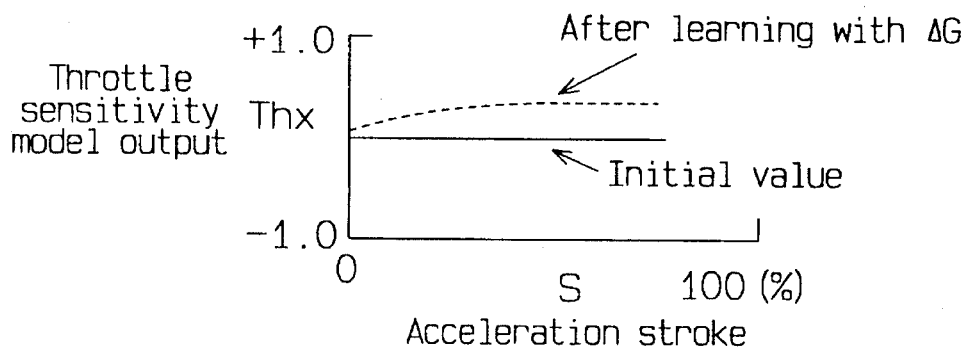

Suppose that the straight line indicated by the solid line in FIG. 6 is the initial value of the "throttle sensitivity model" When the driver DR pushes the accelerator pedal 10 down to run the vehicle 1 faster, the acceleration G of the vehicle 1 increases, generating a deviation between this acceleration G and the acceleration model output Gx. This deviation (acceleration deviation ΔG) is used as the "error signal" and the throttle sensitivity model is so learned as to cause a reduction in the error portion of signal ΔG. As a result of this learning process by computer 21, the "throttle sensitivity model" is altered to the curve indicated by the broken line from the initial value indicated by the solid line in FIG. 6. That is, the whole relationship among the acceleration stroke S, the vehicle speed V and the throttle sensitivity model output Thx is learned as a continuous model. This characteristic will not be partially discontinuous.

After executing the process of step 105, the computer 22 temporarily terminates the subsequent process. When "0.1 sec" passes after the current "learning control routine" has started, the computer 22 executes the processes of steps 101 to 105 again.

Learning control using the neural network technology is carried out in this manner, which is to say that computer 22 learns the "acceleration model" produced as a result of changes in vehicular acceleration occasioned by the driver DR as well as through the "throttle sensitivity model". Accordingly, the "weighting coefficients" of synapses sp stored in the backup RAM 26 will be rewritten continuously as computer 22 continues to learn.

The initial values of the "weighting coefficients" at the time of factory shipment of the vehicle 1 are determined as follows. With regard to the acceleration model, the vehicle 1 is driven by a plurality of drivers DR. The accelerations G obtained then are learned as "teaching data" and the averaged characteristics of the learned results become an initial value. The "weighting coefficients" for the throttle sensitivity model are so learned as to make the throttle sensitivity model output Thx "O".

Figure 9:
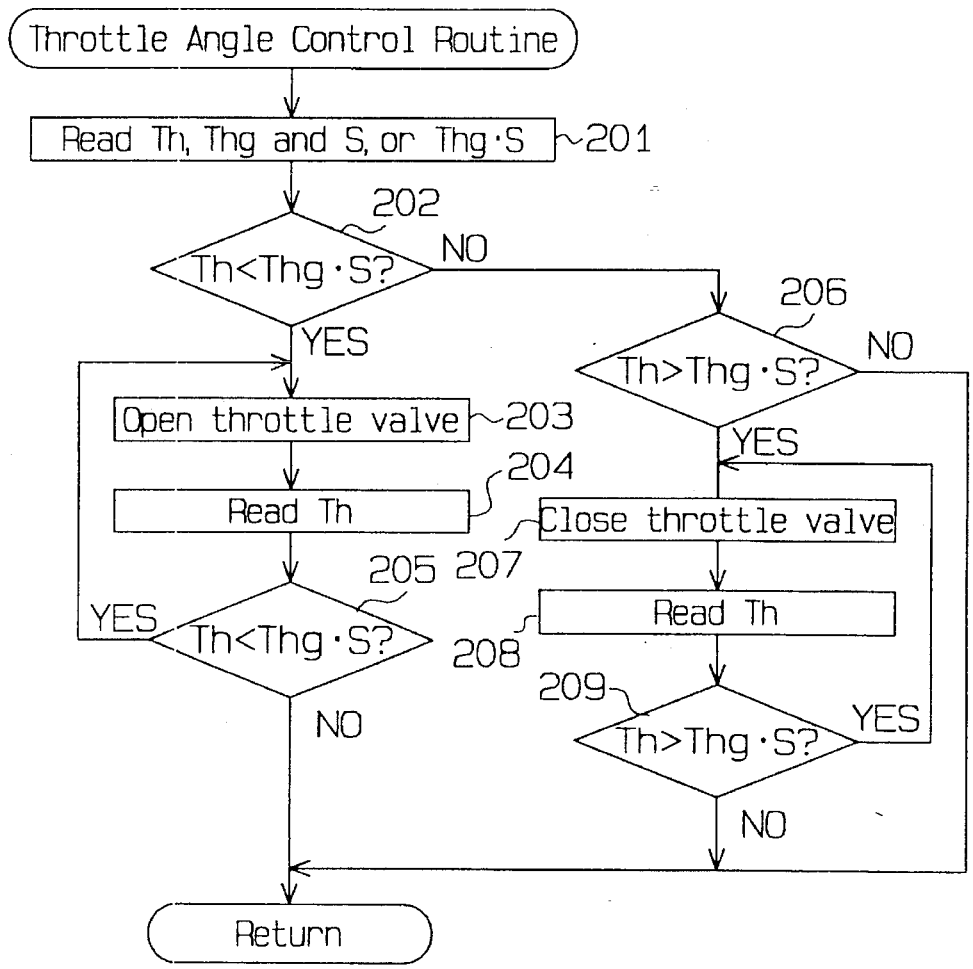

A description will now be given of the operations for the throttle angle control executed by the computer 21, based on the throttle sensitivity Thg as determined from both the above-described "learning control routine" and the acceleration stroke S. FIG. 9 shows a flowchart illustrating the "throttle angle control routine" in the throttle angle control program, which is run by the computer 21. This routine is executed repeatedly at a given time interval.

After the elapse of a predetermined time following the initialization of the current "learning control routine", the computer 21 first reads the throttle angle Th based on the signal from the throttle sensor 9 in step 201. The computer 21 also reads the latest throttle sensitivity Thg and acceleration stroke S output from the computer 22. Alternatively, the computer 21 reads the target throttle angle Thg.S output from the computer 22. If a reading of the throttle sensitivity Thg and acceleration stroke S is preformed, the computer 21 multiplies Thg by S to obtain the target throttle angle Thg.S.

In the next step 202, the computer 21 determines if the current throttle angle Th is smaller than the target throttle angle Thg.S. Following this operation, the computer 21 rotates the DC motor 8 forward to drive the throttle valve 7 in the opening direction in step 203. Subsequently, the computer 21 reads the throttle angle Th based on the signal from the throttle sensor 9 in step 204.

In step 205, the computer 21 again determines if the throttle angle Th is smaller than the target throttle angle Thg.S. After this, the computer 21 returns to step 203 and repeats the processes of steps 203, 204 and 205 to further drive the throttle valve 7 in the opening direction. If the decision condition in step 205 is not satisfied, the computer 21 determines that it is unnecessary to further drive the throttle valve 7 in the opening direction and temporarily terminates the subsequent process.

If the condition in step 202 is not satisfied, the computer 21 determines whether the throttle angle Th is larger than the target throttle angle Thg.S in step 206. Should angle Th be smaller than angle Thg.S, the computer 21 determines that the throttle angle Th matches with the target throttle angle Thg.S and temporarily terminates the subsequent process.

If throttle angle Th is larger than target throttle angle Thg.S, the computer 21, in step 201, rotates the DC motor 8 backward to drive the throttle valve 7 in the closing direction. Subsequently, in step 208, the computer 21 reads the throttle angle Th based on the signal from the throttle sensor 9.

In step 209, the computer 21 determines if the throttle angle Th is larger than the target throttle angle Thg.S. Should this condition be met, the computer 21 returns to step 207 and repeats the processes of steps 207, 208 and 209 to further drive the throttle valve 7 in the closing direction. If the decision condition in step 209 is not satisfied, the computer 21 determines that it is unnecessary to further drive the throttle valve 7 in the closing direction and temporarily terminates the subsequent process.

In this manner, the rotation of the DC motor 8 is controlled in such a way that the throttle angle Th matches the target throttle angle Thg.S and the angle of the throttle valve 7 is controlled accordingly. As a result, the amount of air flowing through the air intake passage 3 is adjusted and the output of the engine 2 is controlled. The driving power of the vehicle 1 is controlled as a consequence.

As described above, according to the first embodiment, at the time when throttle sensitivity Thg is learned, driver DR occasions a change in the acceleration of the vehicle which in turn results in an "acceleration model" being generated from acceleration G data. Based on the "acceleration model", the "throttle sensitivity model" is altered to determine the throttle sensitivity Thg. The target throttle angle Thg.S is in turn obtained by multiplying the determined throttle sensitivity Thg by the acceleration stroke S. The opening/closing of the throttle valve 7 is controlled in such a way that the value coincides with the throttle angle Th.

In accordance with the above described conditions, the "acceleration model" always is obtained, and the "throttle sensitivity model" is obtained after the determination of the "acceleration model". The throttle angle Th of the engine 2 is always controlled corresponding to the change in acceleration G, which in turn is produced as a result of the changes in the vehicle's acceleration occasioned by driver DR.

Large changes in the acceleration of the vehicle 1 produce corresponding increases in the throttle sensitivity Thg. These, in turn, reduce the range of changes in acceleration stroke S to a value corresponding to the acceleration G, thus allowing for a large acceleration G with a small amount of thrusting on the accelerator pedal 10. As a result, the driver DR will feel as if the accelerating performance of the vehicle 1 has been improved. For example, when the driver DR is in a hurry or is driving the vehicle 1 on a clear expressway without a traffic jam and thus wants to drive the vehicle 1 faster, a large acceleration G can be yielded by a little thrusting on the accelerator pedal 10, thus improving the feeling of acceleration.

With a small change in the acceleration of the vehicle 1, the throttle sensitivity Thg decreases. This decrease produces a corresponding increase in the change made to the acceleration stroke S to a value that corresponds to the acceleration G, thus allowing for a fine variation in acceleration G even with a large thrust on the accelerator pedal 10. As a result, the operability of the accelerator pedal 10 by the driver DR will be improved. For example, when the driver DR is not in a hurry or is driving the vehicle 1 on a road under poor conditions, such as a traffic jam or snowy weather, and thus wants to drive the vehicle 1 slowly, the acceleration G can be kept to a minimum even with relatively large thrusts made to the accelerator pedal 10, thus improving the operability of the vehicle 1.

In short, according to the first embodiment, since learning is performed in such a way as to meet the particular acceleration required by the driver DR, the throttle sensitivity Thg matching the driver's DR acceleration requirements is always determined. As a result, it is always possible to achieve driving power control of the vehicle 1 that matches with the characteristics of the driver DR, regardless of whether the driver DR is in a hurry, relaxed, etc., and irrespective of the driving environment (road conditions, day or night, inside a tunnel, rainy or snowy weather, mounting road, traffic jam, etc.).

According to the first embodiment, since neural network technology is employed in the learning control of the computer 22, the whole relationship among the acceleration stroke S, the vehicle speed V and the acceleration model output Gx is learned as a continuous rather than a partially discontinuous model. Likewise, the whole relationship among the acceleration stroke S, the vehicle speed V and the throttle sensitivity model output Thx is learned as a continuous rather than a partially discontinuous model.

The above is possible due to the use of the neural network technology interpolating the "acceleration model" learned as a result of the discontinuous points of the acceleration stroke S and vehicle speed V. That is, the correction of the acceleration model output Gx that is made for a specific range of the acceleration stroke S and the vehicle speed V corresponds to the correction of the acceleration model output Gx for another range of the acceleration stroke S and vehicle speed V. Furthermore, the correction of the throttle sensitivity model output Thx that is made within a specific range of the acceleration stroke S and the vehicle speed V corresponds to the correction of the throttle sensitivity model output Thx for another range of the acceleration stroke S and vehicle speed V.

Accordingly, it is possible to continuously control the driving power of the vehicle 1 for the entire range of the vehicle speed V for the amount of the manipulation of the accelerator pedal 10 by the driver DR, or over the entire manipulation range of the acceleration stroke S. When the accelerator pedal 10 is continuously thrust downward, therefore, it is possible to prevent the acceleration G of the vehicle 1 from abruptly changing, thus ensuring a smooth increase in vehicle speed V.

Furthermore, according to the first embodiment, the "acceleration model" is estimated from the acceleration G while the "throttle sensitivity model" is altered based on the result of the estimation. This eliminates the need for interpolation of a map and shortens the calculation time in contrast to the case where a map is redrawn by simple partial compensation (correction).

Figure 10:
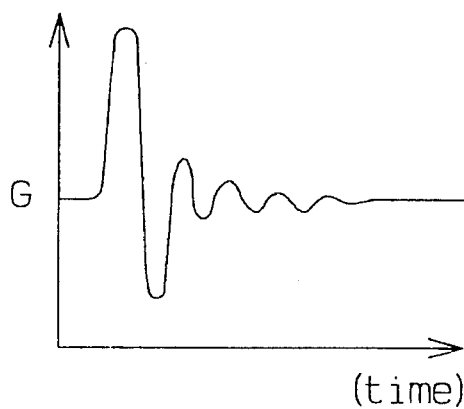
Figure 11:
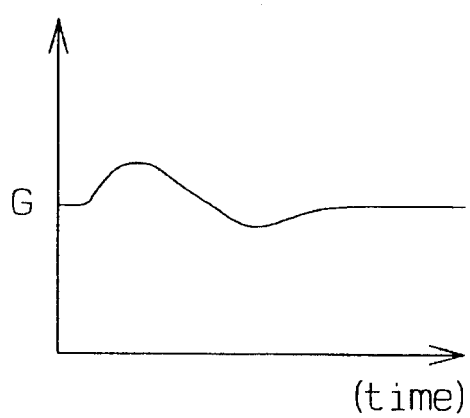

In addition, according to the first embodiment, the acceleration sensor 12 is connected to the I/O interface circuit 27 of the computer 22 via the low-pass filter 29. If external noise is introduced into the detection signal produced by acceleration sensor 12 during the movement of vehicle 1 on a rough road, for example, a high-frequency component relative to that noise will be attenuated by the low-pass filter 29..That is, even when the signal reporting the acceleration G from the acceleration sensor 12 contains a large amount of noise as shown in FIG. 10, that signal after passing the low-pass filter 29 is filtered to the signal of the acceleration G as shown in FIG. 11.

Consequently, the computer 22 learns using acceleration G data that has unwanted noise removed. It is therefore possible for the computer 22 to learn the "acceleration model" and "throttle sensitivity model" without the influence of externally generated interference, and that, in turn, prevents the adjustment of the throttle sensitivity Thg in the wrong direction.

Second Embodiment

The second embodiment of the present invention will be described with reference to FIGS. 12 through 15. Those elements in the second embodiment that have substantially the same structure as those elements in the first embodiment will be given the same reference numerals to avoid repeating their descriptions. The following description will be centered on the specific differences between the first and second embodiments.

Figure 12:
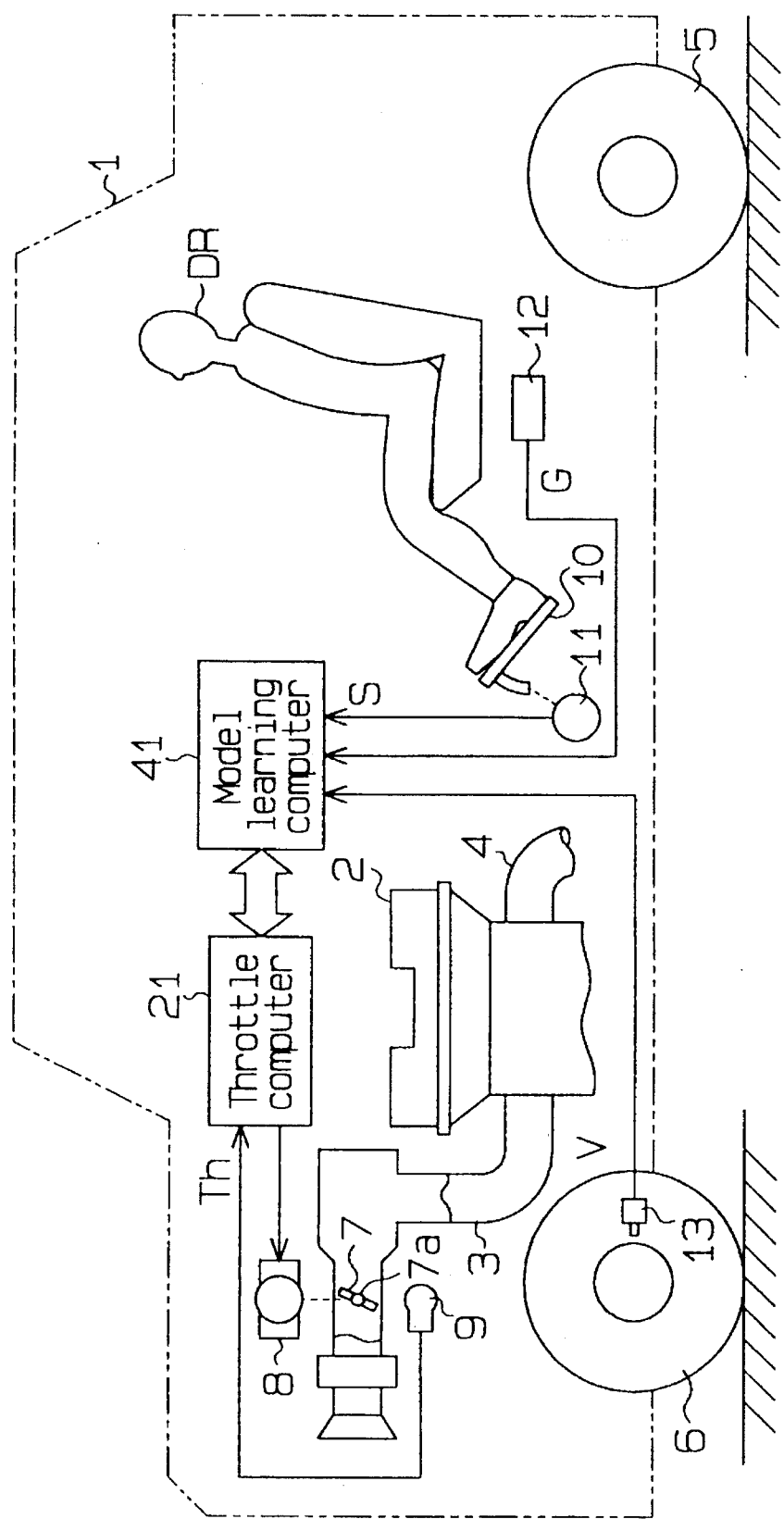
FIGS. 12 through 15 illustrate a second embodiment of the present invention.

In the second embodiment, as shown in FIG. 12, a model learning computer 41 is used instead of the neuro computer 22 of the first embodiment. In this computer 41, a new method concerning the learning (updating) and execution (reading) of data maps is employed in place of the neural—network technology of the first embodiment.

The electrical configuration of the computer 41 is substantially the same as that of the computer 22 in the first embodiment shown in FIG. 2. The computer 41 includes the CPU 23, ROM 24, RAM 25, backup RAM 26, I/O interface circuit 27 and bus 28, etc.

A learning control program, or the like, which is associated with the new method concerning the learning (updating) and execution (reading) of data maps, is stored in advance in the ROM 24. The backup RAM 26 has two maps (to be described later) stored in advance. Based on the input values from the individual sensors 11 to 13, the CPU 23 executes a learning control of an "acceleration model", occasioned by changes made by the driver DR to the vehicle's acceleration, and a learning control of a "throttle sensitivity model" according to this "acceleration model", in accordance with the learning control program stored in the ROM 24. The CPU 23 sends out the learning results to the computer 21.

Stored in advance in the ROM 31 of the computer 21 is a throttle angle control program, which controls the opening/closing of the throttle valve 7 based on the learning results of the model learning computer 41. Based on the data of the learned results sent from the model learning computer 41 and the signal from the throttle sensor 9, the CPU 30 properly controls the DC motor 8 in accordance with the aforementioned throttle angle control program.

The new method concerning the learning (updating) and execution (reading) of data maps, which is adapted to the computer 41, will be discussed below.

Figure 13:
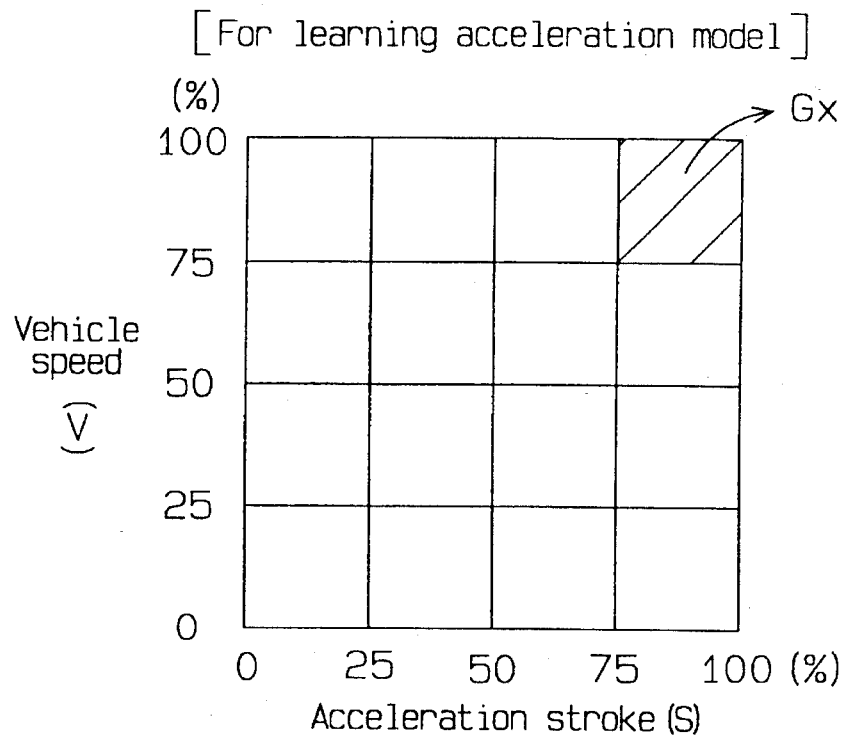
Figure 14:
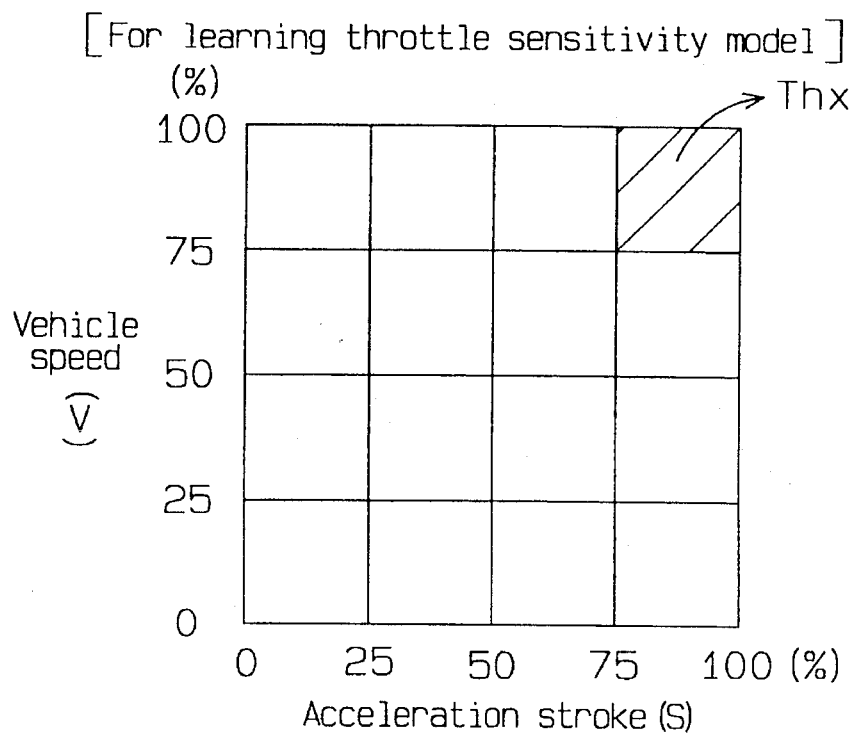

Stored in the backup RAM 26 are a map for "learning the acceleration model" shown in FIG. 13 and a map for "learning the throttle sensitivity model" shown in FIG. 14. These maps are prepared with the acceleration stroke S and vehicle speed V as parameters.

Stored in the map in FIG. 13 are the results of learning the relationship among the acceleration stroke S, the vehicle speed V and the acceleration model output Gx. More specifically, the computer 41 uses the acceleration G, input from the acceleration sensor 12, as "teaching data". The computer 41 compares the acceleration model output Gx, attained by referring to the map in FIG. 13, with the above-mentioned acceleration G. The computer 41 treats the comparison result, an acceleration deviation $\Delta G$ (=G-Gx), as an "error signal" and learns (updates) data in the map so as to reduce the error portion of this "error signal".

That is, the computer 41 treats any particular level of acceleration G, required by the driver DR, as "teaching data". Using the map, the computer 41 learns the relationship among the acceleration stroke S, the vehicle speed V and the acceleration G as the "acceleration model" required by the driver DR. This in effect reduces the deviations in the "teaching data". Then, the computer 41 accesses the learning results through the map as the acceleration model output Gx.

That is, in the second embodiment like in the first embodiment, the "acceleration model" is learned in such a direction that the acceleration model output Gx approaches the acceleration G, as shown in FIG. 5. The learned results of driving data obtained by a plurality of drivers are stored as the initial values of the "acceleration model" in the aforementioned map.

The results of learning the relationship among the acceleration stroke S, the vehicle speed V and the throttle sensitivity model output Thx are stored in the map "learning throttle sensitivity model" as shown in FIG. 14. More specifically, the computer 41 uses the acceleration deviation $\Delta G$ between the acceleration G and the acceleration model output Gx as an "error signal". The computer 41 alters the throttle sensitivity model output Thx, obtained by referring to the map in FIG. 14, based on the "error signal" and updates the data in the map to the altered value.

In other words, using the map, the computer 41 learns the relationship among the acceleration stroke S, the vehicle speed V and the throttle angle Th as the "throttle sensitivity model" required by the driver's DR acceleration needs in order to decrease the error portion of the "error signal". The learning results are obtained as the throttle sensitivity model output Thx. That is, in the second embodiment as in the first, the "throttle sensitivity model" is learned as the characteristic as shown in FIG. 6. The reference throttle sensitivity ("1.0" in the second embodiment) is stored as the initial value of the "throttle sensitivity model" in the aforementioned map.

A description will now be given regarding how maps may be used to learn the "acceleration model" and the "throttle sensitivity model". If typical maps are used to learn the aforementioned models, the acceleration stroke S and the vehicle speed V become unequal-interval data because the acceleration stroke S, vehicle speed V and acceleration G are input only every given time. Therefore, learning (updating) will not be performed evenly over the entire areas of the maps, and the map outputs become discontinuous. To ensure continuous map outputs, the learning (updating) and execution (reading) of the maps are carried out in the following manner in the second embodiment.

Figure 15:
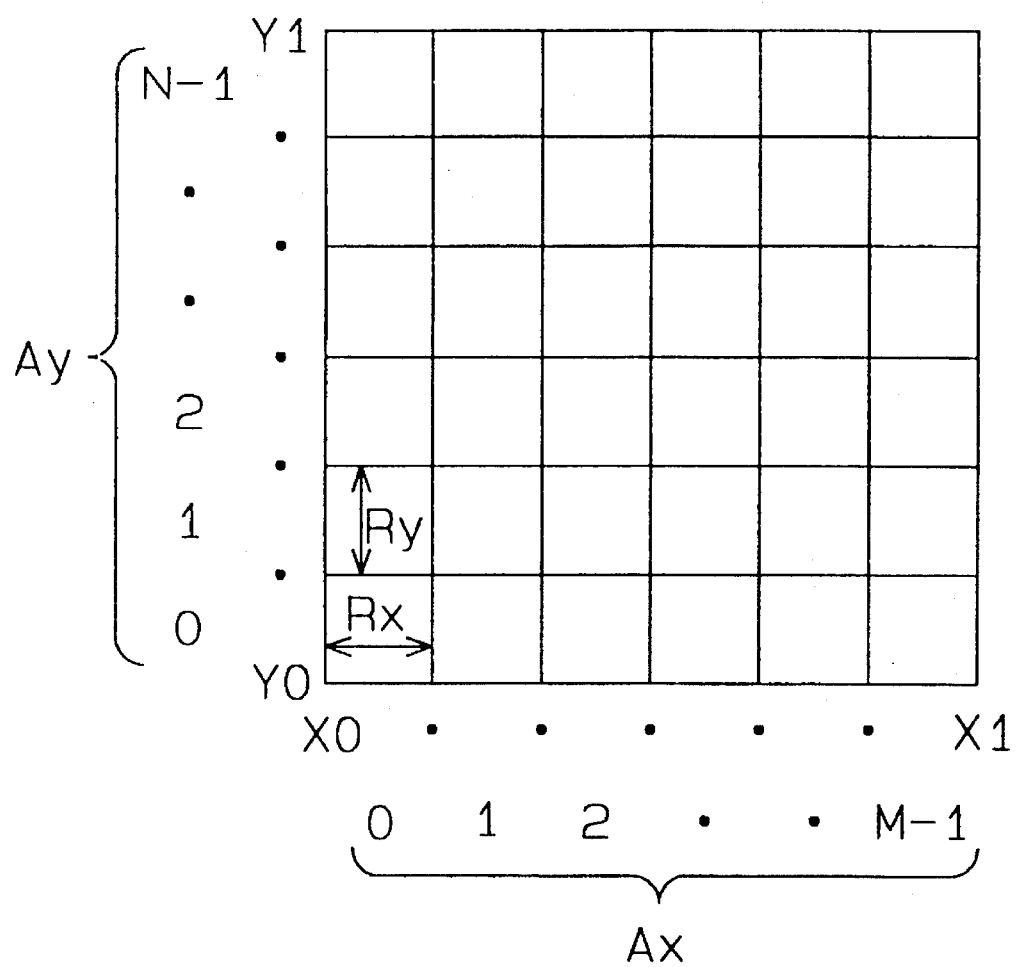

FIG. 15 shows a map used for explaining this method. This map contains two variables, "X" and "Y", and the variable X is divided by M and the variable Y is divided by N, yielding a two-dimensional M * N matrix Z (M, N) where M and N are both integers. The minimum value for the variable X handled in this map is "X0" and the maximum value is "X1". The minimum value for the variable Y handled in this map is "Y0" and the maximum value is "Y1". The range of the address Ax in the direction of the variable X in the map is "0 to (M−1)" and the range of the address Ay in the direction of the variable Y in the map is "0 to (N−1)".

The map address (Ax, Ay) of arbitrary (X, Y) is expressed by the following equations (2) and (3).

$$Ax=(X-X0)/Rx \quad (2)$$

$$Ay=(Y-Y0)/Ry \quad (3)$$

Rx and Ry in the equations (2) and (3) indicate the range of (X, Y) represented by one point on the map, and are given by the following equations (4) and (5).

$$Rx=(X1-X0)/M \quad (4)$$

$$Ry=(Y1-Y0)/N \quad (5)$$

Arbitrary (X, Y) are represented by the map address (Ax, Ay) in the equations (2) and (3). The distance Dxy between any given map address (Ax, Ay) and arbitrary (X, Y) is expressed by the following equations (6), (7) and (8). In equations (6) to (8), "Dx" is the distance in the direction of the variable X and "Dy" is the distance in the direction of the variable Y.

$$Dx=(X-X0)-Ax*Rx \quad (6)$$

$$Dy=(Y-Y0)-Ay*Ry \quad (7)$$

$$Dxy=(Dx^2+Dy^2)_{1/2} \quad (8)$$

When the distance Dxy in the equation (8) is smaller than an arbitrarily small positive distance Dmin, the distance Dxy is given by the following equation (9).

$$Dxy=Dmin \quad (9)$$

Given that the reciprocal of the distance Dxy between arbitrary (X, Y) and every point on the map is "Wxy" and the sum of the reciprocals Wxy is "W", those values are expressed by the following equations (10) and (11).

$$Wxy = 1/Dxy \quad (10)$$

$$W = \sum_{Ax} \sum_{Ay} Wxy \quad (11)$$

The learning (updating) of the map is performed for all the points on the map using the following equation (12) in which "ε" (small positive constant) is a learning ratio and "σ" is a learning signal for arbitrary (X, Y).

$$Z(Zx, AY)=Z(Ax, Ay)+\epsilon*\sigma Wxy/W \quad (12)$$

The execution (reading) of the map is done for all the points on the map using the following equation (13). In this equation, the product between the map value and a weighting coefficient proportional to the reciprocal of the distance, Wxy, is obtained.

$$Zxy = \sum_{Ax} \sum_{Ay} Z(Ax,Ay) * Wxy/W \quad (13)$$

The learning (updating) and execution (reading) of the map are performed in the above manner. In the second embodiment, the acceleration model output Gx is assigned for the "acceleration model" and the throttle sensitivity model output Thx is assigned for the "throttle sensitivity model". In the second embodiment, the number of segmentations of the aforementioned map variables X and Y is "M=N=4", and the acceleration stroke S is assigned to the variable X while the vehicle speed V is assigned to the variable Y.

The learning (updating) and execution (reading) of the map are carried out based on the learning control program, which is stored in advance in the ROM 24 of the computer 41. In the second embodiment, the learning control program ultimately obtains the relationship between the acceleration stroke S and the throttle sensitivity Thg as shown in FIG. 7.

The basic flow of information processing for computer 41 is the same as that of the "learning control routine" in the first embodiment shown in FIG. 8.

This "learning control routine" is executed to learn the characteristics of both the "acceleration model" required by the driver DR and the "throttle sensitivity model." Here, the characteristics of the "acceleration model" and the "throttle sensitivity model", which are intermittently processed, are rewritten and stored in the respective maps in the backup RAM 26.

According to the second embodiment, the computer 21 executes the throttle angle control based on the throttle sensitivity Thg, determined by the aforementioned "learning control routine", and the acceleration stroke S. The basic flow of processing for the throttle angle control that is executed here is the same as that of the "throttle angle control routine" in the first embodiment shown in FIG. 9. This "throttle angle control routine" is executed to control the rotation of the DC motor 8 in such a way that the throttle angle Th matches with the target throttle angle Thg.S to control the angle of the throttle valve 7. As a result, the amount of air flowing through the air intake passage 3 is controllably adjusted. In this way, the output of the engine 2 is controlled, as is the driving power of the vehicle 1.

As described above, according to the second embodiment, and as in the first embodiment, the acceleration requirements made by the driver DR are estimated as the "acceleration model" from the acceleration G. Based on the "acceleration model", the throttle sensitivity model" is altered to determine the throttle sensitivity Thg. The opening/closing of the throttle valve is controlled in such a way that the target throttle angle Thg.S, obtained by multiplying the determined throttle sensitivity Thg by the acceleration stroke S, coincides with the throttle angle Th. Moreover, in light of the acceleration requirements made by the driver DR, the "acceleration model" is always obtained, as is the "throttle sensitivity model". The throttle angle Th of the engine 2 is always controlled with the acceleration G that meets the request by the driver DR.

According to the second embodiment, as in the first embodiment, since learning is performed in such a way as to meet the acceleration requirements of the driver DR, a corresponding throttle sensitivity is likewise always determined. As a result, it is always possible to control the driving power of the vehicle 1 according to the requirements and driving characteristic of the driver DR regardless of the driving environment.

According to the second embodiment, the above-described new method concerning the learning (updating) and execution (reading) of the maps is employed in learning control by the computer 41. Therefore, the whole relationship among the acceleration stroke S, the vehicle speed V and the acceleration model output Gx is learned as a continuous model, rather than as a partially discontinuous model. Likewise, the whole relationship among the acceleration stroke S, the vehicle speed V and the throttle sensitivity model output Thx is learned as a continuous rather than a partially discontinuous model.

This is because the above-described method for learning the maps is used. That is, when the "acceleration model" and the "throttle sensitivity model" are learned at arbitrary points of the acceleration stroke S and vehicle speed V, the values of all the other points on each map are updated based on the learning results. In other words, the correction of the acceleration model output Gx that is made for a specific range of the acceleration strokes S and the vehicle speeds V reflects on the correction of the acceleration model output Gx for another range of the acceleration stroke S and vehicle speed V. Furthermore, the correction of the throttle sensitivity model output Thx that is made within a specific range of the acceleration stroke S and the vehicle speed V reflects on the correction of the throttle sensitivity model output Thx for another range of the acceleration stroke S and vehicle speed V.

Accordingly, it is possible to control the driving power of the vehicle continuously over the entire range of the acceleration stroke S. When the driver DR pushes the accelerator pedal 10 downward, the acceleration G of the vehicle 1 will not change abruptly, ensuring a smooth increase in vehicle speed V. This is the same advantage as obtained by the first embodiment where the neural network technology is employed.

Using the method of learning maps in the second embodiment rather than that of the neural network technology in the first embodiment occasions the following advantages. In the second embodiment, the amount of computation becomes smaller than that required by the execution and learning of the neural network, thus making the amount of the contents of the operational program less than that needed by the neural network. The second embodiment can therefore shorten the computing time at the learning time by the reduced amount of computation, thus ensuring the reduction in the required memory capacity. This eliminates the need for a fast, large-capacity memory for the ROM 24, RAM 25, backup RAM 26 and so forth in the computer 41 and contributes to reducing the manufacturing cost of the apparatus.

The functions and advantages of the second embodiment described above are what should be in contrast with those of the first embodiment, and the other functions and advantages of the second embodiment are substantially the same as those of the first embodiment.

Third Embodiment

The third embodiment of the present invention will be described with reference to FIGS. 16 through 21.

Those elements in the third embodiment which are substantially the same in structure as the elements in the first embodiment will be given the same reference numerals to avoid repeating their descriptions, and the following description will be centered on the specific differences.

In the third embodiment, immediately after the vehicle's startup is detected and after the processing of the "throttle sensitivity model" is completed, the throttle sensitivity Thg is forcibly converged to a reference value substantially between a value suitable for the quick start of the vehicle and a value suitable for longer start.

As shown in FIG. 16, a braking pedal 15 is provided next to the accelerator pedal 10 (the braking pedal 15 is shown above the accelerator pedal 10 in FIG. 16). The driver DR steps on the braking pedal 15 to achieve or maintain the breaked condition of vehicle 1.

A push type stop lamp switch 14 is provided near the braking pedal 15. This switch 14 is normally in an off state, and it outputs an ON signal only when the driver DR depresses the braking pedal 15 a predetermined amount or more. The switch 14 is connected to the neuro computer 22.

Figure 17:
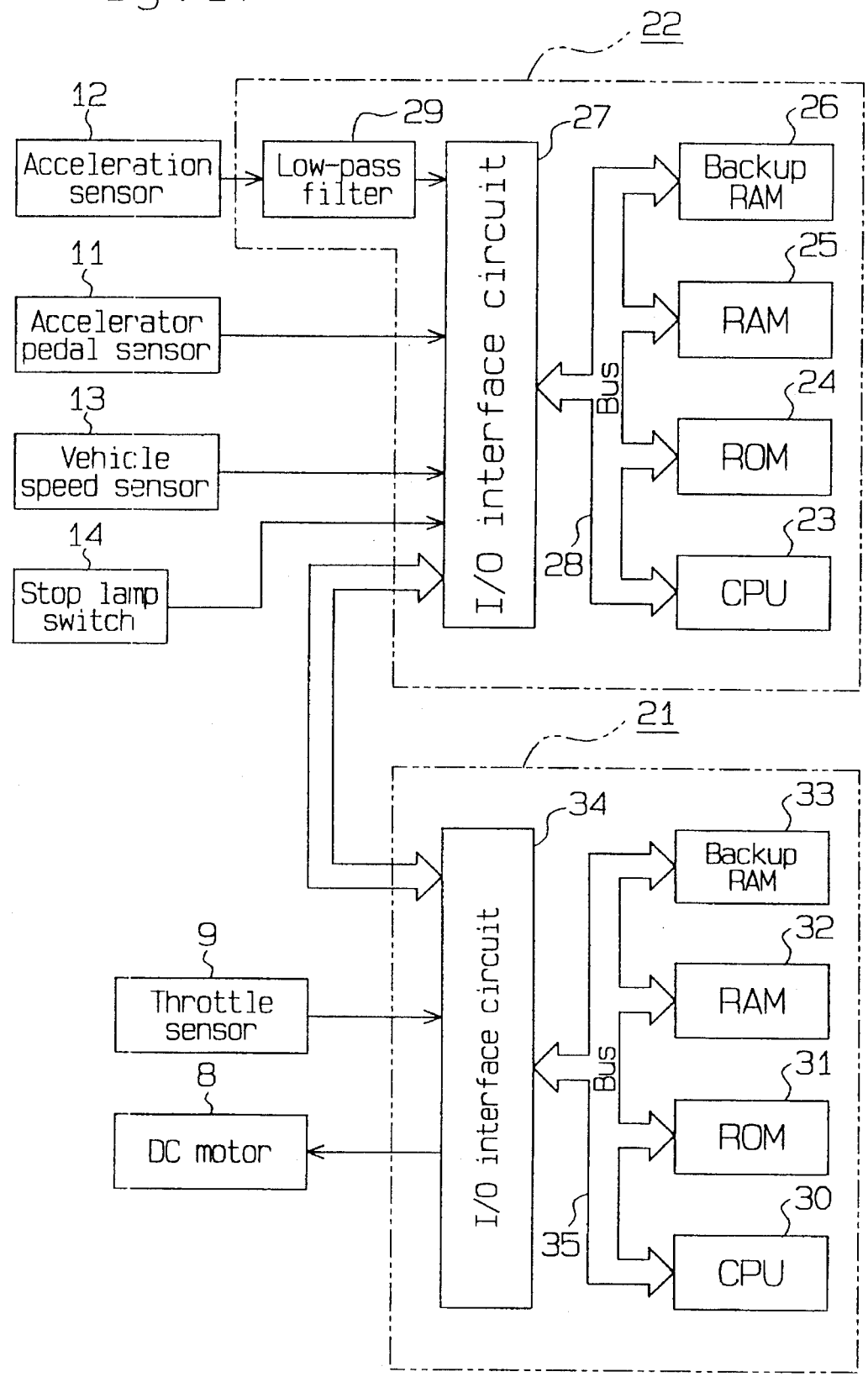

As shown in FIG. 17, in addition to the individual sensors 11 to 13, the switch 14 is connected to the I/O interface circuit 27. Various signals from the sensors 11–13 and the switch 14 are input to the CPU 23 via the I/O interface circuit 27.

A learning control routine shown in FIG. 18 will be described below. The individual processes in this routine are executed using a counter to count the number of times the throttle sensitivity Thg is computed during the startup period of the vehicle 1. A count value $\tau$ is assigned to the result of this counting routine.

The processes for learning the "acceleration model" and the "throttle sensitivity model" during the learning control routine are executed during the period (start sustain time) from the point where the following drive-start condition begins to the point where the drive-start condition ends.

The drive start condition is considered satisfied when a drive start flag F1, which indicates whether or not the drive start condition is met, is "0", when a change $\Delta$S in acceleration stroke S per unit time (e.g., 0.1 sec) is equal to or greater than a predetermined value (e.g., 3%), and when the vehicle speed V is equal to or less than a predetermined value (e.g., 5 Km/hour). The flag F1 is set to "1" when the drive start condition is met and to "0" when that condition is not met.

The drive-start end condition is considered satisfied under the following three scenarios. First, where the drive start condition is met and the drive start flag F1 is set to "1", where a convergence start flag E is "0" and where the braking pedal 15 is pushed and the stop lamp switch 14 is set on. Second, the drive-start end condition is considered satisfied when a predetermined time (e.g., 1 sec) or longer elapses after the drive start condition is met, when the acceleration stroke S is equal to or less than a predetermined value (e.g., 10%), and when the vehicle speed V is equal to or less than a predetermined value (e.g., 10 Km/hour). And third, the drive-start end condition is considered satisfied when the count value $\tau$ reaches a preset value T (e.g., 75).

The flag E indicates whether or not a process of converging (matching) the throttle sensitivity Thg to a reference value $THG_0$ is started after the start action (to be described later) is completed. The flag E is set to "1" when the converging process starts or is in progress, and to "0" when the converging process has yet to be started.

The count value τ and both flags F1 and E are set to "0" as initial values when the ignition key is operated to start the engine. When the control cycle of the learning control routine is 0.1 sec and the predetermined value T is 75, the start sustain time becomes 7.5 sec.

Figure 21:
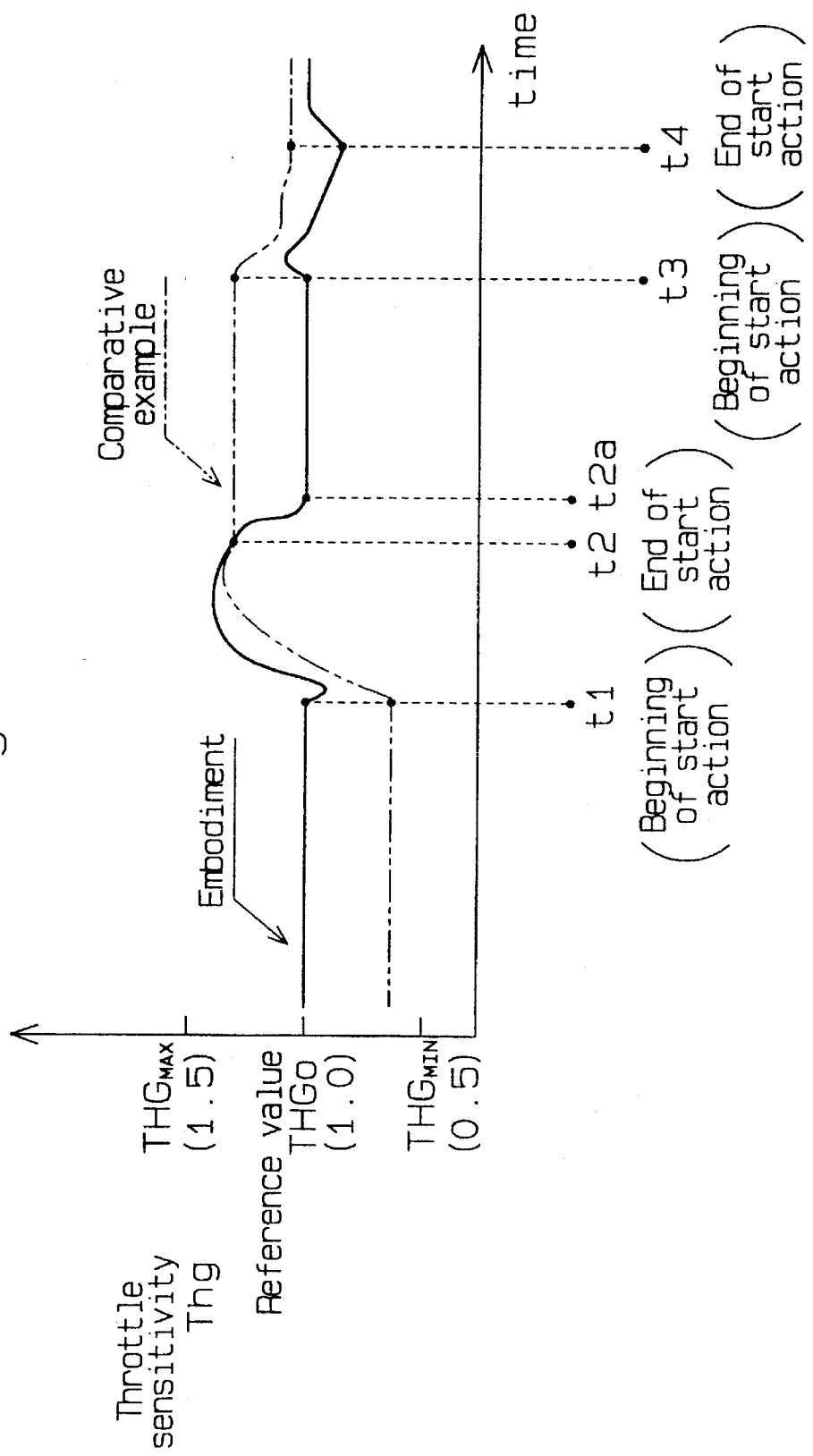

The time chart shown in FIG. 21 shows a change in throttle sensitivity Thg obtained by the learning control routine when the vehicle 1 runs in the following manner. It is assumed that the vehicle 1 is stopped because of a red signal or some other reason before time t1. The time chart shows a case where a quick start is performed during a period between times t1 and t2, where constant speed cruising (driving other than the start action) is performed during a period between times t2 and t3, and where gentle starting and accelerating cruising is required by the driver DR during a period between times t3 and t4.

Figure 18:
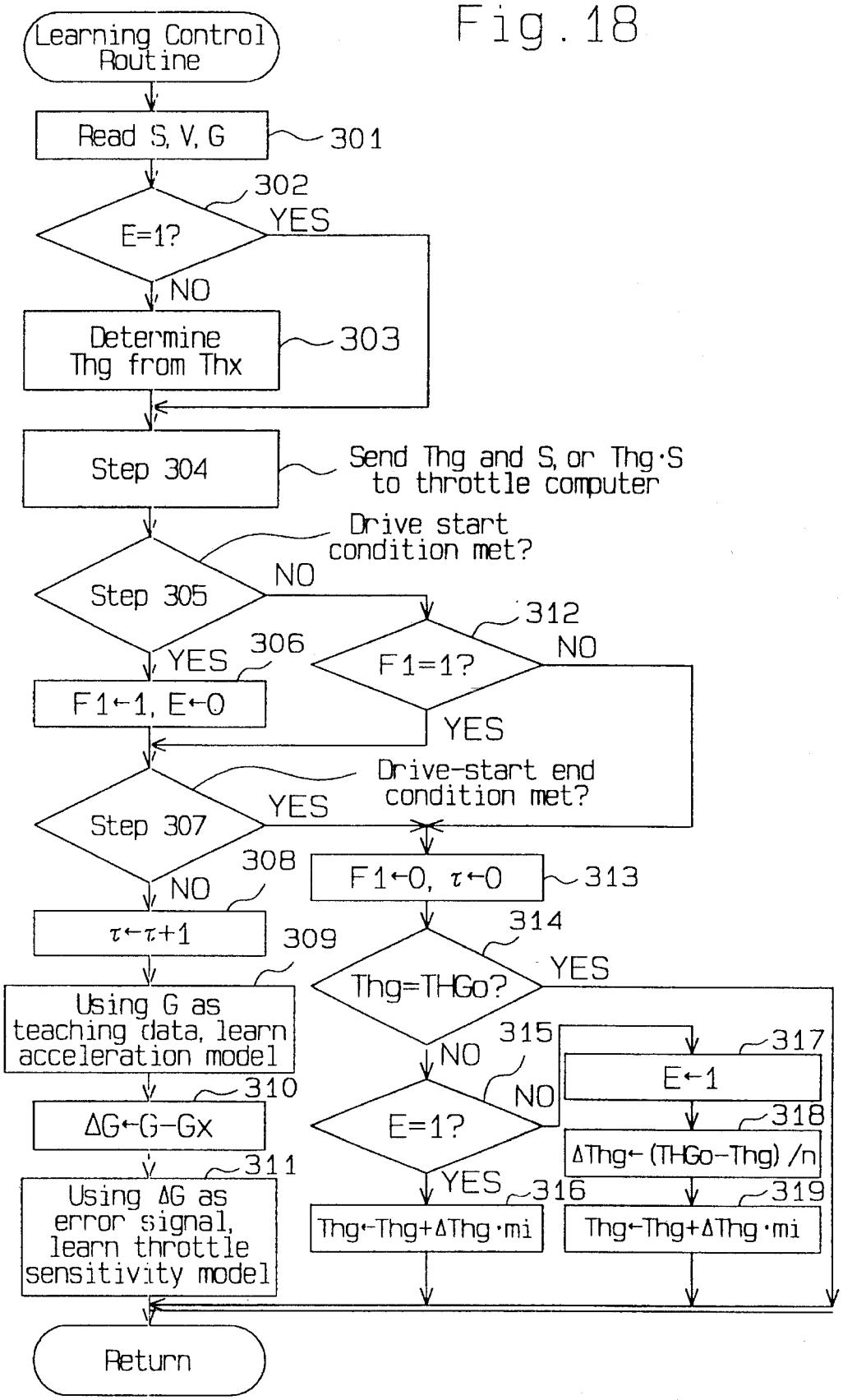

When a predetermined time ("0.1 sec" in this case) passes following the beginning of the learning control routine, the computer 22 reads the acceleration stroke S, acceleration G and vehicle speed V based on various signals from the accelerator pedal sensor 11, acceleration sensor 12 and vehicle speed sensor 13 in step 301 in FIG. 18. From the acceleration stroke S, the computer 22 calculates the amount of its change ΔS. The change ΔS is the deviation in previously read and current values for the acceleration stroke S.

Then, the computer 22 determines if the flag E is "1" in step 302. The computer 22 goes to step 304 when this decision condition is affirmative, and advances to step 303 upon reaching a negative result.

In step 303, the computer 22 executes the learning of the "throttle sensitivity model". More specifically, the computer 22 acquires the throttle sensitivity model output Thx from the characteristic (see FIG. 6) of the already learned "throttle sensitivity model" based on the currently-read acceleration stroke S and vehicle speed V as input values. The computer 22 then determines the throttle sensitivity Thg according to the aforementioned equation (1).

Next, the computer 22 sends the throttle sensitivity Thg and acceleration stroke S to the computer 21 in step 304. Alternatively the computer 22 multiplies the throttle sensitivity Thg by the acceleration stroke S and sends the multiplication result as a target throttle angle Thg.S to the computer 21.

In the next step 305, the computer 22 determines whether or not the drive start condition is met. When this decision condition is satisfied, the computer 22 moves to step 306 to set the flag F1 to "1" and resets the flag E to "0" and then proceeds to step 307. In the time chart in FIG. 21, considering that the drive start condition is satisfied at time t1, the computer 22 executes the processes of steps 305, 306 and 307 in that order.

When the result at step 305 reflects a negative outcome, the computer 22 proceeds to the operation at step 312 and determines if the flag F1 is "1". In the decision in step 305, the computer detects only the drive-start timing and does not consider whether or not the starting and accelerating cruising is in progress. If the drive start condition has already been met and the flag F1 is "1", which means the starting and accelerating cruising is in progress, the computer 22 proceeds from the operation at step 305 to the operation at step 312 and then to step 307. If a negative decision results at step 312, the computer 22 advances to step 313.

When the process at step 307 is reached from the operations at step 306 or step 312, the computer 22 determines whether or not the drive-start end condition is met. If the process at step 307 is answered affirmatively, the computer 22 proceeds to step 313.

If a negative result is occasioned at step 307, which indicates that starting or acceleration is in progress, the computer 22 moves to step 308 to increment the count value τ by "1".

Next, in steps 309 to 311, the computer 22 performs the same processes as those of steps 104 and 105 in FIG. 8. That is, the computer 22 learns the "acceleration model" required by the driver DR, using the acceleration G of the vehicle 1 as "teaching data" in step 309. More specifically, the computer 22 treats the acceleration G of the vehicle 1 detected by the acceleration sensor 12, as "teaching data". It then learns the relationship among the acceleration stroke S, the vehicle speed V and the acceleration G all of which is interpreted as the "acceleration model" in response to the acceleration demands occasioned by the driver DR. With this model, the computer is able to reduce data deviation in the "teaching data".

Next, the computer 22 obtains the difference (G−Gx) between the acceleration G and the acceleration model output Gx which it defines as the acceleration derivation ΔG. In step 311, the computer 22 determines the "throttle sensitivity model" using that acceleration deviation ΔG as an "error signal". In other words, using the acceleration deviation ΔG as the "error signal", the computer 22 establishes a relationship among the acceleration stroke S, the vehicle speed V and the throttle angle Th as the "throttle sensitivity model" in such a way as to reduce the error portion of the "error signal".

After executing the process of step 311, the computer 22 temporarily terminates the subsequent processing. When "0.1 sec" passes after the learning control routine has started, the computer 22 executes the sequence of processes starting with step 301 again.

Following a positive outcome at step 307 or when the outcome from step 312 is negative, i.e., when the starting and accelerating cruising is not in progress, the computer 22 goes to step 313 to reset the flag F1 and the count value τ to "0".

Next, the computer 22 determines if the throttle sensitivity Thg equals the predetermined reference value $THG_0$ in step 314. Throttle sensitivity reference $THG_0$ takes a value between the minimum value $THG_{MIN}$ (e.g., "0.5") and the maximum value $THG_{MAX}$ (e.g., "1.5"). In the third embodiment, "1.0" is set as the reference value $THG_0$.

When the decision condition in step 314 is met (Thg= $THG_0$), the computer 22 temporarily terminates the subsequent processing. When "0.1 sec" passes after the current learning control routine has started, the computer 22 executes the sequence of processes starting with step 301 again. During the period between time t1 and time t2 in the time chart in FIG. 21, as the sequence of processes of steps 301 to 311 is repeated, the throttle sensitivity Thg varies (increases in this case) with time.

When a positive outcome in step 314 is not reached (Thg≠$THG_0$), the computer 22 goes to step 315 to determine if the flag E is "1". When this condition is not met, i.e., when the flag E is "0", the computer 22 judges that the drive-start end condition has been just satisfied, and sets the flag E to "1" in step 317.

Next, the computer 22 computes the minimum amount of correction ΔThg for the throttle sensitivity Thg from the following equations (14) and (15) in step 318.

$$\Delta Thg = (THG_0 - Thg)/n \quad (14)$$

$$\Delta Thg = (THG_0 - Thg)/n \quad (14)$$

$$n = \sum_{i=1}^{L} m_i \quad (15)$$

In the equation (15), "i" is the number of adjustments of the throttle sensitivity, which is the number of times the learning control routine has been performed after the drive-start end condition has been met. The maximum value "L" that this adjustment number i takes is the number of times the learning control routine can be executed until the next drive start is initiated.

Furthermore, "$m_i$" is a compensation coefficient for changing the minimum amount of correction ΔThg, and is a function of the adjustment number i. This compensation coefficient $m_i$ is set previously to the characteristic as indicated by the solid line in the map in FIG. 19. More specifically, in this map, the compensation coefficient $m_i$ is set to "1" when the adjustment number i is "0" or "L". Coefficient $m_i$ takes the maximum value when the adjustment number i is "L/2". Then, the compensation coefficient $m_i$ slowly changes when the adjustment number i is approximately "0" and "L", and changes sharply when i takes the other values.

It is to be noted that "n" obtained by the equation (15) takes a value, for example, "10". In this case, the minimum amount of correction ΔThg obtained from the equation (14) becomes a negative value.

After computing the minimum amount of correction ΔThg in step 318, the computer 22 moves to step 319 to add ΔThg.$m_i$ to the current throttle sensitivity Thg and to set the result of the addition as a new throttle sensitivity Thg. Since the minimum amount of correction ΔThg is a negative value and the compensation coefficient $m_i$ is a positive value, the throttle sensitivity Thg is decreased by ΔThg.$m_i$.

After executing the process of step 319, the computer 22 temporarily terminates the subsequent processing. When "0.1 sec" passes after the current learning control routine has started, the computer 22 executes the sequence starting with step 301 again.

As described above, the flag E is set to "1" in step 317. In the subsequent control cycle, therefore, the computer 22 judges that the decision condition in step 315 is met, and executes the process of step 316 instead of steps 317–319. The computer 22 at this time also judges whether the condition at step 302 is met. The computer 22 does not execute the process of step 303 (execution of the throttle sensitivity model) and will instead send the throttle sensitivity Thg, determined in step 319 or step 316, to the computer 21 until the flag E is set to "0" or until the next drive start is initiated.

When the throttle sensitivity Thg is larger than the reference value $THG_0$ at time t2 as shown in the time chart in FIG. 21, the computer 22 judges that the condition set forth in step 314 is not satisfied. The computer 22 then repeats the process for converging the throttle sensitivity Thg to the reference value $THG_0$ (updating of the throttle sensitivity Thg) in the following manner until that decision condition is satisfied. That is, the computer 22 moves from step 315 to 317, to 318, to 319, to 301, to 302 and then to 304 immediately after the decision condition in step 314 is not met, and then moves from step 315 to step 316, to 301, to 302 and then to 304 in the next control cycle.

Figure 19:
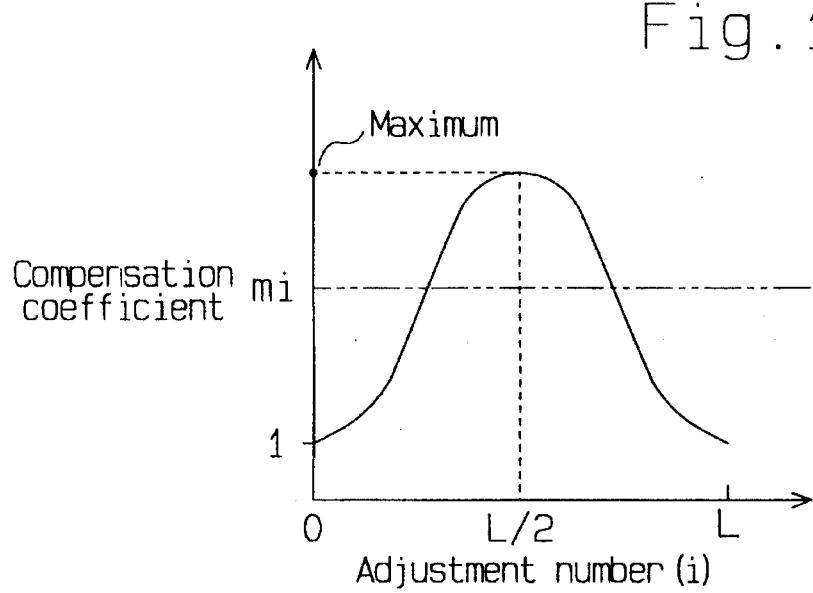

While the minimum amount of correction ΔThg is a constant during the execution of step 316 (step 319 immediately after the decision condition in step 314 is not met), the compensation coefficient $m_i$ varies as shown in FIG. 19 with an increase in the value of the adjustment number i, as the process of step 316 (step 319 immediately after the decision condition in step 314 is not met) is executed. Therefore, the throttle sensitivity Thg, which is updated in step 316 (step 319 immediately after the decision condition in step 314 is not met), gradually decreases after time t2 with the passage of time and eventually matches the reference value $THG_0$, as indicated by the solid line in FIG. 20. More specifically, the throttle sensitivity Thg gently decreases immediately after time t2, and drastically decreases thereafter. The throttle sensitivity Thg also decreases the most drastically when the adjustment number i is L/2, and slowly decreases thereafter.

When the process of step 316 (step 319 immediately after the decision condition in step 314 is not met) is performed L times and the throttle sensitivity Thg mirrors the reference value $THG_0$ at time t2a, the computer 22 judges that the condition in step 314 is met and terminates the process of updating the throttle sensitivity Thg. The throttle sensitivity Thg is held at the reference value $THG_0$ until the next drive start is initiated (timing t2 to t3).

According to the learning control routine, as described above, when the starting of the vehicle 1 is detected and the learning of the acceleration model and of the throttle sensitivity model is complete, the output of that throttle sensitivity model, throttle sensitivity Thg, is forcibly converged to the reference value $THG_0$.

Even in the case after the throttle sensitivity Thg is adjusted to a low value due to a slow starting condition, and the driving state shifts to a constant cruising speed when the driver DR can request quick acceleration, the throttle sensitivity Thg will be forcibly converged to the reference value $THG_0$ after the throttle sensitivity model is complete.

For instance, given a case where the throttle sensitivity Thg, adjusted at the end of the drive start (timing t2), is held at a constant cruising speed (timings t2 to t3) from the point where the start action of the vehicle 1 is ended to the point where the next start action is initiated (see alternate long and two short dashes line) in FIG. 21, if the driver DR requests slow acceleration through the constant speed cruising, the accelerator pedal becomes too sensitive, making acceleration manipulation difficult. If, after the throttle sensitivity Thg is adjusted to a low value due to slow starting, the driving state is shifted to constant speed cruising during which the driver DR requests quick acceleration, the response of the accelerator pedal will be too slow and will also make acceleration manipulation difficult.

According to the third embodiment, however, after the drive-start end condition of the vehicle 1 is satisfied and the learning of the throttle sensitivity model is completed, the throttle sensitivity Thg is forcibly converged to the predetermined reference value $THG_0$. That is, the throttle sensitivity Thg is set back to the reference value $THG_0$ during the period (constant speed cruising) from the point where the start action of the vehicle 1 has ended to the point where the next learning of the throttle sensitivity model is executed. The next processing of the throttle sensitivity model is carried out based on this reference value $THG_0$.

The third embodiment therefore has the same functions and advantages as the first embodiment. In addition, in the case where the driver DR requests slow acceleration (see FIG. 21) during constant speed cruising after the throttle sensitivity Thg is adjusted to a high value, as well as where the driver DR requests quick acceleration, the throttle sensitivity Thg, used as reference data to control the driving of the DC motor 8, becomes the reference value $THG_0$. Accordingly, the change in acceleration G as well as the amount of the manipulation of the accelerator pedal 10 becomes about the same. Since the reference value $THG_0$ is set to a value between the throttle sensitivity Thg suitable for quick start of the vehicle 1 (maximum value $THG_{MAX}$) and the throttle sensitivity Thg suitable for slower start of the vehicle 1 (minimum value $THG_{MIN}$), the manipulation of the accelerator pedal 10 required to control the output of the engine 2 corresponds to any re-acceleration request by the driver DR and matches that re-acceleration request.

In this manner, the influence of the adjustment of the throttle sensitivity Thg on the next learning of the throttle sensitivity model can be eliminated in constant speed cruising.

Figure 20:
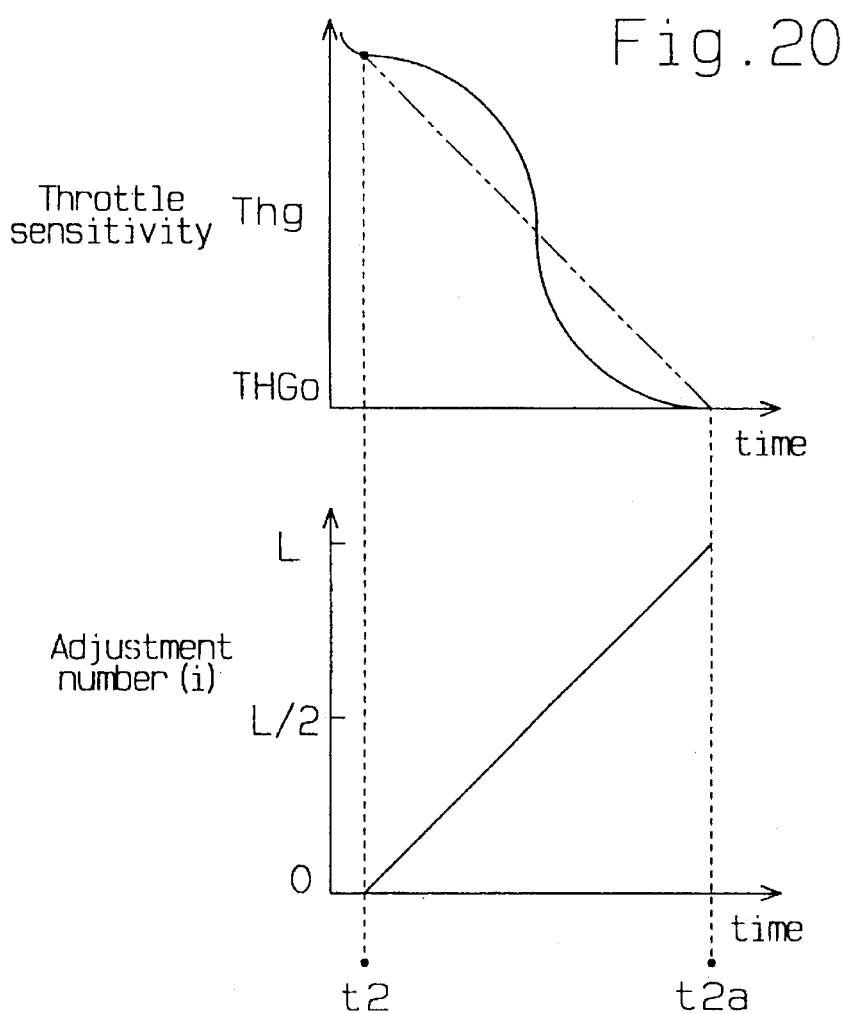

Furthermore, according to the third embodiment, at the time the throttle sensitivity Thg is adjusted after the start action is complete, the throttle sensitivity Thg gradually and smoothly decreases with the passage of time and eventually converges to the reference value $THG_0$, as shown in FIG. 20. While the driver DR may normally feel some pulling impact when the throttle sensitivity Thg sharply changes, the third embodiment of this invention will prevent the driver DR from feeling uncomfortable due to this impact.

Fourth Embodiment

The fourth embodiment of the present invention will now be described with reference to FIGS. 22 through 24.

In the fourth embodiment, when it is determined that the vehicle 1 is at a constant cruising speed, the learning control is suppressed in favor of a preset value that is sent to computer 21 suitable for the constant cruising speed. The other structures are substantially the same as those of the first embodiment, and will be given the same reference numerals to avoid repeating their descriptions. The following description will be centered on the specific differences between the first and fourth embodiments.

Figure 22:
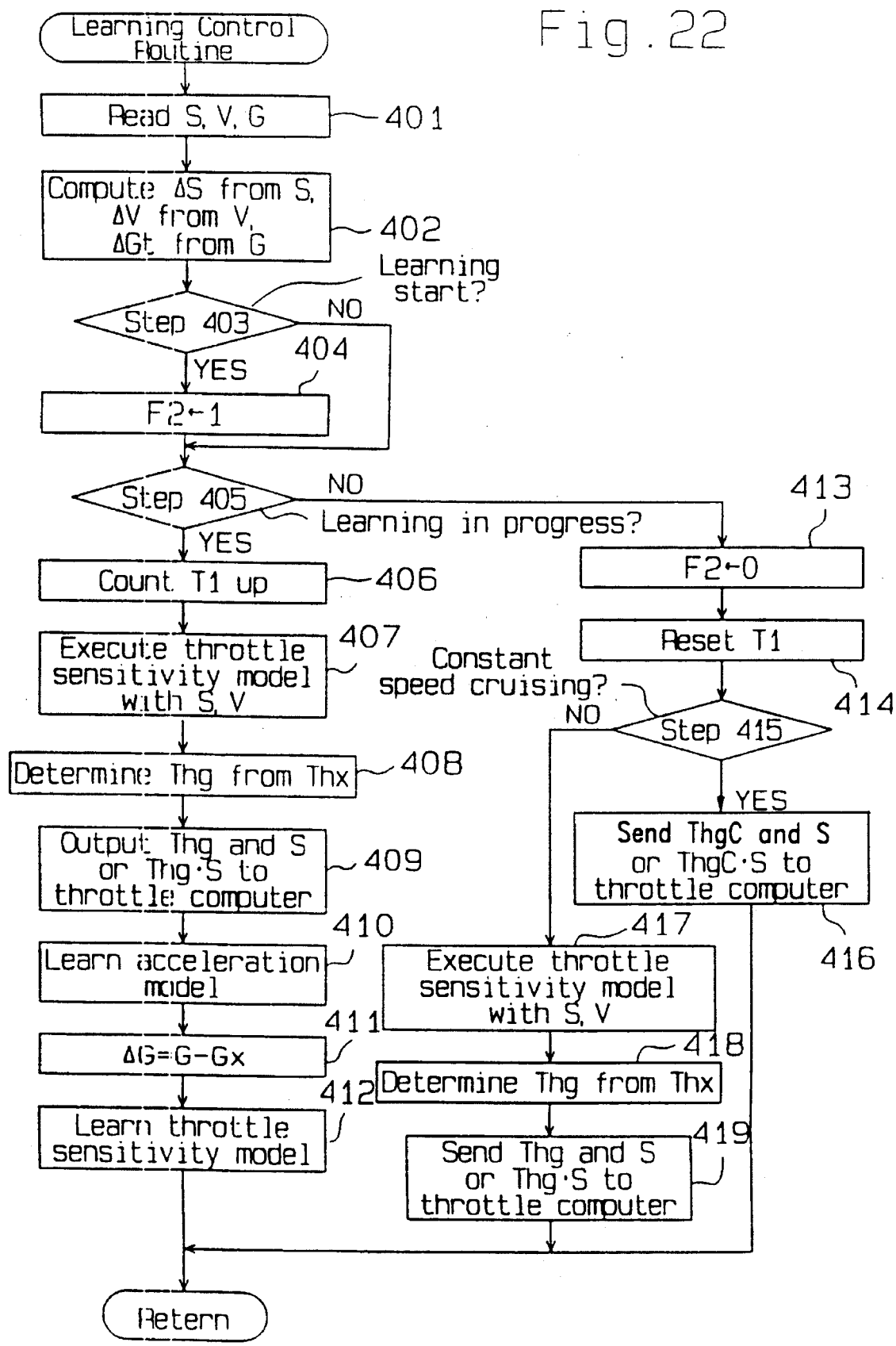
FIGS. 22 through 24 illustrate a fourth embodiment of the present invention.

When a predetermined time ("0.1 sec" in this case) elapses from the start of a previous "learning control routine", the computer 22, in step 401 in FIG. 22, reads the acceleration stroke S, acceleration G and vehicle speed V based on various signals from the accelerator pedal sensor 11, acceleration sensor 12 and vehicle speed sensor 13.

In the next step 402, the computer 22 calculates the amount of change ΔS in acceleration stroke S, the change ΔV in vehicle speed V and the change ΔGt in acceleration G. The magnitude with which ΔS changes is the difference between the current value and the previously read value of the acceleration stroke S. Likewise, the magnitude with which ΔV and ΔGt changes is the difference between the current values and the previously read values of the vehicle speed V and acceleration G respectively.

Following step 402, the computer 22 determines in step 403 if learning is necessary to obtain the throttle sensitivity Thg, i.e., if the learning start condition is met. The learning start condition in the fourth embodiment is satisfied when the absolute value of the amount of change ΔS and the vehicle speed V are greater than their respective arbitrary set values.

When the decision at step 403 is met, the computer 22 sets a learning start flag F2 to "1" in step 404 and then moves to step 405. When the decision condition in step 403 is not met, the computer 22 advances directly to step 405 without executing the process of step 404.

In step 405, the computer 22 determines whether or not the learning operation is progressing according to whether the following three conditions are met: first, the flag F2 is set to "1"; second, the count value T1 is determined to have a value from the beginning of the learning operation of less than a preset value; and third, the vehicle speed V and acceleration stroke S are greater than their respective arbitrary set values.

When the learning operation is not in progress, the conditional at step 405 is not met and the computer 22 advances to step 413. On the other hand, when the condition at step 405 is met, the computer 22 judges that learning operation is to continue, and advances to step 406.

In step 406, the computer 22 increases the count value T1 by "1", and in steps 407 to 412 executes the same processes as those of steps 102 to 105 in FIG. 8. First, in step 407, the computer 22 executes the learning of the "throttle sensitivity models." The computer 21 acquires the throttle sensitivity model output Thx from the "throttle sensitivity model" based on the currently-read acceleration stroke S and vehicle speed V as input values. At the next step 408, the computer 22 determines the throttle sensitivity Thg from the throttle sensitivity model output Thx by the aforementioned equation (1).

The computer 22 sends the throttle sensitivity Thg and acceleration stroke S, to the computer 21 in step 409. Alternatively, the computer 22 multiplies the throttle sensitivity Thg by the acceleration stroke S to obtain a target throttle angle Thg.S and sends the value to the computer 21.

Next, using the acceleration G of the vehicle 1 as "teaching data", the computer 22 learns the "acceleration model" requested by the driver DR in step 410. More specifically, using the acceleration G of the vehicle 1 as "teaching data", the computer 22 learns the relationship among the acceleration stroke S, the vehicle speed V and the acceleration G as the "acceleration model" required by the driver DR, and learns this relationship in such a way as to reduce the deviation contained in the "teaching data".

Subsequently, the computer 22 obtains the deviation acceleration deviation ΔG) between the acceleration G and the acceleration model output Gx at step 411. The computer 22 also learns the "throttle sensitivity model" using the acceleration deviation ΔG as an "error signal" in step 412. In other words, using the acceleration deviation ΔG as the "error signal", the computer 22 learns the relationship among the acceleration stroke S, the vehicle speed V and the throttle angle Th as the "throttle sensitivity model" in such a way as to reduce the error portion of the "error signal".

Learning control using the neural network technology is carried out in this manner, and the particular characteristics of the "acceleration model" required by the driver DR and the "throttle sensitivity model" are processed and learned. Here, the "weighting coefficients" of the synapses sp, as the characteristics of the "acceleration model" and "throttle sensitivity model", which are occasionally learned, are rewritten and stored in the backup RAM 26.

After executing the process of step 412, the computer 22 temporarily terminates the subsequent process. When "0.1 sec" passes after the "learning control routine" has started, the computer 22 executes the sequence of processes starting with step 401 again.

When the condition at step 405 is not satisfied, the computer 22 moves to step 413 to reset the flag F2 to "0" Next, the computer 22 resets the count value T1 since the beginning of the learning to "0" in step 414.

Then, the computer 22 determines if the vehicle 1 is in "constant cruising speed" during which there is less of a change in the vehicle speed V than in step 415. In the fourth embodiment, a "constant cruising speed" is recognized when the combination of the absolute value of the amount of change ΔS, the absolute value of the amount of change ΔV and the absolute value of the amount of change ΔGt are smaller than their respective arbitrary set values.

When the decision condition in step 415 is met, the computer 22, in step 416, suppresses the learning operation and sends a separately preset value in place of the throttle sensitivity Thg or target throttle angle Thg.S. That is, the computer 22 sends the throttle sensitivity ThgC, separately set to a value suitable for a constant cruising speed, along with the acceleration stroke S to the computer 21. Alternatively, the computer 22 multiplies the throttle sensitivity ThgC for the constant cruising speed by the acceleration stroke S to obtain a target throttle angle ThgC S and sends the value ThgC S to the computer 21.

The "throttle sensitivity ThgC for a constant cruising speed" situation is set in accordance with the type of the vehicle 1, the characteristic of the engine 2 and so forth, and it is a predetermined constant value ranging from "0.8" to "1.0" and is stored in advance in the ROM 24. In the fourth embodiment, the throttle sensitivity ThgC for constant speed cruising is set to "0.9".

After executing the process of step 416, the computer 22 temporarily terminates the subsequent process. When "0.1 sec" passes after the current "learning control routine" has started, and the computer 22 executes the sequence of processes starting with step 401 again.

When the decision condition in step 415 is not met, the computer 22 moves to step 417 to execute the learning of the "throttle sensitivity model" as in step 407. More specifically, the computer 22 acquires the throttle sensitivity model output Thx from the characteristic of the already learned "throttle sensitivity model" based on the currently-read acceleration stroke S and vehicle speed V as input values. In the next step 418 as in step 408, the computer 22 determines the throttle sensitivity Thg from the throttle sensitivity model output Thx by the aforementioned equation (1).

The computer 22 then sends the throttle sensitivity Thg and acceleration stroke S to the computer 21 in step 419 as in step 409. Alternatively, the computer 22 multiplies the throttle sensitivity Thg by the acceleration stroke S to obtain a target throttle angle Thg.S and sends the value Thg.S to the computer 21.

After executing the process of step 419, the computer 22 temporarily terminates the subsequent process. When "0.1 sec" passes after the current "learning control routine" has started, the computer 22 executes the sequence of processes starting with step 401 again.

The throttle sensitivity or the target throttle angle in "constant cruising speed" is set in this manner.

Figure 23:
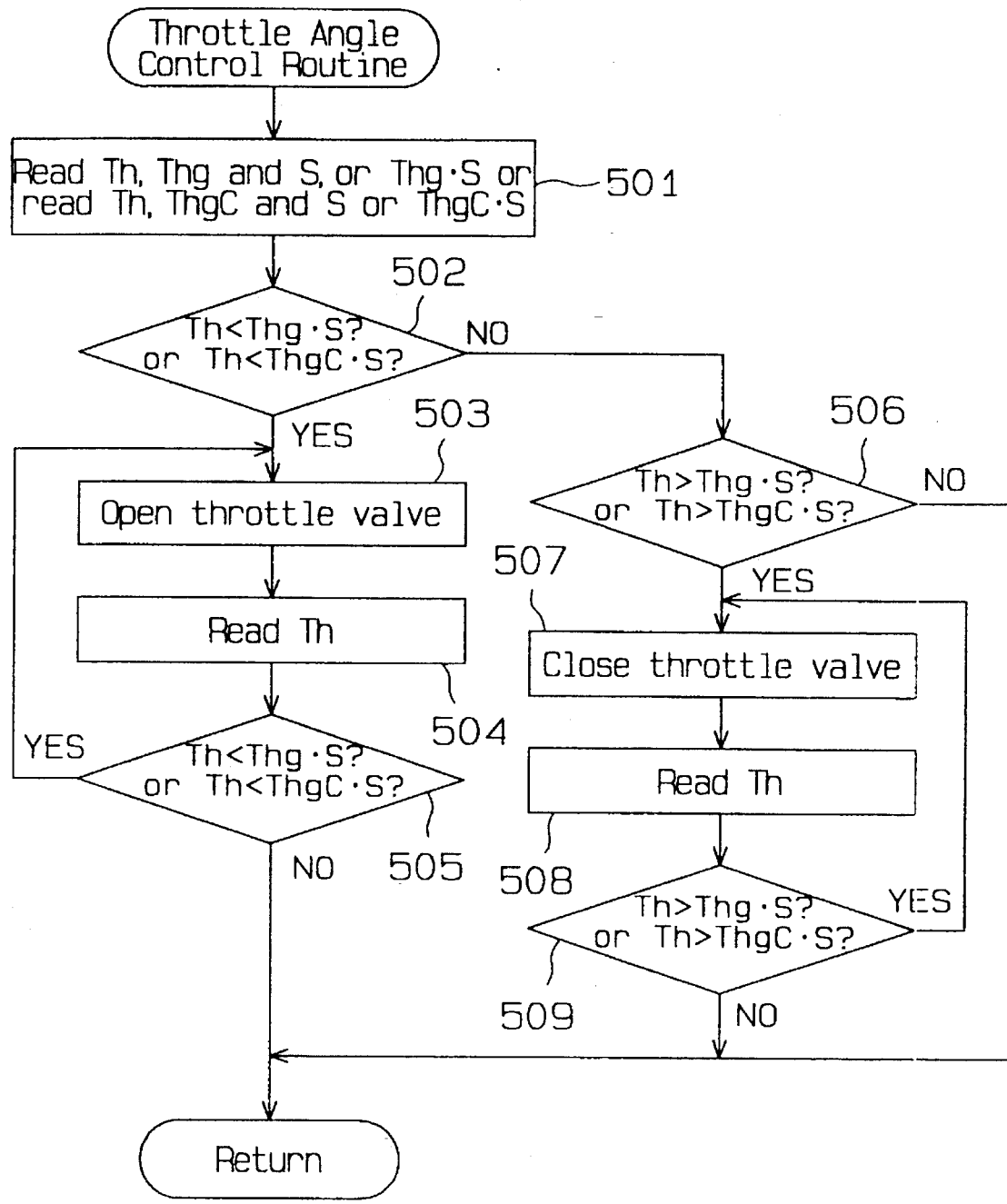

Referring to FIG. 23, a description will now be given of the "throttle angle control routine" that is executed by the computer 21, based on the aforementioned throttle sensitivity Thg or throttle sensitivity ThgC for a constant cruising speed condition, and the acceleration stroke S.

When a predetermined time passes after the previous "throttle angle control routine" has started, the computer 21 executes the process of step 501 first. When executing this step, the throttle sensitivity Thg is to be learned and the computer 21 reads the throttle angle Th based on the signal from the throttle sensor 9. The computer 21 reads the latest throttle sensitivity Thg and acceleration stroke S or target throttle angle Thg.S, as output from the computer 22. If reading of the throttle sensitivity Thg and acceleration stroke S is the premise, the computer 21 multiplies Thg by S to obtain the target throttle angle Thg.S.

In executing step 501 when the vehicle 1 is in "constant speed cruising", in which the throttle sensitivity Thg is not learned, the computer 21 reads the throttle angle Th based on the signal from the throttle sensor 9. The computer 21 reads the latest throttle sensitivity ThgC and acceleration stroke S or target throttle angle Thg.S, output from the computer 22. If reading of the throttle sensitivity ThgC and acceleration stroke S is done, the computer 21 multiplies ThgC by S to obtain the target throttle angle Thg.S.

In the next step 502, the computer 21 determines if the current throttle angle Th is smaller than the target throttle angle Thg.S. Alternatively, the computer 21 determines if the current throttle angle Th is smaller than the target throttle angle Thg.S.

When this condition is met at step 502, the computer 21 rotates the DC motor 8 forward to drive the throttle valve 7 in the opening direction in step 503. Subsequently, the computer 21 reads the throttle angle Th based on the signal from the throttle sensor 9 in step 504.

In step 505, the computer 21 determines again if the throttle angle Th is smaller than the target throttle angle Thg.S or ThgC.S. When this decision condition is met, the computer 21 returns to step 503 and repeats the processes of steps 503, 504 and 505 to further drive the throttle valve 7 in the opening direction. If the decision condition in step 505 is not satisfied, the computer 21, in step 503, determines that it is unnecessary to further drive the throttle valve 7 open, and temporarily terminates the subsequent process.

If the decision condition in the aforementioned step 502 is not satisfied, the computer 21, in step 506, determines if the current throttle angle Th is larger than the target throttle angle Thg.S or ThgC.S. When this condition is not met, the computer 21 determines that the throttle angle Th matches the target throttle angle Thg.S or ThgC.S, and just terminates the subsequent process temporarily.

If the decision at step 506 is satisfied, the computer 21, in step 507, rotates the DC motor 8 backward to drive the throttle valve 7 in the closing direction. Subsequently, the computer 21, at step 508, reads the throttle angle Th based on the signal from the throttle sensor 9.

In step 509, the computer 21 determines if the throttle angle Th is larger than the target throttle angle Thg.S or ThgC.S. When this conditional is met, the computer 21 returns to step 507 and repeats the processes of steps 507, 508 and 509 to further drive the throttle valve 7 in the closing direction. If the decision condition in step 509 is not satisfied, the computer 21 determines that it is unnecessary to further drive the throttle valve 7 in the closing direction, and temporarily terminates the subsequent processes.

In this manner, the rotation of the DC motor 8 is controlled in such a way that the throttle angle Th matches the target throttle angle Thg.S or ThgC.S and the angle of the throttle valve 7 is controlled accordingly. As a result, the amount of air flowing through the air intake passage 3 is adjusted and the output of the engine 2 is controlled. The driving power of the vehicle 1 is controlled as a consequence.

The fourth embodiment therefore has the same function and advantages as the first embodiment. In addition, according to the fourth embodiment, when the vehicle 1 is in "constant speed cruising", the learning operation performed to obtain the throttle sensitivity Thg is suppressed while the throttle sensitivity ThgC, preset in advance as a value suitable for a constant cruising speed condition, will be used.

Further, the opening/closing of the throttle valve 7 is controlled in such a way that the target throttle angle ThgC.S, obtained by multiplying the throttle sensitivity ThgC by the acceleration stroke S, matches the throttle angle Th.

When the vehicle shifts its driving state to a constant cruising speed condition from that of accelerated cruising, the angle of the throttle valve 7 is adjusted in accordance with the amount that the accelerator pedal 10 is manipulated. This throttle adjustment is based on the target throttle angle ThgC.S suitable for a constant cruising speed condition rather being based on the target throttle angle Thg.S learned at the acceleration time.

Figure 24:
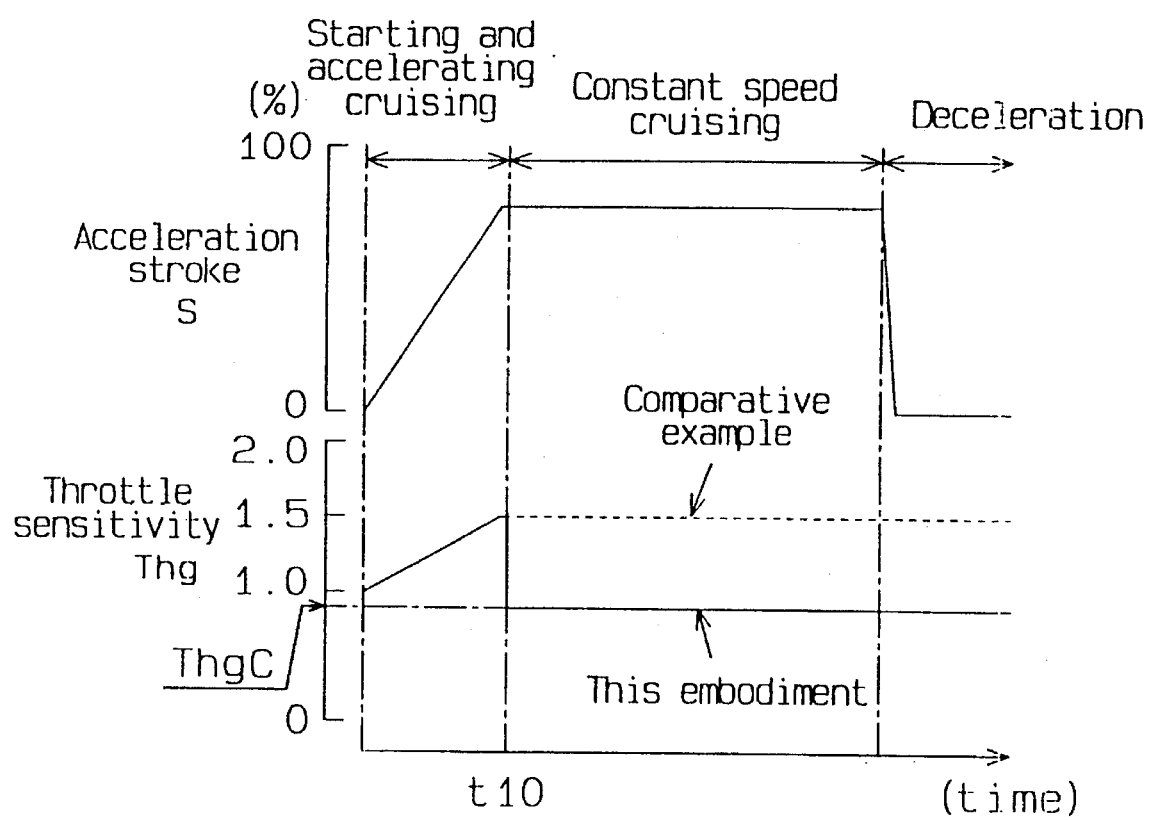

Suppose that in FIG. 24 the throttle sensitivity Thg is finally determined to be a relatively high value of "1.5" through learning while the vehicle 1 is in a starting and accelerating cruising condition. Also suppose that the vehicle 1 changes to constant speed cruising at time t10 after the starting and accelerating cruising. In this case, the high throttle sensitivity Thg, determined to be "1.5" through learning, is immediately changed to a relatively low throttle sensitivity ThgC of "0.9", which is suitable for a constant cruising speed condition, as indicated by the solid line in FIG. 24. Thereafter, this throttle sensitivity ThgC is maintained until the accelerating cruising starts again. This result is apparent when one compares it with the change in throttle sensitivity Thg in a comparative example as indicated by the broken line in FIG. 24. The angle of the throttle valve 7 will be adjusted on the basis of the target throttle angle ThgC.S obtained from that throttle sensitivity ThgC.

By these means it is possible to improve the controllability of the accelerator pedal in order to reflect the intention of the driver DR regarding the control of the driving power of the vehicle 1 in constant speed cruising. More specifically, when the driver DR is requesting constant speed cruising, the throttle sensitivity is prevented from becoming unnecessarily high. This prevents the vehicle speed V from changing greatly in response to a slight change in acceleration stroke S. Thus when the vehicle 1 is in a constant cruising speed condition, an improved driving performance results, which, in turn, helps the overall ability of the driver to maintain proper driving control over the car.

Fifth Embodiment

The fifth embodiment of the present invention will be described with reference to FIGS. 25 through 30. In the fifth embodiment, when it is determined that the vehicle 1 is in turning, the learning control is released and the learning result obtained by the computer 22 is changed to a value separately set and suitable for a vehicle undergoing a turning movement. The other structures are substantially the same as those of the first embodiment, and will be given the same reference numerals to avoid repeating their descriptions. The following description will be centered on the specific differences between the first and fifth embodiments.

Figure 25:
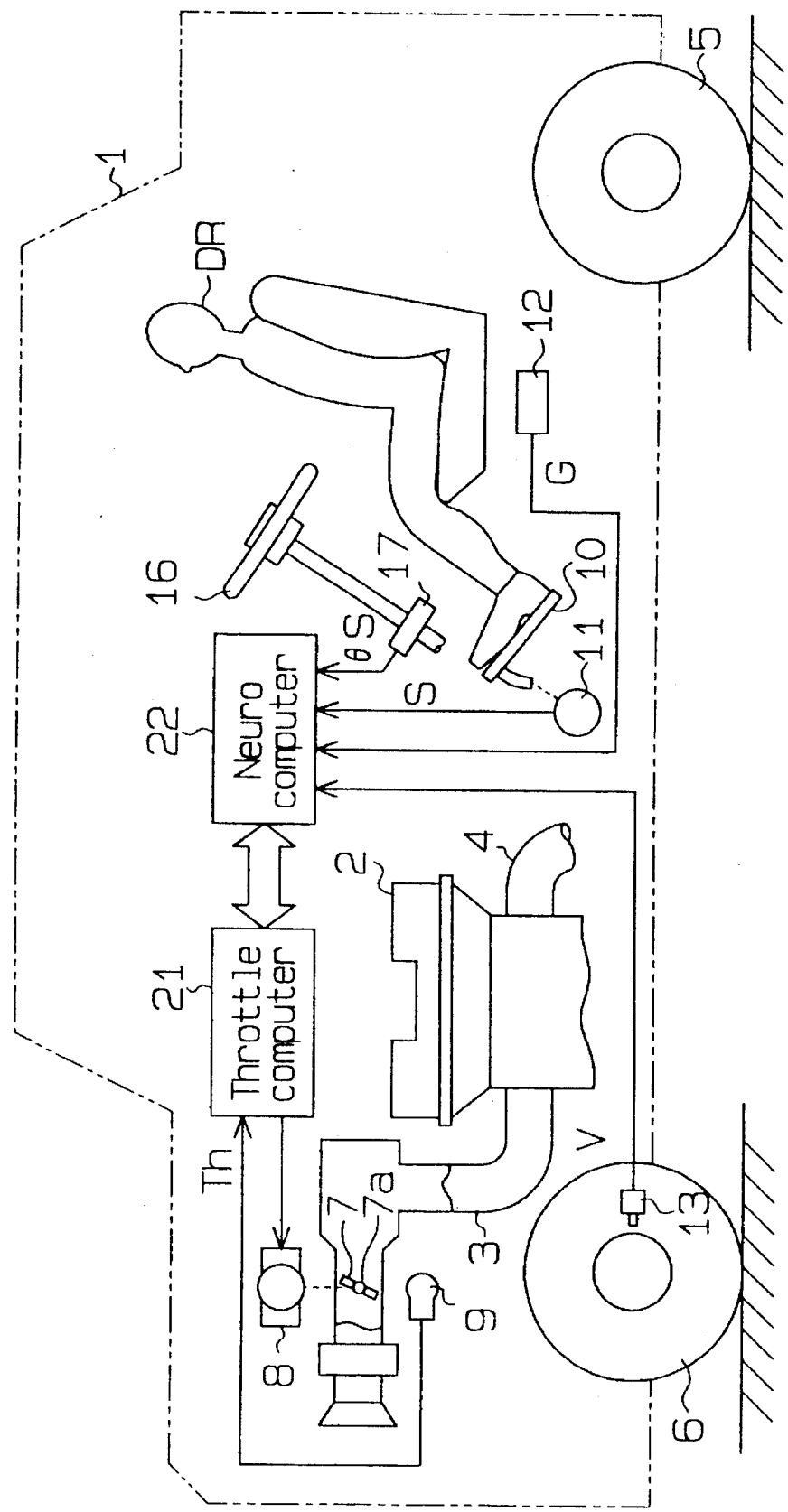
FIGS. 25 through 30 illustrate a fifth embodiment of the present invention.

As shown in FIG. 25, a steering wheel 16 is provided at the driver's seat in the vehicle 1 for steering both front wheels. The steering wheel 16 is fitted with a steering sensor 17 for detecting the steering angle θS, the value of which is communicated to the neuro computer 22.

Figure 26:
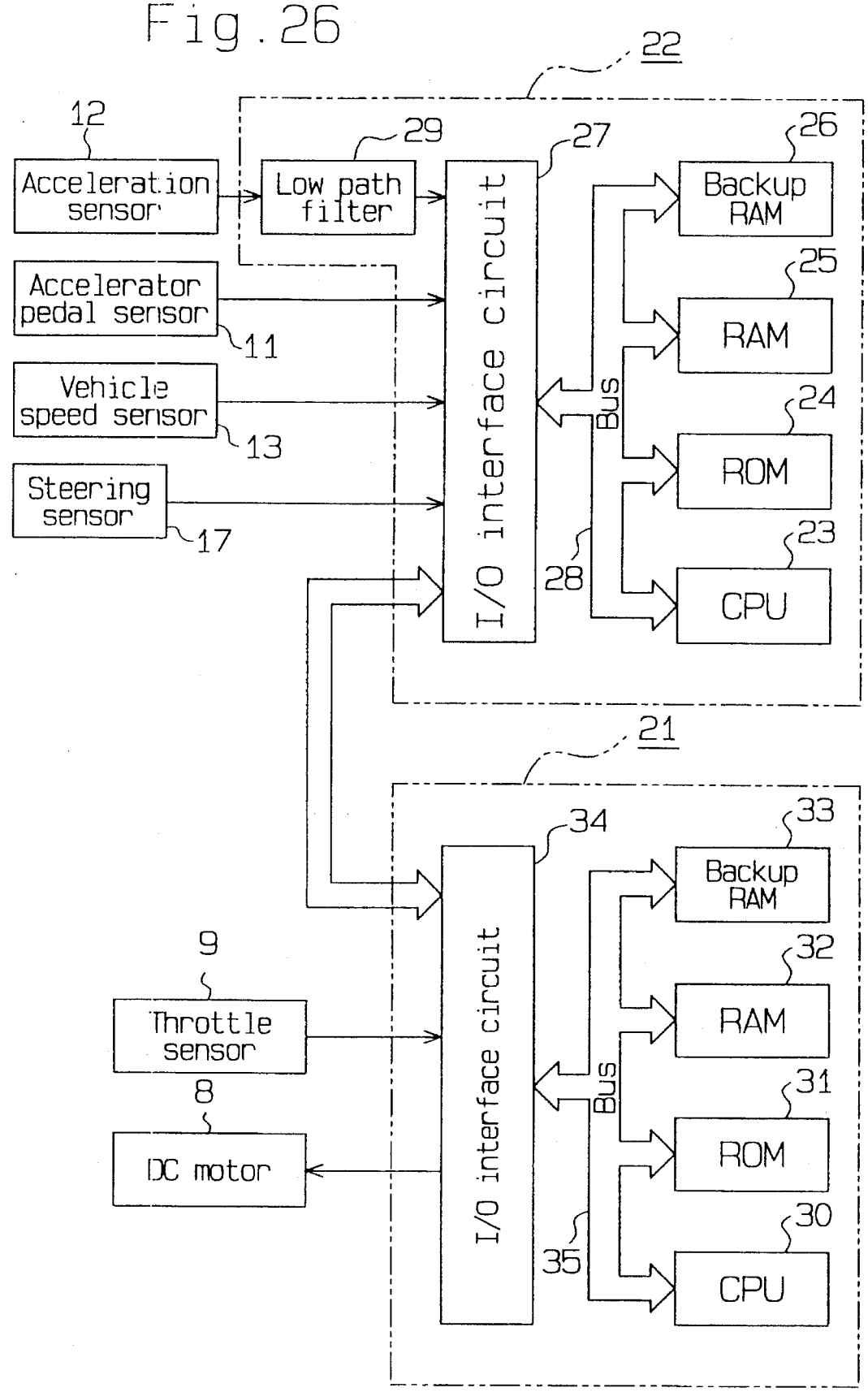

As shown in FIG. 26, in addition to the individual sensors 11 to 13, the steering sensor 17 is connected to the I/O interface circuit 27 of the computer 22. Various signals from sensors 11–13 and 17 are input via the I/O interface circuit 27 to the CPU 23.

Figure 27:
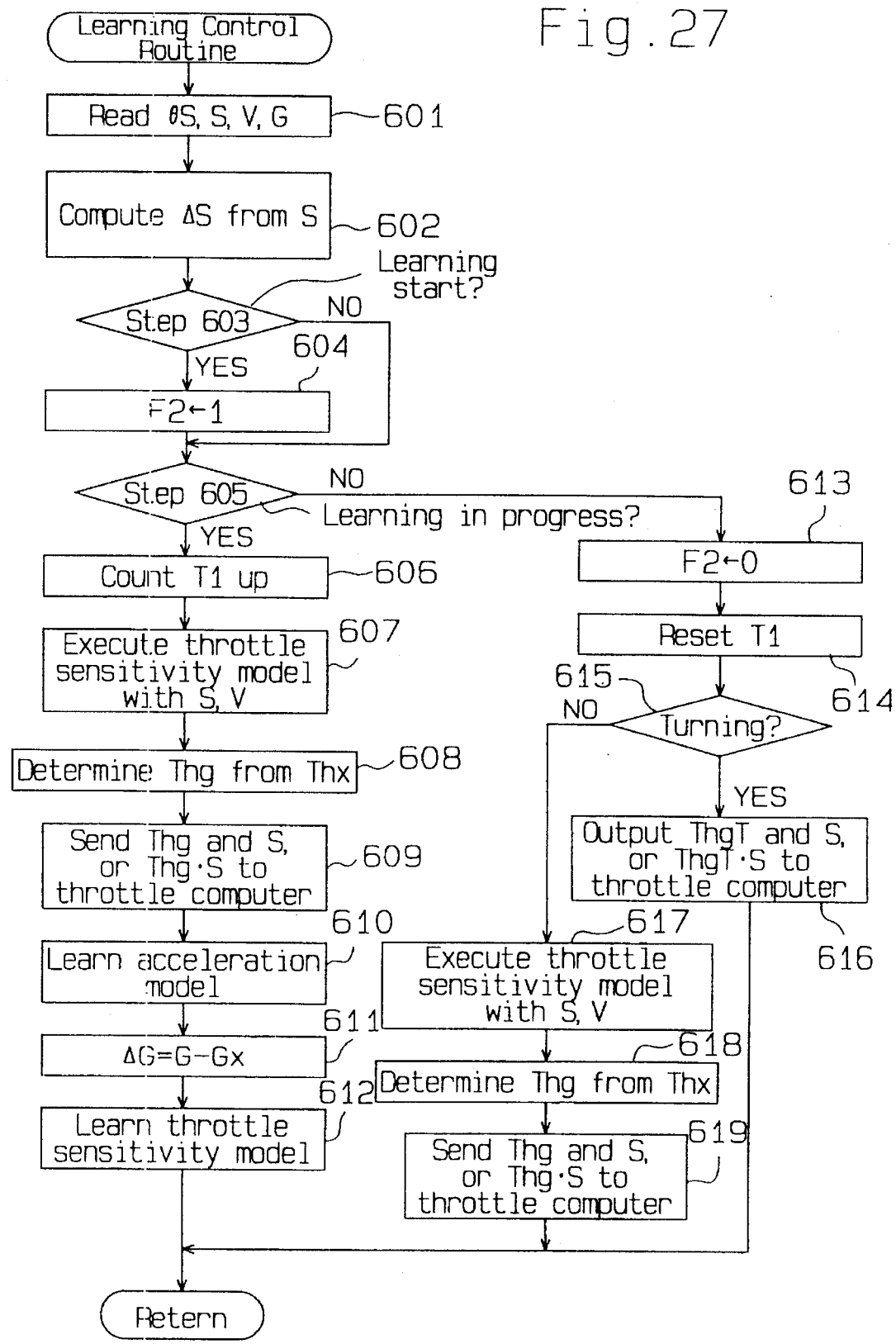
Figure 28:
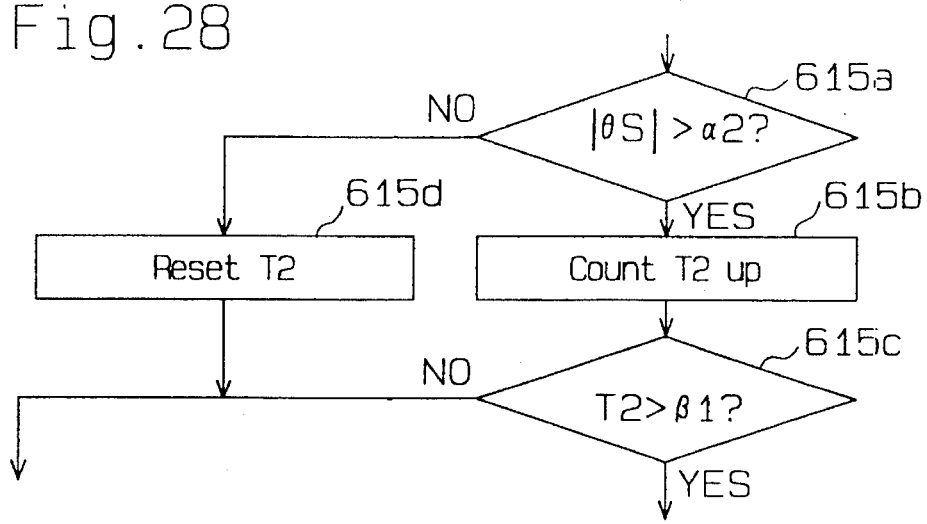

FIG. 27 illustrates a learning control routine corresponding to what is shown in FIG. 8. When a predetermined time ("0.1 sec" in this case) has elapsed from the beginning of a previous learning control routine, the computer 22, in step 601, reads the steering angle θS, acceleration stroke S, acceleration G and vehicle speed V based on various signals from the steering sensor 17, accelerator pedal sensor 11, acceleration sensor 12 and vehicle speed sensor 13.

In the next step 602, from the acceleration stroke S, the computer 22 calculates the amount of change ΔS in acceleration stroke S. The magnitude of change ΔS detected is the difference between the current value and the previously read value of the acceleration stroke S.

Then, in step 603, the computer 22 determines if learning is to be started to obtain the throttle sensitivity Thg, i.e., if the learning start condition is met. The learning start condition is the same as what has already been explained in the fourth embodiment, and it is satisfied when the absolute value of the amount of change ΔS and the vehicle speed V are greater than their respective preset values.

When the decision condition in step 603 is met, the computer 22 sets a learning start flag F2 to "1" in step 604 and then moves to step 605. When the condition 603 is not met, the computer 22 advances directly to step 605 without executing the process of step 604.

In step 605, the computer 22 determines whether or not the learning operation should continue based on three conditions: first, whether flag F2 is "1"; second, whether the count value T1, from a time when the learning operation was initialized, has a value smaller than a preset value; and third, whether the vehicle speed V and acceleration stroke S are greater than preset values.

When the decision condition in step 605 is not met, the computer 22 judges that the learning operation is not to be carried out, and advances to step 613. On the other hand, when this the learning operation is to be carried out, the computer 22 advances to step 606 where the count value T1 is increased by "1". Later, in steps 607 to 612, the computer 22 executes the same processes as those of steps 102 to 105 in FIG. 8.

First, in step 607, the computer 22 acquires the throttle sensitivity model output Thx from the characteristic (see FIG. 7) of the previously learned "throttle sensitivity model" based on the current values read for the acceleration stroke S and vehicle speed V. In the next step 608, the computer 22 determines the throttle sensitivity Thg from the throttle sensitivity model output Thx by the aforementioned equation (1).

The computer 22 sends the new values for throttle sensitivity Thg and acceleration stroke S to the computer 21 in step 609. Alternatively, the computer 22 multiplies the throttle sensitivity Thg by the acceleration stroke S to obtain a target throttle angle Thg.S and sends the value to the computer 21.

Next, using the acceleration G of the vehicle 1 as "teaching data", the computer 22, in step 610, learns the "acceleration model" requested by the driver DR. More specifically, using the acceleration G of the vehicle 1, detected by the acceleration sensor 12, as "teaching data" to be compared, the computer 22 learns the relationship among the acceleration stroke S, the vehicle speed V and the acceleration G as the "acceleration model" required by the acceleration demands of driver DR. This learning is done in such a way as to reduce the deviation to the "teaching data".

Subsequently, the computer 22, in step 611, obtains the deviation (acceleration deviation ΔG) between the acceleration G and the acceleration model output Gx. Then, the computer 22, in step 612, learns the "throttle sensitivity model" using the acceleration deviation ΔG as an "error signal". Thus, using the acceleration deviation ΔG as the "error signal", the computer 22 learns the relationship among the acceleration stroke S, the vehicle speed V and the throttle angle Th as the "throttle sensitivity model" in such a way as to reduce the error portion of the "error signal".

Learning control using the neural network technology is carried out in this manner by processing the characteristics of the "acceleration model" and the "throttle sensitivity model". During this operation, the "weighting coefficients" of the synapses sp as the characteristics of the "acceleration model" and "throttle sensitivity model" are rewritten and stored in the backup RAM 26.

After executing the process of step 612, the computer 22 temporarily terminates any subsequent processing. When a certain period of time elapses, e.g., "0.1 sec", from when the current "learning control routine" had started, the computer 22 executes the sequence of processes starting with step 601 again.

When the conditional at step 605 is not met, i.e., when the learning process is not continuing, the computer 22 moves to step 613 to reset the flag F2 to "0". Next, the computer 22 resets the count value T1 to "0" in step 614.

Next, the computer 22 carries out in steps 615–619 the operations necessary for implementing the learning procedure during a "turning" motion of the vehicle. Specifically, the computer 22 determines first at step 615 if the vehicle 1 is "turning" as illustrated in the flowchart shown in FIG. 28. That is, in step 615a the computer 22 determines whether or not the absolute value of the currently read steering angle θS is larger than an arbitrary set value α2. When this decision condition is met (θS>α2), the computer 22 moves to step 615b to increase the count value T2 of the counter by "1".

In the next step 615c, the computer 22 determines whether or not the count value T2 is larger than an arbitrary set time β1. When this decision condition is met (T2>β1), the computer 22 judges that the vehicle 1 is "turning" because the steering angle θS exceeds the set value α2 for a given time period and then moves to step 616.

When the decision condition in step 615c is not satisfactory (T2≦β1), the computer 22 judges that the vehicle 1 is not "turning" and moves to step 617.

When the decision condition in step 615a is not satisfactory (|θ|≦α2), the computer 22 judges that the vehicle 1 is not "turning" and resets the count value T2 to "0" in step 615d before moving to step 617.

At step 616 in FIG. 27, this step having been reached from the aforementioned step 615c, the computer 22 suppresses the learning control operation and sends a separate preset value in place of the throttle sensitivity Thg or target throttle angle Thg.S, which would have been processed by the learning operation, to the computer 21. That is, the computer 22 sends the throttle sensitivity ThgT for turning, separately set and suitable for the turning of the vehicle 1, together with the acceleration stroke S to the computer 21. Alternatively, the computer 22 multiplies the throttle sensitivity ThgT by the acceleration stroke S to obtain a target throttle angle ThgT.S and sends that value to the computer 21.

The "throttle sensitivity ThgT" is set in accordance with the type of the vehicle 1, the characteristic of the engine 2 and so forth, and it is a predetermined constant value ranging from "0.8" to "1.0" and stored in advance in the ROM 24. In the fifth embodiment, the throttle sensitivity ThgT is set to "0.9".

After executing the process at step 616, the computer 22 temporarily terminates any subsequent processing. When "0.1 sec" elapses after the current "learning control routine" has started, the computer 22 executes the sequence of processing starting with step 601 once again.

At step 617, the computer 22 executes the operation involved in learning the "throttle sensitivity model" as in step 607. More specifically, the computer 22 acquires the throttle sensitivity model output Thx from the previously learned "throttle sensitivity model" based on the current values for the acceleration stroke S and vehicle speed V as input values. In the next 618 as in step 608, the computer 22 determines the throttle sensitivity Thg from the throttle sensitivity model output Thx by the aforementioned equation (1).

The computer 22, in step 619, then sends the current values for the throttle sensitivity Thg and acceleration stroke S to the computer 21, as it had in step 609.

Alternatively, the computer 22 multiplies the throttle sensitivity Thg by the acceleration stroke S and obtains a target throttle angle Thg.S and sends that value to the computer 21.

After executing the process at step 619, the computer 22 temporarily terminates any subsequent processing. Following the elapse of a certain period of time, e.g., "0.1 sec", from the beginning of the "learning control routine", the computer 22 executes the sequence of processing starting with step 601.

Figure 29:
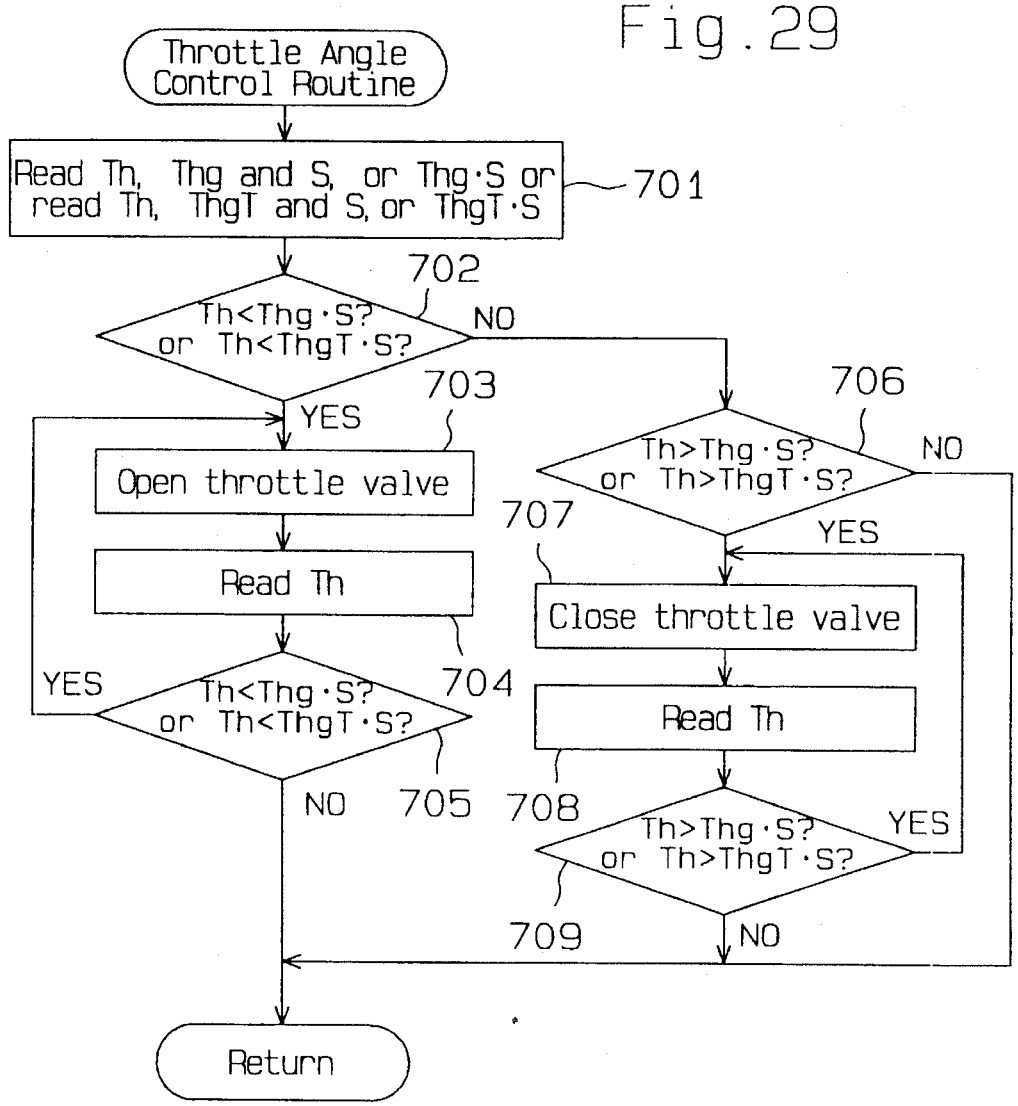

Referring now to FIG. 29, a description will be given of the "throttle angle control routine" that is executed by the computer 21.

When a predetermined time passed after the beginning of the previous throttle angle control routine, the computer 21 executes the process of step 701. In executing this process, where the throttle sensitivity Thg is to be learned, the computer 21 reads the throttle angle Th based on the signal from the throttle sensor 9. The computer 21 reads current values for the throttle sensitivity Thg and acceleration stroke S or target throttle angle Thg.S, which are output from the computer 22. If a pair of data, Thg and S are read, the computer 21 multiplies Thg by S to obtain the target throttle angle Thg.S.

If step 701 is executed at a time when the vehicle 1 is in a "turning state" and if the throttle sensitivity Thg has not been learned, the computer 21 reads the throttle angle Th based on the signal from the throttle sensor 9. The computer 21 then reads the latest throttle sensitivity ThgT and acceleration stroke S or the target throttle angle ThgT.S, which is output from the computer 22. If the pair of data, ThgT and S, is read, the computer 21 multiplies ThgT by S to obtain the target throttle angle ThgT.S.

In the next step 702, the computer 21 determines if the current throttle angle Th is smaller than the target throttle angle Thg.S or whether the current throttle angle Th is smaller than the target throttle angle Thg.S. Having made this decision, the computer 21 at step 703 drives the throttle valve 7 by rotating DC motor 8 forward in the open direction.

Subsequently, the computer 21, in step 704, reads the throttle angle Th based on the signal from the throttle sensor 9.

In step 705, the computer 21 redetermines whether the throttle angle Th is smaller than the target throttle angle Thg.S or if the throttle angle Th is smaller than the target throttle angle ThgT.S. Having made this determination, the computer 21 returns to step 703 and repeats the processes of steps 703 to 705 to further drive the throttle valve 7 in the opening direction.

On the other hand, if the conditional in step 705 is not met, the computer 21 determines that it is unnecessary to further drive the throttle valve 7 open, and temporarily terminates any subsequent processing.

If the conditional in the step 702 is not satisfied, the computer 21 moves to step 706 to determine if the current throttle angle Th is larger than the target throttle angle Thg.S. Alternatively, the computer 21 determines if the current throttle angle Th is larger than the target throttle angle ThgT.S. When this conditional is not met, the computer 21 determines that the throttle angle Th corresponds to the target throttle angle Thg.S or ThgT.S, and temporarily terminates any subsequent processing.

If the conditional in step 706 is satisfied, the computer 21, in step 707, rotates the DC motor 8 backward to drive the throttle valve 7 toward a closed position. Next, in step 708, the computer 21 reads the throttle angle Th based on the signal from the throttle sensor 9.

In step 709, the computer 21 determines again if the throttle angle Th is larger than the target throttle angle Thg.S or the target throttle angle ThgT.S. When this conditional is met, the computer 21 returns to step 707 and repeats the processes of steps 707 to 709 to further drive the throttle valve 7 toward the closed position. If the conditional in step 709 is not met, the computer 21 determines that it is unnecessary to further drive the throttle valve 7 closed and temporarily terminates any subsequent processing.

In this manner, the rotation of the DC motor 8 is controlled in such a way that the throttle angle Th matches with the target throttle angle Thg.S or ThgT.S, and the angle of the throttle valve 7 is controlled accordingly.

As a result, the amount of air flowing through the air intake passage 3 is adjusted and the output of the engine 2 is controlled. The driving power of the vehicle 1 is controlled as a consequence.

The fifth embodiment therefore has the same function and advantages as the first embodiment. In addition, according to the fifth embodiment, when the vehicle 1 is in a "turning state", the operation for the computer 21 for learning the throttle sensitivity Thg is suppressed and the throttle sensitivity ThgT for turning will be used in place of the throttle sensitivity Thg. Furthermore, the opening/closing of the throttle valve 7 is controlled in such a way that the set target throttle angle ThgT.S for turning, obtained by multiplying the throttle sensitivity ThgT by the acceleration stroke S, matches the throttle angle Th.

When the vehicle 1 shifts its driving state to that of turning from that of accelerated straight cruising, the angle of the throttle valve 7 is adjusted in accordance with the amount of the manipulation of the accelerator pedal 10, based on the target throttle angle ThgT.C for turning instead of the target throttle angle Thg.S which is learned at the acceleration time. Such an adjustment of the throttle valve 7 will make the manipulation of pedal 10 more comfortable to the vehicle's driver.

Figure 30:
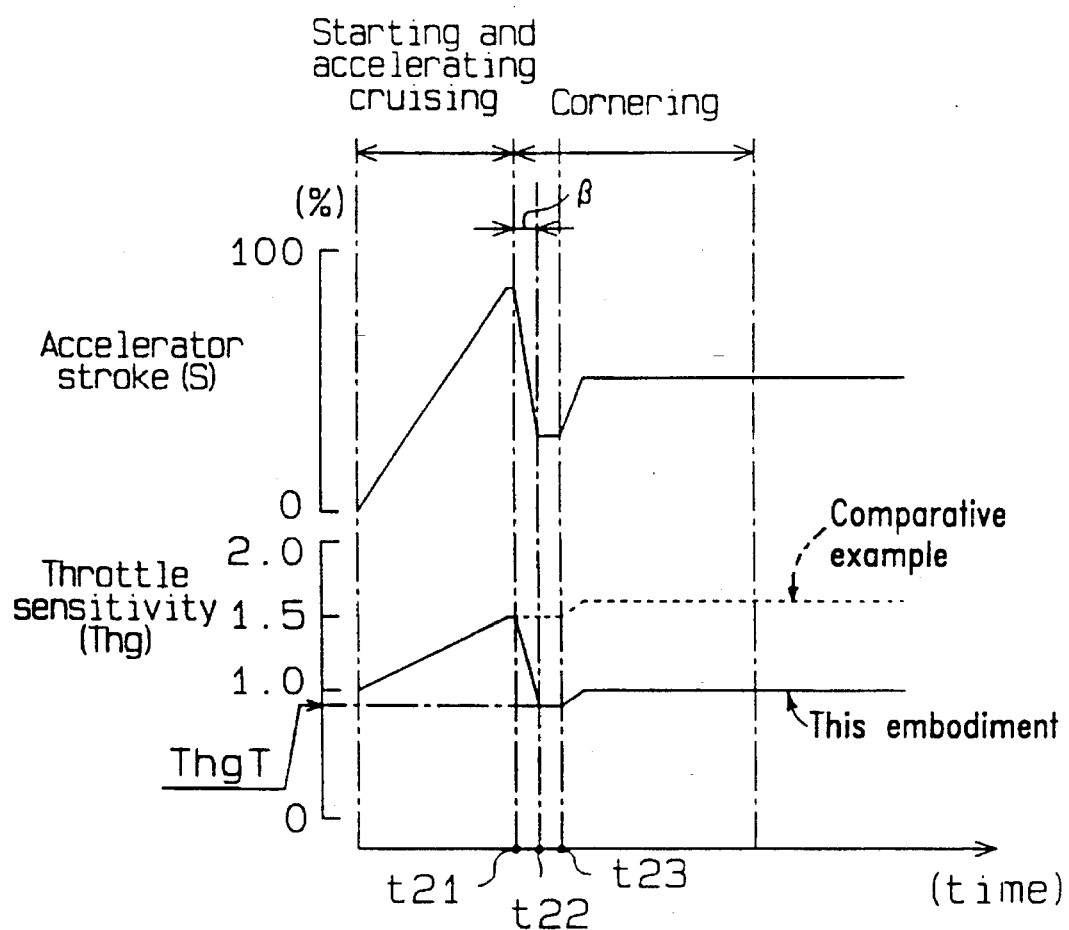

Suppose that in FIG. 30, the throttle sensitivity Thg is finally determined to be a relatively high value of "1.5" either while the vehicle 1 is in starting or in accelerating condition. Also suppose that at time t21 after starting the vehicle 1, the driver DR releases the accelerator pedal 10 while turning the steering wheel 16.

In this case, the high throttle sensitivity Thg, determined to be "1.5" through the computer's learning process, is changed during the period β1 to a relatively low throttle sensitivity ThgT of "0.9" which is a setting suitable for turning at time t22.

Thereafter, this throttle sensitivity ThgT for turning is maintained until the driver DR manipulates the accelerator pedal 10 and steering wheel 7 to positions indicative of straight line acceleration or deceleration.

Even if learning is carried out by the driver DR stepping on the accelerator pedal 10 after time t23 and the throttle sensitivity Thg changes slightly, the throttle sensitivity Thg will not become unnecessarily high during a period from that time to a point at which the next large acceleration is made. This is apparent by comparison with a change in throttle sensitivity Thg of a comparative example indicated by the broken line in FIG. 30. The angle of the throttle valve 7 will be adjusted on the basis of the target throttle angle Thg.S, obtained from that throttle sensitivity ThgT, or on the basis of a target throttle angle close to the former throttle angle.

That is, according to the fifth embodiment, when the vehicle 1 begins to execute a cornering motion after quick start, the throttle sensitivity is properly suppressed. Changes to vehicle speed V and acceleration G remain small with respect to the acceleration stroke S. Good maneuverability and operational performance can thus be maintained for the driver DR during vehicle cornering or turning.

On the other hand, when the vehicle 1 makes one or any number of quick turns after gentle start, the throttle sensitivity Thg increases as does vehicle speed V and acceleration G with respect to the acceleration stroke S. Thus, in critical turning situations, for example, a relatively high sensitivity to the vehicle's acceleration may be maintained for good maneuverability and operational performance, both of which tend to reduce the weariness of the driver.

Sixth Embodiment

The sixth embodiment of the present invention will be described with reference to FIGS. 31 through 36.

In the sixth embodiment, when the vehicle 1 is in "reverse", "park" or "stop", the learning control operations are suppressed and the learning result is provided to the computer using a preset value. The other structures of the present embodiment are substantially similar to that of the first embodiment, and will be given the same reference numerals to avoid repeating their descriptions. The following description will focus on the specific differences between the first and the sixth embodiments.

Figure 31:
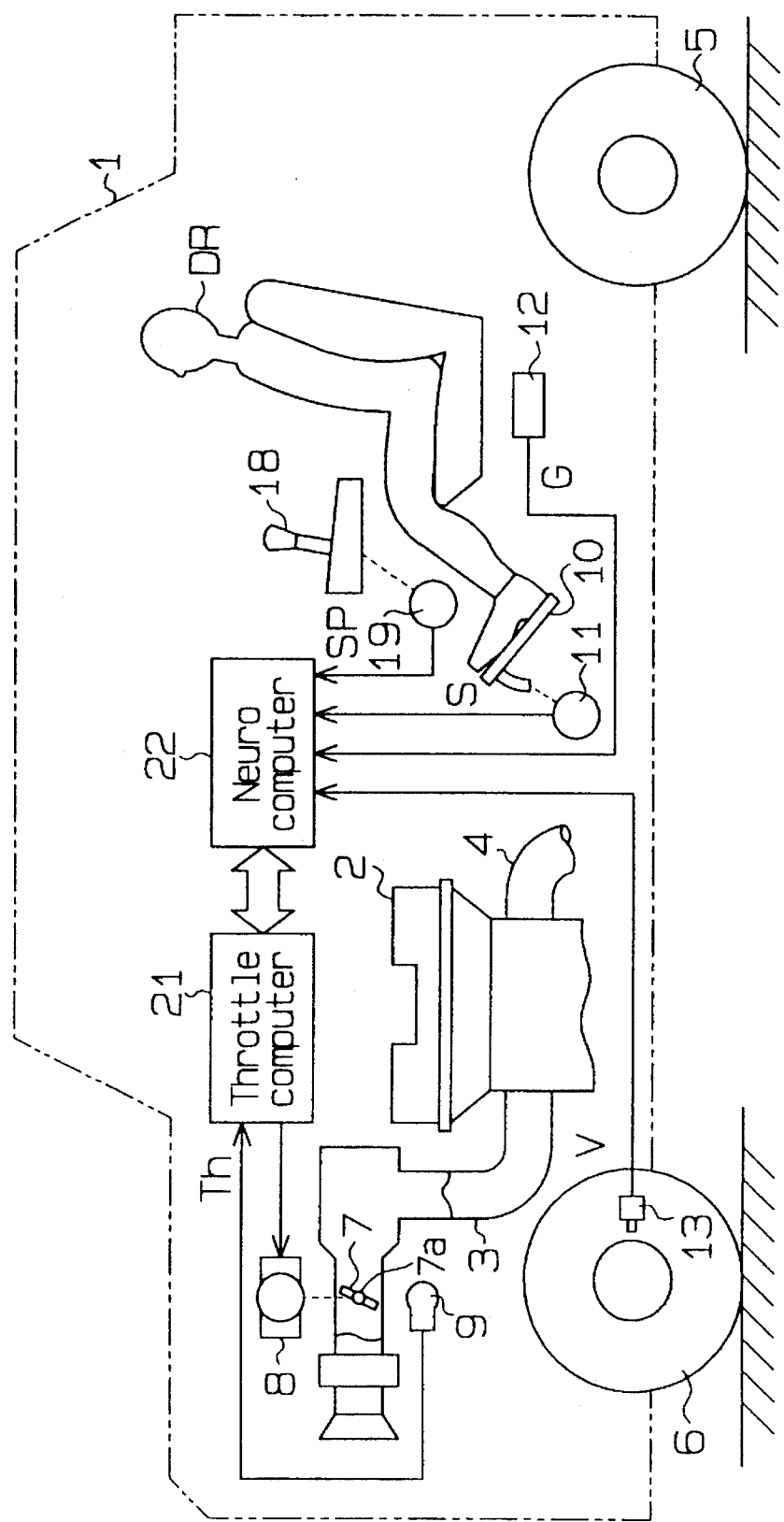
FIGS. 31 through 36 illustrate a sixth embodiment of the present invention.

As shown in FIG. 31, an automatic transmission is driveably coupled to the engine 2 with shift lever 18 provided near the driver's seat for changing the shift position SP of the transmission. In the sixth embodiment, the shift position SP can be changed from the "parking range (P)", "reverse range (R)", "neutral range (N)", "drive range (D)" or the like by the operation of the shift lever 18. The "parking range (P)" is used for a parked vehicle 1, the "reverse range (R)" for operating the vehicle in a reversed direction, and the "neutral range (N)" is used to allow the vehicle's 1 engine to turn while the vehicle 1 is stopped. The other positions including "drive range (D)" are used to drive the vehicle 1 forward.

Provided near the shift lever 18 is a shift position sensor 19 for detecting each shift position SP that is switched by the operation of the shift lever 18. The shift position sensor 19 is connected to the neuro computer 22.

Figure 32:
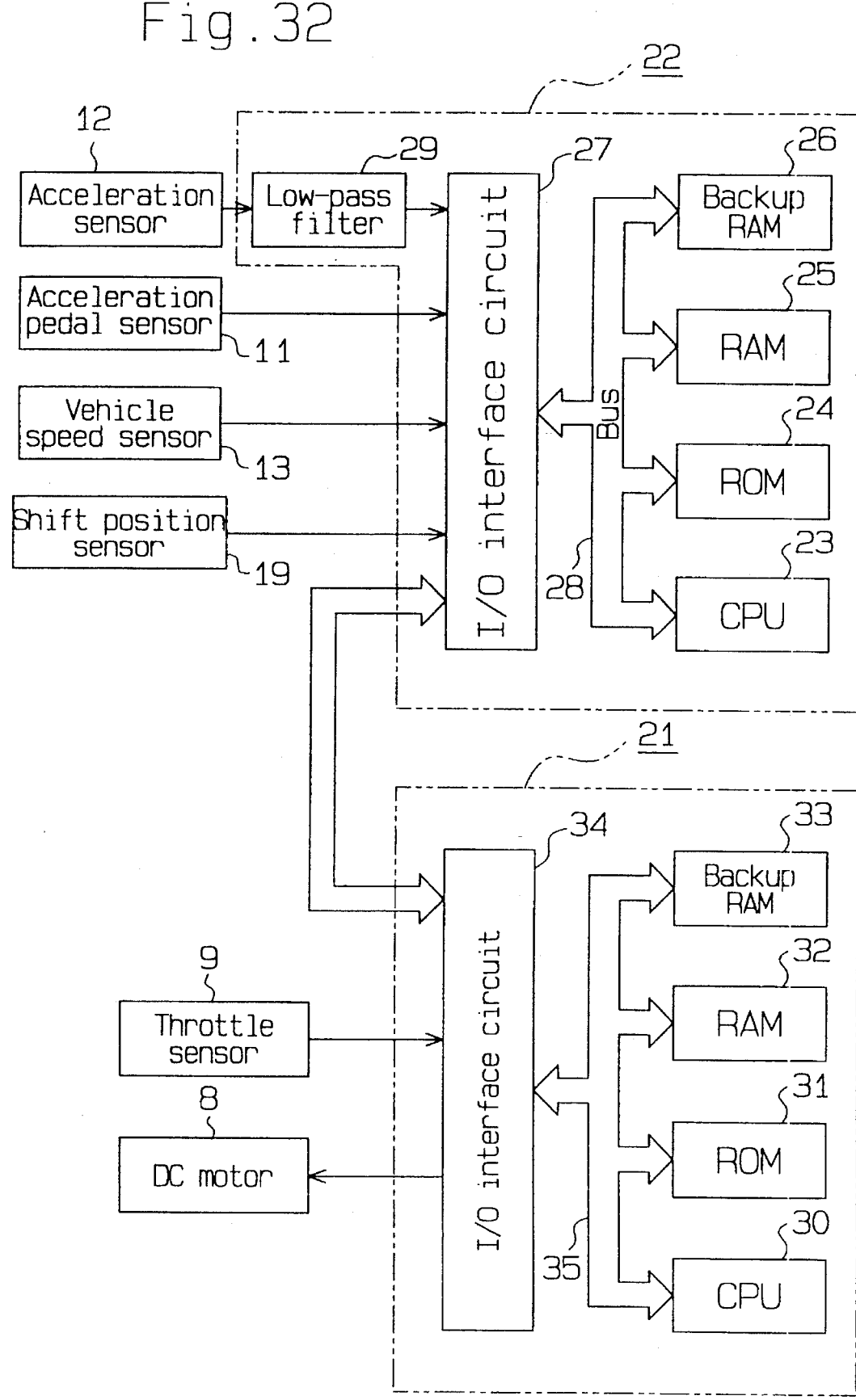

As shown in FIG. 32, the shift position sensor 19 as well as the aforementioned individual sensors 11 to 13 are connected via the I/O interface circuit 27 to the computer 22.

Various signals from those sensors 11–13 and 19 are input via the I/O interface circuit 27 to the CPU 23.

Figure 33:
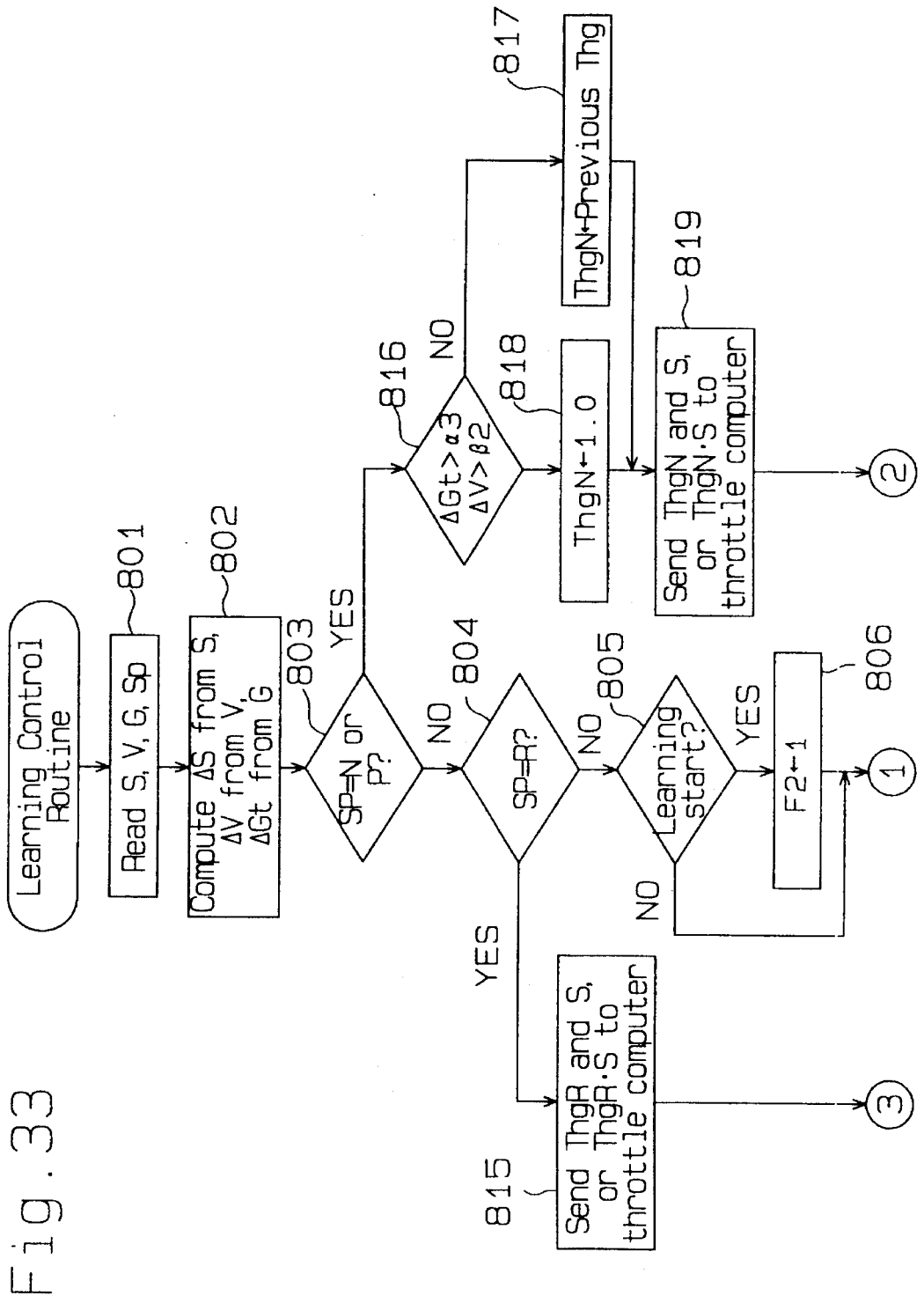
Figure 34:
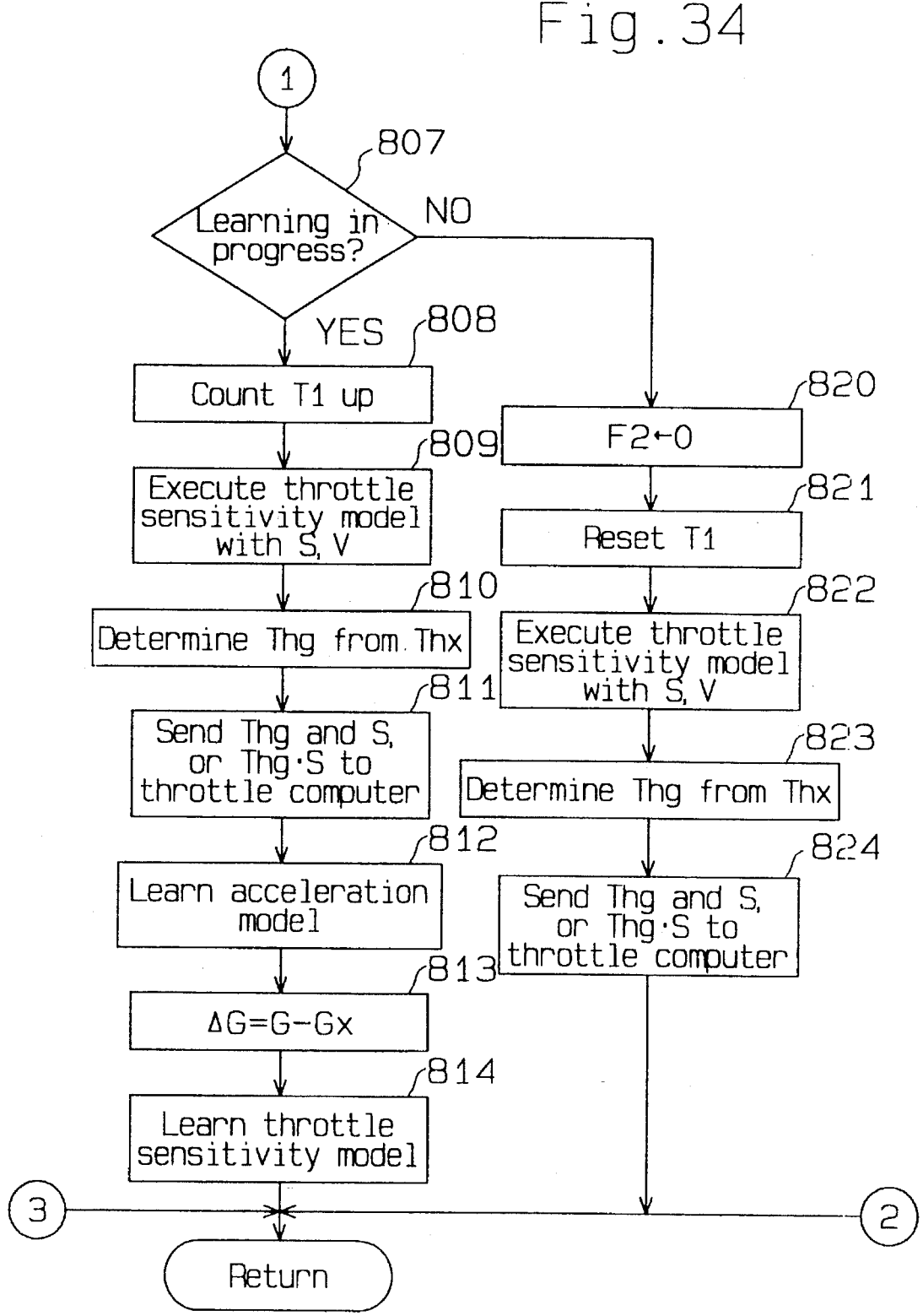

FIGS. 33 and 34 illustrate a learning control routine corresponding to what is shown in FIG. 8. After the elapse of a predetermined time ("0.1 sec" in this case) from the beginning of the previous learning control routine, the computer 22 at step 801 reads the acceleration stroke S, acceleration G, vehicle speed V and shift position SP based on various signals from the accelerator pedal sensor 11, acceleration sensor 12, vehicle speed sensor 13 and shift position sensor 19.

In the next step 802, the computer 22 calculates the amount of change $\Delta S$ in acceleration stroke S, the amount of change $\Delta V$ in vehicle speed V and the amount of change $\Delta Gt$ in acceleration G. The amount of change $\Delta S$ is the difference between the current value and the previously read value of the acceleration stroke S. Likewise, the amount of change $\Delta V$ and $\Delta G$ represent the difference between the current and previously read values of the vehicle speed V and the acceleration G respectively.

In the next step 803, the computer 22 determines if the currently read shift position SP is the "neutral range (N)" or "parking range (P)". If this condition is met, the computer 22 determines that the vehicle 1 is stopped or parked and moves to step 816.

When the conditional at step 803 is not met, the computer 22 determines if the shift position SP is the "reverse range (R)" in step 804. When this conditional is met at step 804, the computer 22 determines that the vehicle 1 is in "reverse" and moves to step 815.

On the other hand, when the conditional at step 804 is not met, the computer 22 judges that the shift position SP is the "drive range (D)" or the like for moving the vehicle 1 forward, and moves to step 805. There, the computer 22 determines if the operational learning process is to be started in order to obtain the throttle sensitivity Thg. The learning start condition in the sixth embodiment is satisfied when the absolute value of the amount of change $\Delta S$ in acceleration stroke S and the vehicle speed V are greater than their respective arbitrary set values.

When the conditional in step 805 is met, the computer 22 sets a learning start flag F2 to "1" in step 806 and then moves to step 807. On the other hand, when the decision condition in step 805 is not met, the computer 22 advances directly to step 807 without executing the process of step 806.

In step 807, the computer 22 determines whether or not the operational learning routine continues. In the sixth embodiment, it is judged whether the learning routine should continue when the following three conditions are met: when the flag F2 is "1", when the count value of T1 (to be described later) is smaller than an arbitrary predetermined value judged from a time at the beginning of the learning routine, and when the vehicle speed V and acceleration stroke S are greater than the respective arbitrary set values.

When the conditional in step 807 is not met, the computer 22 judges that no learning routine is to be carried out and advances to step 820. Alternatively, when the conditional at step 807 is met, the computer 22 judges that the learning routine is to be carried out and advances to step 808, where the computer 22 increases the count value T1 by "1".

Then, in steps 809 to 814, the computer 22 executes the same processes as those of steps 102 to 105 in FIG. 8.

In step 809, the computer 22 executes the learning of the "throttle sensitivity model". More specifically, the computer 22 acquires the throttle sensitivity model output Thx from the previously learned "throttle sensitivity model" (see FIG. 6) based on the current values for the acceleration stroke S and vehicle speed V. In the next step 810, the computer 22 determines the throttle sensitivity Thg from the throttle sensitivity model output Thx using the aforementioned equation (1).

The computer 22, in step 811, sends the current values of the throttle sensitivity Thg and acceleration stroke S to the computer 21. Alternatively, the computer 22 multiplies the throttle sensitivity Thg by the acceleration stroke S in order to obtain a target throttle angle Thg.S.

Next, using the acceleration G of the vehicle 1 as "teaching data", the computer 22, in step 812, learns the "acceleration model" requested by the driver DR and in turn uses this information to reduce the deviation of the data comprising the "teaching data".

Subsequently, the computer 22 in step 813 obtains the acceleration deviation $\Delta G$ as between the acceleration G and the acceleration model output Gx.

The computer 22 also learns the "throttle sensitivity model" using the acceleration deviation $\Delta G$ as an "error signal" in step 814 by learning the relationship among the acceleration stroke S, the vehicle speed V and the throttle angle Th as the "throttle sensitivity model".

Moreover, the computer 22 learns the characteristics of both the "acceleration model" required by acceleration demands made by the driver DR and the "throttle sensitivity model" in this manner. It is at this point that the computer 22 rewrites the "weighting coefficients" of the synapses sp stored in the backup RAM 26.

After executing the process of step 814, the computer 22 temporarily terminates any subsequent processing. When "0.1 sec" passes after the "learning control routine" has started, the computer 22 executes the sequence of processes starting with step 801.

When the conditional in step 807 is not met, the computer 22 moves to step 820 and resets the learning start flag F2 to "0". Next, the computer 22 resets the count value T1 to "0" in step 821.

Subsequently, the computer 22, in step 822, begins the routine of learning the "throttle sensitivity model", as in step 809. More specifically, the computer 22 acquires the throttle sensitivity model output Thx from the characteristic of the already learned "throttle sensitivity model" based on the current values of the acceleration stroke S and vehicle speed V. In the next step 823, as in step 810, the computer 22 determines the throttle sensitivity Thg from the throttle sensitivity model output Thx from the aforementioned equation (1).

The computer 22 then in step 824 sends the values for the throttle sensitivity Thg and acceleration stroke S to the computer 21, as in step 811. Alternatively, the computer 22 multiplies the throttle sensitivity Thg by the acceleration stroke S to obtain a target throttle angle Thg.S and sends the value Thg.S to the computer 21.

After executing the process of step 824, the computer 22 temporarily terminates any subsequent processing. Following the elapse of a certain period of time, e.g. "0.1 sec" from the time when the learning routine began, the computer 22 executes the sequence of processes starting with step 801.

When the vehicle 1 is in "stop" or "park" condition and the conditional at step 803 is met, the computer 22 moves to step 816 to determine if the current value obtained for $\Delta Gt$ is larger than an arbitrary set value $\alpha 3$ determined in advance. Alternatively, computer 22 determines whether the amount of change ΔV in vehicle speed is larger than an arbitrary set value β2 determined in advance. When either conditional is not met (ΔGt≦α3, or ΔV≦β2), the computer 22 in step 817 sets the throttle sensitivity Thg, obtained from the last learning routine, as the throttle sensitivity ThgN.

However, when the conditional in step 816 is met (ΔGt>α3, or ΔV>β2), the computer 22, in step 818, sets the throttle sensitivity ThgN to "1.0".

In step 819, arrived at from step 817 or 818, the computer 22 sends the currently set throttle sensitivity ThgN and acceleration stroke S to the computer 21. Alternatively, the computer 22 multiplies the throttle sensitivity ThgN by the acceleration stroke S to obtain the target throttle angle ThgN.S and sends that value to the computer 21.

After executing the process of step 819, the computer 22 temporarily terminates the subsequent processing. When "0.1 sec" elapses from a time when the "learning control routine" previously began, the computer 22 executes the sequence of processes starting with step 801 again.

The throttle sensitivity or the target throttle angle when the vehicle 1 is in a "stop" or "park" condition will be set in the above manner.

When the vehicle 1 is in "reverse" range and the conditional in step 804 is met, the computer 22 in step 815 suppresses the learning routine of the throttle sensitivity Thg. Next, the computer 22 writes a separately set value of the throttle sensitivity Thg or the target throttle angle Thg.S to the computer 21. That is, the computer 22 sends both the throttle sensitivity ThgR, a separately set value suitable for when the vehicle 1 is in a reverse condition, and the acceleration stroke S to the computer 21. Alternatively, the computer 22 multiplies the throttle sensitivity ThgR by the acceleration stroke S to obtain a target throttle angle ThgR.S and sends that value to the computer 21.

The "throttle sensitivity ThgR is set in accordance with the type of the vehicle 1, the characteristic of the engine 2 and so forth, and it is a constant value determined within a range from "0.8" to "1.0" and stored in advance in the ROM 24. In the sixth embodiment, the throttle sensitivity ThgR is set to "0.9".

After executing the process of step 815, the computer 22 temporarily terminates the subsequent processes. When "0.1 sec" passes after the current "learning control routine" has started, the computer 22 executes the sequence of processes starting with step 801.

The throttle sensitivity or target throttle angle for the "reverse state" of the vehicle 1 is likewise set in this manner.

Figure 35:
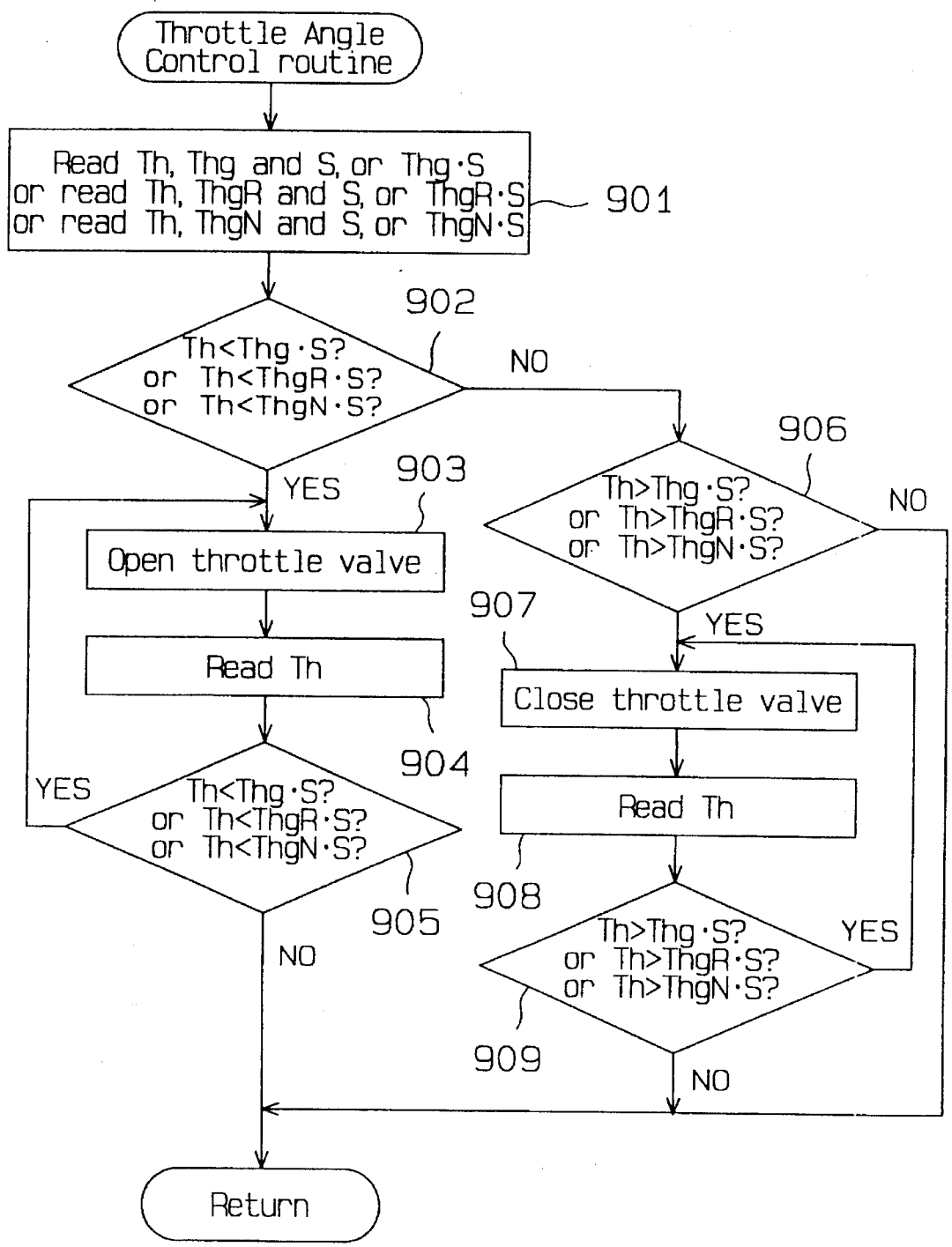

FIG. 35 illustrates the throttle angle control routine executed by the computer 21. When a predetermined time passes after the beginning of the previous throttle angle control routine, the computer 21 executes the process at step 901. In executing this process, upon beginning to learn the throttle sensitivity Thg, the computer 21 reads the throttle angle Th based on the signal from the throttle sensor 9. The computer 21 reads the latest throttle sensitivity Thg and acceleration stroke S or the target throttle angle Thg.S, which is output from the computer 22. The computer 21 multiplies Thg by S to obtain the target-throttle angle Thg.S.

If, while executing step 901, the computer 21 determines that the vehicle 1 is in "reverse" at a time when the throttle sensitivity Thg has not been learned, the computer 21 reads the throttle angle Th based on the signal from the throttle sensor 9. The computer 21 reads the latest throttle sensitivity ThgR and acceleration stroke S or the target throttle angle ThgR.S, which is output from the computer 22. In the case where data of the throttle sensitivity ThgR and acceleration stroke S is available as input, the computer 21 multiplies ThgR by S to obtain the target throttle angle ThgR.S.

If, while step 901 is being executed, the vehicle 1 is in a "stopped" or "parked" condition at a time when the throttle sensitivity Thg has not been learned, the computer 21 reads the throttle angle Th based on the signal from the throttle sensor 9. The computer 21 reads the latest throttle sensitivity ThgN and acceleration stroke S or the target throttle angle ThgN.S, which is output from the computer 22. In the case where data of the throttle sensitivity ThgN and acceleration stroke S are available as input, the computer 21 multiplies ThgN by S to obtain the target throttle angle ThgN.S.

In the next step 902, the computer 21 determines if the current throttle angle Th is smaller than the target throttle angle Thg.S. Alternatively, the computer 21 determines if the current throttle angle Th is smaller than the target throttle angle ThgR.S or ThgN.S.

When this conditional is met, the computer 21, in step 903, rotates the DC motor 8 forward to drive the throttle valve 7 in the opening direction. Subsequently, the computer 21, in step 904, reads the throttle angle Th based on the signal from the throttle sensor 9.

In step 905, the computer 21 determines whether the throttle angle Th is smaller than the target throttle angle Thg.S, ThgR.S or ThgN.S. When this decision condition is met, the computer 21 returns to step 903 and repeats the processes of steps 903 to 905 to further drive the throttle valve 7 open.

If the decision condition in step 905 is not satisfied, the computer 21 determines that it is unnecessary to further drive the throttle valve 7 in the open direction and temporarily terminates the subsequent processing.

If the conditional in the aforementioned step 902 is not satisfied, the computer 21, in step 906, determines if the current throttle angle Th is larger than the target throttle angle Thg.S, ThgR.S or ThgN.S. The computer 21 then determines that the throttle angle Th matches the target throttle angle Thg.S, ThgR.S or ThgN.S, and temporarily terminates the subsequent processes.

If the decision condition in step 906 is satisfied, the computer 21 in step 907 rotates the DC motor 8 backward to drive the throttle valve 7 toward the closed position. Subsequently, the computer 21, in step 908, reads the throttle angle Th based on the signal from the throttle sensor 9.

In step 909, the computer 21 determines if the throttle angle Th is larger than the target throttle angle Thg.S, ThgR.S or ThgN.S.

When this conditional is met, the computer 21 returns to step 907 and repeats the processes of steps 907 to 909 to further drive the throttle valve 7 closed. Alternatively, if the conditional in step 909 is not satisfied, the computer 21 determines that it is unnecessary to further drive the throttle valve 7 closed and temporarily terminates the subsequent processes.

In this manner, the rotation of the DC motor 8 is controlled in such a way that the throttle angle Th matches with the target throttle angle Thg.S, ThgR.S or ThgN.S, and the angle of the throttle valve 7 is controlled accordingly. As a result, the amount of air flowing through the air intake passage 3 is adjusted and the output of the engine 2 is controlled. The driving power of the vehicle 1 is controlled as a consequence.

The sixth embodiment therefore has the same function and advantages as the first embodiment. In addition, according to the sixth embodiment, when the vehicle 1 is in "reverse", in which the shift position SP of the shift lever 14 is at the "reverse range (R)", the operational learning routine to obtain the throttle sensitivity Thg is suppressed and the throttle sensitivity ThgR suitable for reverse will be provided. Furthermore, the opening/closing of the throttle valve 7 is controlled in such a way that the target throttle angle ThgR.S, obtained by multiplying the throttle sensitivity ThgR by the acceleration stroke S, matches the value for the throttle angle Th.

When the vehicle 1 is in "reverse", therefore, the angle of the throttle valve 7 is adjusted in accordance with the amount of the manipulation of the accelerator pedal 10, based on the target throttle angle ThgR.C rather than the target throttle angle Thg.S learned at the time of forward acceleration. When the vehicle 1 moves backward, therefore, the manipulation of the accelerator pedal 10 needed to control the output of the engine 2 is easily maintained by the driver DR.

Figure 36:
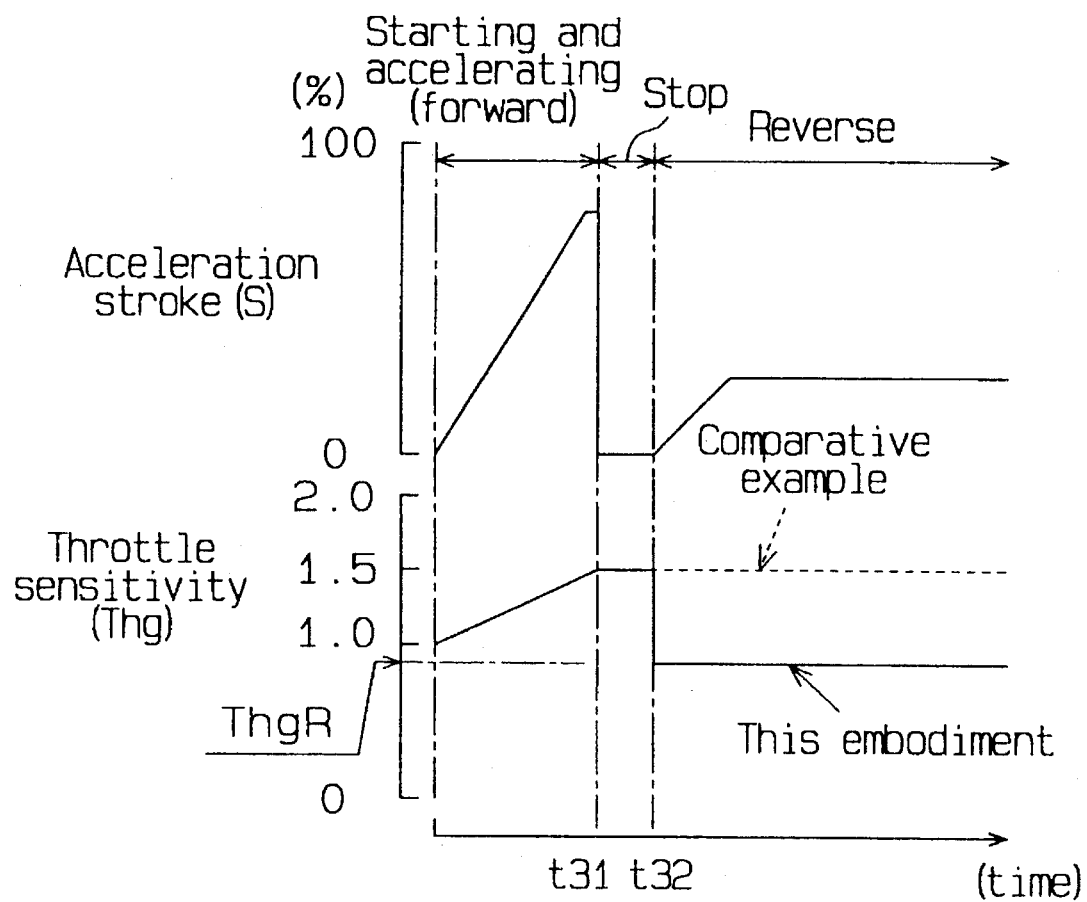

Suppose that in FIG. 36, the throttle sensitivity Thg is finally determined to be a relatively high value of "1.5" while the vehicle 1 is in either a starting and forward accelerating mode. Also suppose that the vehicle 1 stops at time t31 after the starting and accelerating cruising and changes to the reverse state at time t32. In this case, when the vehicle 1 comes to the reverse state, the high throttle sensitivity Thg, determined to be "1.5", is immediately changed to a relatively low throttle sensitivity ThgR of "0.9", as indicated by the solid line in FIG. 36. Thereafter, this throttle sensitivity ThgR is maintained until the forward acceleration starts again. This is apparent by comparison with the change in throttle sensitivity Thg of the comparative example indicated by the broken line in FIG. 36. The angle of the throttle valve 7 will be adjusted on the basis of the target throttle angle ThgR.S obtained from that throttle sensitivity ThgR.

Accordingly, at the time the vehicle 1 moves backward, the control of the accelerator pedal can be improved in order to reflect the driving intention of the driver DR. More specifically, when the movement of the vehicle 1 is forward and next the driver DR requires a reverse movement, throttle sensitivity is kept from becoming unnecessarily high, thereby preventing the vehicle speed V from undergoing a dangerously rapid change.

When the vehicle 1 is slowly started forward, on the other hand, the throttle sensitivity Thg decreases and changes in vehicle speed V and acceleration G with respect to the acceleration stroke S become smaller. Should the vehicle 1 then begin to travel in the reverse direction immediately after the gentle starting, the throttle sensitivity Thg will be immediately changed to the throttle sensitivity suitable for reverse ThgR. In the case where the driver DR is requesting the reverse motion, therefore, the throttle sensitivity is prevented from becoming unnecessarily low. Where the driver DR may wish to move the vehicle 1 quickly in this case, a response to the acceleration of the vehicle 1 is kept from becoming too slow against the intention of the driver DR. In other words, when the driver DR wishes to move the vehicle 1 backward immediately after gentle forward driving has started, good operational performance suitable for reverse will be available.

Further, in the sixth embodiment, since the learning of the throttle sensitivity Thg is suppressed when the vehicle 1 moves backward, the learning of the throttle sensitivity Thg will not be executed with a negative acceleration G. Thus, the throttle sensitivity will not be too low.

In addition, according to the sixth embodiment, when the vehicle is in a "stop" or "park" condition when the shift position SP is at the "neutral range (N)" or "parking range (P)", the operational learning of the throttle sensitivity Thg is suppressed in favor of the preset value of "1.0" chosen as the throttle sensitivity ThgN for the stopped condition. The opening/closing of the throttle valve 7 is controlled in such a way that the target throttle angle ThgN.S, obtained by multiplying the throttle sensitivity ThgN by the acceleration stroke S, matches the throttle angle Th.

Given engine racing conditions with the vehicle 1 in a "stop" or "park" condition, operational learning of the throttle sensitivity Thg may be suppressed. Even if the shift lever 18 is set to the "neutral range (N)" from "drive range (D)" while driving the vehicle 1, the throttle sensitivity Thg, which has ben obtained by the previous learning, will be used unless the amount of change ΔGt or ΔV becomes larger by some degree. The throttle sensitivity will not therefore be changed unexpectedly, thus preventing the vehicle speed V from changing greatly to increase the motion of the vehicle 1.

Seventh Embodiment

Figure 37:
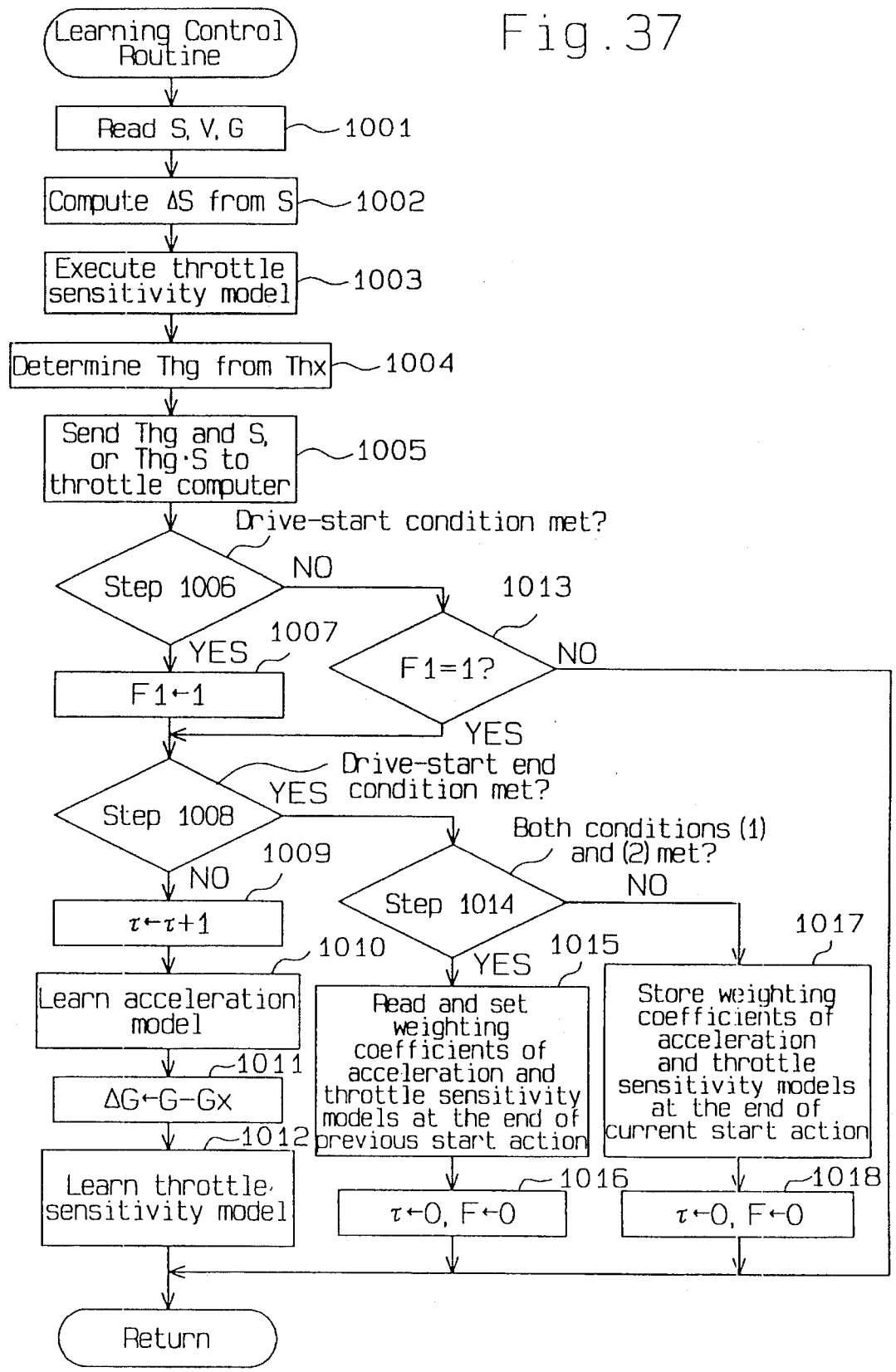
FIGS. 37 and 38 illustrate a seventh embodiment of the present invention.

The seventh embodiment of the present invention will now be described with reference to FIGS. 37 and 38.

Since the schematic structure of the driving power control apparatus for the vehicle 1 in the seventh embodiment is the same as that of the third embodiment (see FIGS. 16 and 17), and since the throttle angle control routine executed by the computer 21 in the seventh embodiment is the same as that of the first embodiment (see FIG. 9), the schematic structure and the throttle angle control routine will not be discussed again. The specific learning control routine processed by the computer 22 in the seventh embodiment differs from that of the first embodiment in the following ways.

The throttle sensitivity model learned by the computer 22 for any current starting action is disregarded upon the occurrence of the following two conditions: when the duration of the vehicle's starting action is shorter than a predetermined time, and when the throttle sensitivity model output Thg at the end of the vehicle's starting action is smaller than a predetermined value. Under these conditions, the learning states of the acceleration and throttle sensitivity models are reset to the time when the previous vehicle starting was completed Processing of the learning control routine of the computer 22, as shown in the flow chart of FIG. 37, is controlled by a program counter wherein the counter counts the number of times the throttle sensitivity Thg has been computed from the beginning of the starting action of vehicle 1 until a time when the starting action is complete. A count value τ is utilized as a value equivalent to the detected period of time during which the starting action of vehicle 1 is completed (start sustain time). The acceleration and throttle sensitivity models are processed and learned by the computer 22 during this time.

The drive start condition is considered satisfied under the following conditions: when a drive start flag F1, indicative of the drive start condition, is set to zero; when the change in the acceleration stroke ΔS per unit time (e.g., 0.1 sec) is equal or greater to a predetermined value (e.g., 3%); and when the vehicle speed V is equal to or less than a predetermined value (e.g., 5 Km/hour). Drive start flag F1 is reset to "1" when the drive start condition is satisfied and to "0" when that condition is absent.

The end of the drive start condition is met when the drive start condition is met, the drive start flag F1 is set to "1", the braking pedal 15 is thrust downward, and the stop lamp switch 14 is set on. Alternatively, the end of the drive start condition is considered as having been met when a predetermined time (e.g., 1 sec) has elapsed from a time after the drive start condition has been met, when the acceleration stroke S is equal to or less than a predetermined value (e.g., 10%), and when the vehicle speed V is equal to or less than a predetermined value (e.g., 10 Km/hour). The drive-start end condition is also considered satisfied under a condition when the count value τ becomes equal to or more than a first predetermined value T set previously.

The count value τ and the drive start flag F1 are set to "0" as initial values when the ignition key is operated to start the engine.

When a predetermined time ("0.1 sec" in this case) elapses from the previous starting of the learning control routine, the computer 22, in step 1001, reads the acceleration stroke S, acceleration G and vehicle speed V based on various signals from the accelerator pedal sensor 11, acceleration sensor 12 and vehicle speed sensor 13.

Then, the computer 22 calculates the amount of change ΔS in the acceleration stroke S. The change ΔS is a deviation between the current and previous read values of the acceleration stroke S.

In step 1003, the computer 22 executes the learning of the "throttle sensitivity model" by acquiring the throttle sensitivity model output Thx from (see FIG. 6) the previously learned "throttle sensitivity model" based on the current read input values for acceleration stroke S and vehicle speed V.

The computer 22 then determines the throttle sensitivity Thg according to the aforementioned equation (1) using the throttle sensitivity model output Thx in step 1004.

Next, the computer 22, in step 1005, sends the currently determined throttle sensitivity Thg and acceleration stroke S to the computer 21. Alternatively, the computer 22 multiplies the throttle sensitivity Thg by the acceleration stroke S to obtain the target throttle angle Thg.S, and sends that value to the computer 21.

At the following step 1006, the computer 22 determines whether or not the drive start condition is met. When this decision condition is satisfied, the computer 22 moves to step 1007 to set the drive start flag F1 to "1" and then goes to step 1008.

When the conditional at step 1006 is not met, the computer 22 moves to step 1013 to determine if the drive start flag F1 is "1". That is, at step 1006, only the drive start timing is detected and not whether starting or accelerated cruising is in progress. If the drive start condition has been met and the flag F1 is "1", indicating that starting and accelerating cruising is in progress, the computer 22 moves from step 1006 to step 1013 and then to step 1008.

At step 1008, the computer 22 determines whether or not the drive start end condition is met. If so, the computer 22 moves to step 1014. When that conditional is not met, i.e., when the starting and accelerating cruising is in progress, the computer 22 moves to step 1009. There, the computer 22 increases the count value τ by "1" and performs the same processes as those of steps 104 and 105 in FIG. 8. That is, first the computer 22 at step 1010 performs the learning of the "acceleration model" according to the requirements of the driver DR and using the acceleration G of the vehicle 1 as "teaching data" More specifically, the computer 22 treats the acceleration G of the vehicle 1 as "teaching data", and then learns the relationship among the acceleration stroke S, the vehicle speed V and the acceleration G as the "acceleration model" so as to reduce the deviation to data within the "teaching data".

Next, the computer 22 obtains the difference (acceleration deviation ΔG) between the acceleration G and the acceleration model output Gx. In step 1012, the computer 22 learns the "throttle sensitivity model" using that acceleration deviation ΔG as an "error signal". In other words, using the acceleration deviation ΔG as the "error signal", the computer 22 learns the relationship among the acceleration stroke S, the vehicle speed V and the throttle angle Th as the "throttle sensitivity model" in such a way as to reduce the error portion of the "error signal".

Learning control using the neural network technology is carried out in this manner with "acceleration model" characteristics being learned in response to the acceleration required by the driver DR and with a corresponding learning of the "throttle sensitivity model". Here, the "weighting coefficients" of the synapses sp as the characteristics of the "acceleration model" and "throttle sensitivity model", which are occasionally learned, are rewritten and stored in the backup RAM 26.

After executing the process of step 1012, the computer 22 temporarily terminates subsequent processing. When "0.1 sec" period passes after the current learning control routine has started, the computer 22 executes the sequence of processes starting with step 1001.

When the conditional at step 1008 is met, the computer 22 moves to step 1014 to determine whether or not the following two conditions are satisfied: whether count value τ is smaller than a first predetermined value T1 (a value corresponding to 3 sec, for example), and whether the throttle sensitivity Thg is smaller than a second predetermined value THG (e.g., 0.8).

When the decision condition in step 1014 is not met, i.e., when either one of the above two conditions are not met, the computer 22 goes to step 1017 where it memorizes the learning states of the acceleration and throttle sensitivity models at the end of the current starting period. It is here then that the "weighting coefficient" for the requested-acceleration model and throttle sensitivity model are stored.

Subsequently, the computer 22 resets the count value τ and the learning start flag F1 to "0" and temporarily terminates subsequent processing at step 1018. When "0.1 sec" passes following the beginning of the current learning control routine, the computer 22 executes the sequence of processes starting with step 1001 again.

When the conditional at step 1014 is met, the computer 22 determines that the vehicle has started, advanced and stopped several times causing a slight change to have been registered in acceleration G. Consequently, the throttle sensitivity Thg is adjusted to a very low value and the learning control routine then moves to step 1015. This behavior of the vehicle 1 may be seen when the vehicle 1 is driving on a branch line and approaches an intersection with poor visibility, such as a T road, and moves and stops before actual starting to join the trunk line. The above situation may also occur when the vehicle 1 is running on a road with a traffic jam and repeatedly experiences short starts and stops.

The computer 22 at step 1015 then invalidates the "weighting coefficients" of the current acceleration and throttle sensitivity models, reads the stored "weighting coefficients" provided at the end of the previous start, and sets these coefficients for the acceleration and throttle sensitivity models. In this way, the learning states of the current acceleration and throttle sensitivity models are set with reference to the learning states provided at the end of the previous starting period.

In step 1016, the computer 22 resets the count value τ and the learning start flag F1 to "0" and temporarily terminates the subsequent processing. When "0.1 sec" passes after the current learning control routine has started, the computer 22 executes the sequence of processing starting with step 1001.

Through the execution of steps 1003, 1004 and 1005 in the named order in the next control cycle, the throttle sensitivity Thg can be set back to the value attained at the end of the previous start.

The seventh embodiment therefore has the following function and advantages in addition to those of the first embodiment.

When the vehicle 1 repeatedly makes several short starts and stops, a change in acceleration G is small and the throttle sensitivity Thg is thus given a very low value. According to the seventh embodiment, the start sustain time (count value τ) from the point where the start action of the vehicle 1 is detected to the point where the end of the start action is detected is measured. When the count value τ is smaller than a first predetermined value T, and the throttle sensitivity Thg at the end of the start action is smaller than a second predetermined value THG, computer 22 invalidates the operational learning of the acceleration and throttle sensitivity model for the current starting action. The learning states of the acceleration and throttle sensitivity models are reset with values provided at the end of the previous start period. As a result, the throttle sensitivity Thg obtained at the previous start, rather than that obtained in the learning process for the current start period, will be sent to the computer 21. Thus the throttle sensitivity Thg obtained at the previous start is the sensitivity obtained immediately before the vehicle repeatedly makes short starts, advances and stops, and it is larger than the throttle sensitivity Thg at the end of the current start period.

When short starts and stops are repeated as mentioned above, the throttle sensitivity Thg is adjusted to a very low value. Should rapid acceleration be needed for the actual start action after the completion of a start action as above described, the throttle sensitivity Thg output to the computer 21 will be changed to a high value. The opening/closing of the throttle valve 7 is controlled in such a way that the target throttle angle Thg.S, obtained by multiplying the switched throttle sensitivity Thg by the acceleration stroke S, matches the throttle angle Th. The manipulation of the accelerator pedal 10 required to control the output of the engine 2 becomes suitable for quick acceleration in response to the requirements of the driver DR.

Figure 38:
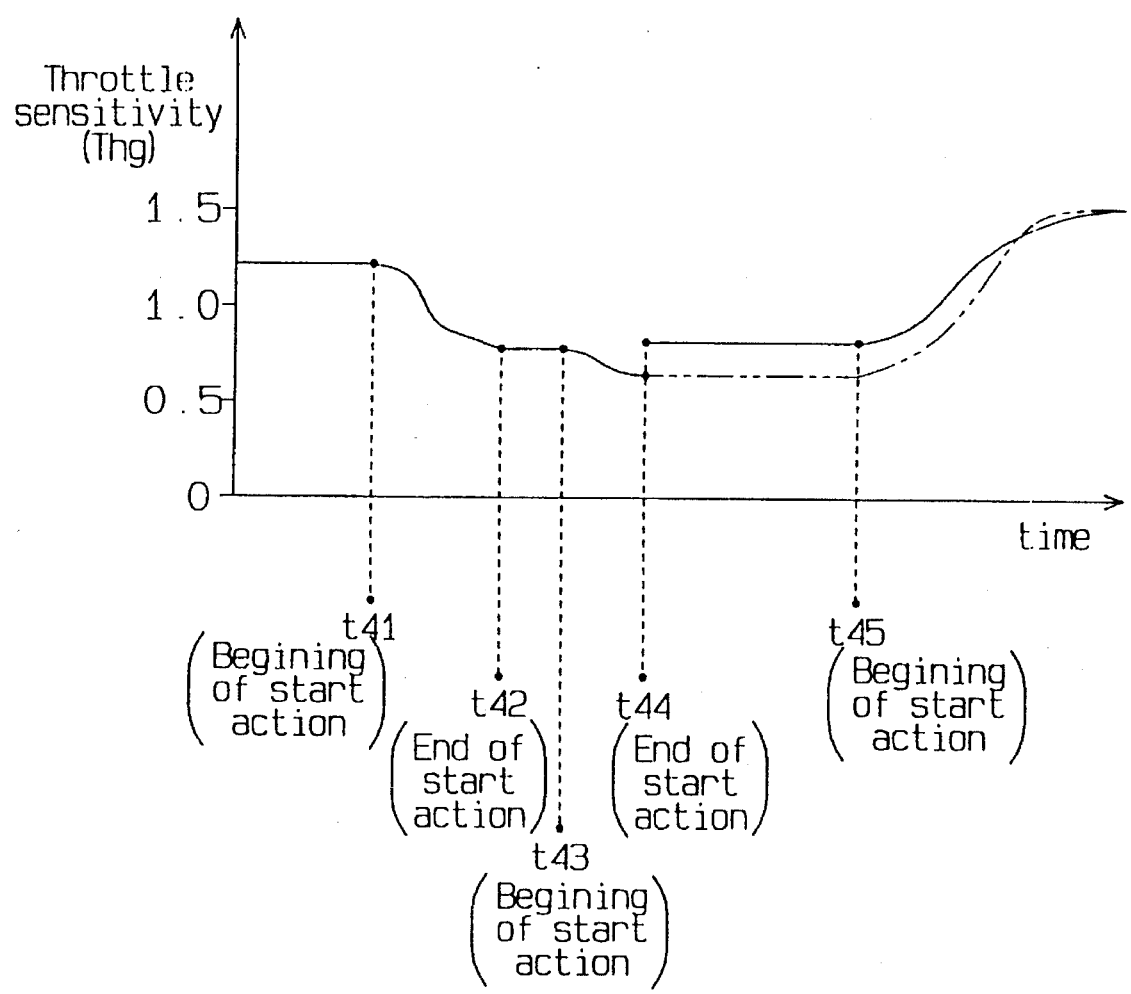

Suppose that the vehicle 1 had started moving at time t41 and stopped at time t42 as shown in FIG. 38. This would be the case when one or both of the conditions required in step 1014 remained unsatisfied and when learning had begun for the current start action. In this case, the learning states of the acceleration and the throttle sensitivity models or the "weighting coefficient", which is initiated by this start, are stored.

Assume that the next starting period occurs at time t43 and ends at time t44. This would be the case when both of the conditions in step 1014 had been met under invalidated learning conditions for the acceleration throttle sensitivity models, and when the learning states had been reset using values obtained at the end of the previous starting period. In other words, the "weighting coefficients" stored at the end of the previous start are read out and are read by the acceleration and throttle sensitivity models. Accordingly, as the throttle sensitivity model is executed, the throttle sensitivity is set back to the one obtained at the end of the previous start (alternate long and two short dashes line changed to the solid line at time t44). Thus when quick acceleration becomes necessary at time t45, the throttle sensitivity can be changed quickly and greatly.

Accordingly, when quick acceleration is desired, the control of the accelerator pedal and the corresponding driving power of the vehicle can be improved to more accurately reflect the intention of the driver DR. More specifically, when driver DR requests a rapid acceleration following a succession of quick starts and stops, the throttle sensitivity Thg, adjusted to a value lower than the second predetermined value THG (0.8), will be prevented from increasing gradually with the passage of time as indicated by the alternate long and two short dashes line in FIG. 38. The vehicle speed V can thus be significantly changed with only a slight change in acceleration stroke S.

According to the seventh embodiment, as described above, even if the throttle sensitivity Thg has become low due to the repetitive short starts and stops of the vehicle, sufficient acceleration will be provided when the driver DR requests quick acceleration.

Eighth Embodiment

The eighth embodiment according to the present invention will now be described referring to FIGS. 39 through 43.

According to the eighth embodiment, a reset switch 20 is provided to forcibly change the learned result of a predetermined value when the driver requires that the vehicle undergo rapid acceleration.

Figure 39:
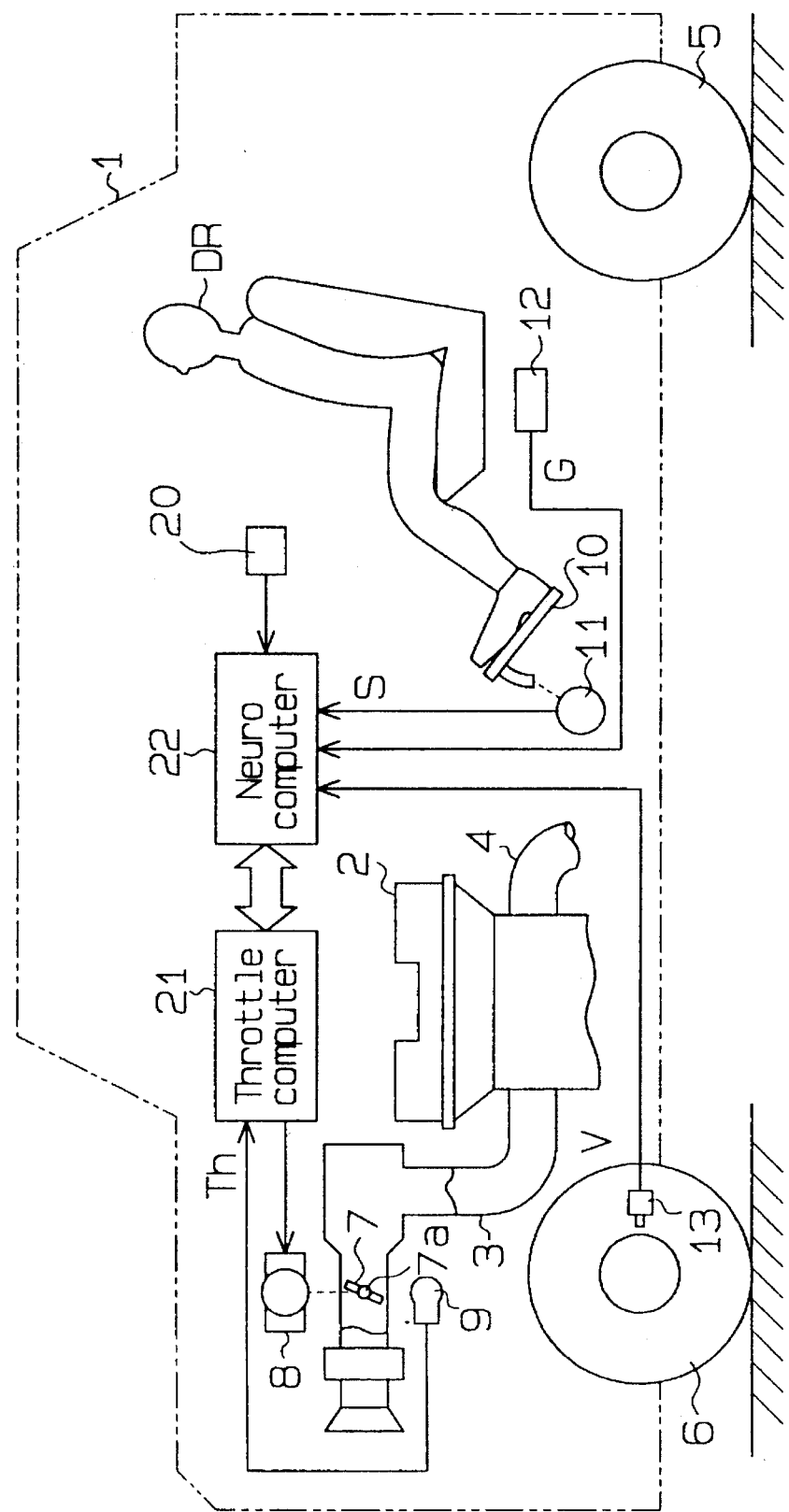
FIGS. 39 through 43 illustrate an eighth embodiment of the present invention.

As shown in FIG. 39, the reset switch 20 is located on the driver's side of the vehicle's instrument panel on the front dash board. The switch 20 can be a push-button type ON/OFF switch. Although switch 20 is normally set to the OFF state, when the driver DR requires rapid acceleration, he or she can physically manipulate switch 20 to the ON state.

Figure 40:
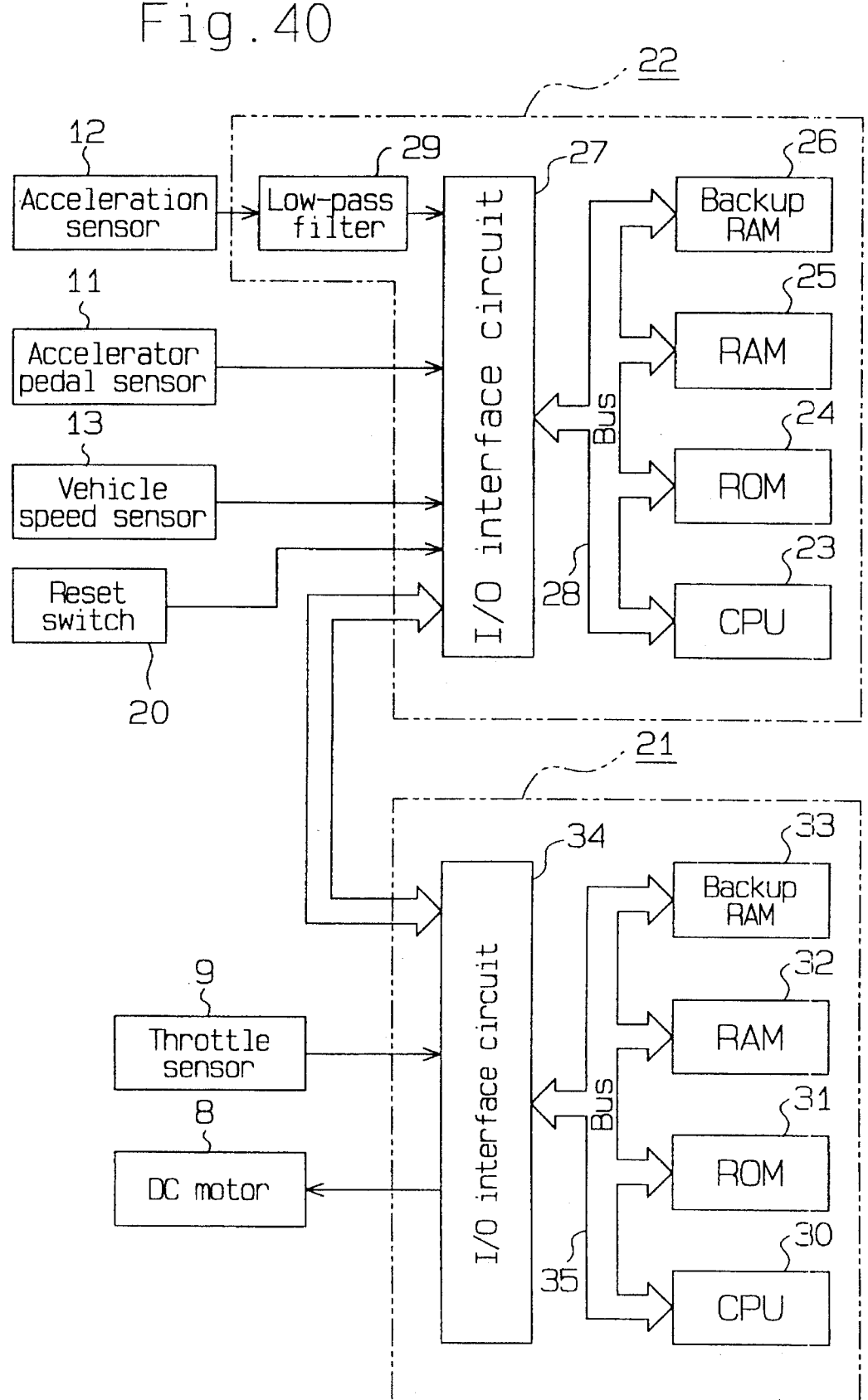

Such a condition could arise when, for example, the driver DR desires to merge his or her vehicle 1 from a subsidiary or acceleration lane into a main lane, or when the driver DR emerges from congested traffic to relatively unimpeded traffic. Under both of these conditions, the accelerator pedal 10 would be rapidly depressed in order to achieve the desired continuous and rapid acceleration. As shown in FIG. 40, an input/output interface circuit 27 of a neuron computer 22 connects the reset switch 20 to each one of the sensors 11 through 13 in the first embodiment. Signals from the sensors 11 through 13 and the switch 20 are input to a CPU 23 through the input/output interface circuit 27.

A learning control routine, carried out by the computer 22, will now be described referring to FIG. 41.

Operations of this routine are initiated when an ignition key is manipulated to the ON state in order to start the engine. Each operation of the learning control routine is carried out according to a flag F3 whose logical state varies as indicated by the timing chart in FIG. 42. The flag F3 is linked to the state of the reset switch 20 and is set to "1" when both the engine is activated and the driver DR manipulates the switch 20 to the ON state. Otherwise, the state of the switch 20 is switched to "0", which is an OFF state.

In the learning control routine, a throttle sensitivity (Thg) is computed based on the throttle sensitivity model output (Thx), but is not output to the throttle computer 21. Alternatively, the neuro computer 22 selects one of two predetermined values: a minimum value (THGmin) and a standard value (THGst) for input to throttle computer 21. The selected value is thereafter regarded as a final throttle sensitivity value.

According to the eighth embodiment, the minimum value THGmin is set to "0.5" and the standard value THGst is set to "1.0". Furthermore, a threshold value THGa (i.e., constant value) is set in order to select either the minimum value THGmin or the standard value THGst in corresponding to the current level of the throttle sensitivity Thg.

When the level of the throttle sensitivity Thg is smaller than the threshold value THGa, the minimum value THGmin is set as the final throttle sensitivity Thga. When the level of the throttle sensitivity is larger than the threshold value THGa, the standard value THGst is set as the final throttle sensitivity Thga.

Figure 42:
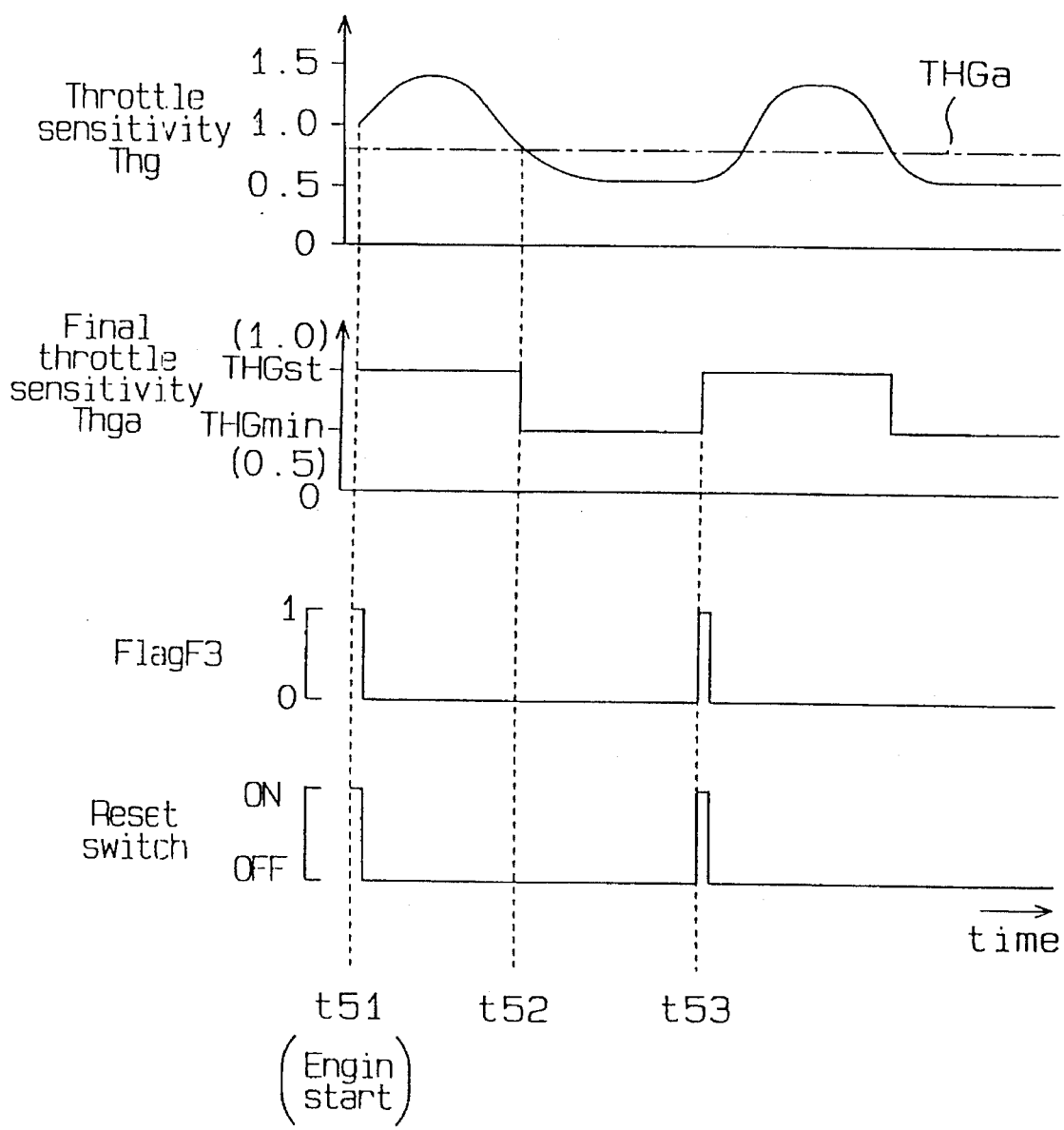

FIG. 42 illustrates that when the engine 2 is activated at timing t51, the level of the throttle sensitivity becomes larger than the threshold value THGa between timing instances t51 and t52, while the level of the throttle sensitivity Thg becomes less than the threshold value THGa between timing instances t52 and t53. Finally, the driver DR resets switch 20 at timing t53.

Figure 41:
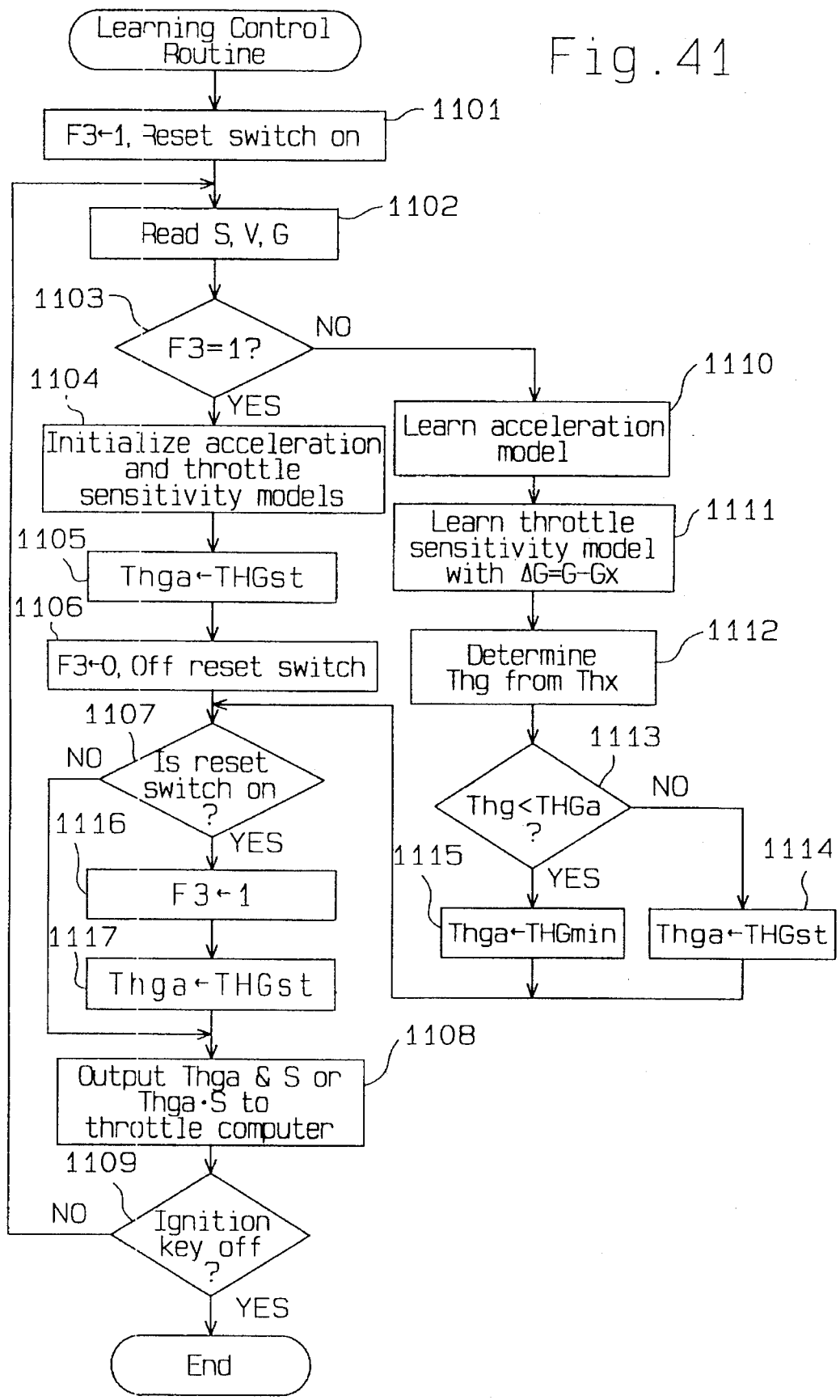

Under these conditions, when the engine 2 is activated at timing interval t51, the computer 22 initially sets the level of the flag F3 to "1" at step 1101 as shown in the learning control routine of FIG. 41. At step 1102, the computer 22 reads the vehicular speed V, acceleration stroke S and acceleration G based on the signals from the vehicle speed sensor 13, accelerator pedal sensor 11, and acceleration sensor 12 respectively.

At step 1103, the computer 22 determines whether or not the level of the flag F3 is set to "1", which is the level of the flag when the engine is started. If Flag F3 is set to "1", the computer 22 then advances to step 1104 where the computer 22 sets initial weight coefficients for the acceleration and throttle sensitivity models. The initial coefficient for the acceleration model is selected by averaging sample coefficient values generated from a survey of a large number of test drivers. On the other hand, the weighting coefficients for the sensitivity model are initialized to zero.

At step 1105, neuro computer 22 sets the standard value THGst (i.e.,=1.0) as final throttle sensitivity value Thga. Next, at step 1106, the computer 22 resets the value of the flag F3 from "1" to "0" and outputs this value to switch 20 in order to turn the switch off.

At step 1107, the computer 22 determines whether or not the state of the switch 20 is in the ON or OFF state. When switch 20 has been switched OFF at step 1106, the neuro computer 22 determines that the conditional at step 1107 has not been met and then advances to step 1108. There, at step 1108, the computer 22 outputs the combination of the final throttle sensitivity Thga set at step 1105 as well as the accelerator stroke S read at step 1102. Alternatively, the neuro computer 22 multiplies the final throttle sensitivity Thga with the accelerator stroke S, the result of which is input as a target throttle opening angle Thga.S to the throttle computer 21.

At step 1109, the computer 22 determines whether or not the ignition key has been manipulated to the OFF state in order to stop the engine. In such a case, the conditional of step 1109 is deemed not to have been met, at which point the routine returns to step 1102.

According to the above described control cycle, the level of the flag F3 is reset to "0" at step 1106. Consequently, when step 1103 is subsequently executed, the conditional at step 1103 will not be met and the computer 22 will carry out the learning control routine starting from step 1110. The operations in steps 1110 and 1111 are substantially equal to those in steps 104 and 105 of the first embodiment.

At step 1110, the computer 22 carries out the learning of acceleration model as required by the driver DR with the acceleration G of the vehicle 1 being set as master data. That is, the computer 22 learns or correlates the data as between the accelerator stroke S and vehicle speed V in such a way to reduce the deviation between the acceleration G detected by the sensor 12 and the master data.

At step 1111, the computer 22 computes the difference between the acceleration G and the acceleration model output Gx as acceleration deviation $\Delta G$. The computer 22 carries out the learning routine of throttle sensitivity model where the acceleration deviation $\Delta G$ is set as an error signal. The weight coefficients of synapses sp, as the characteristics of acceleration and throttle sensitivity model, are re-written and stored in the backup RAM 26.

At step 1112, the computer 22 computes the level of the throttle sensitivity Thg through the above-described equation (1) based upon the throttle sensitivity mode output Thx.

At step 1113, the computer 22 determines whether or not the level of the throttle sensitivity Thg is less than the threshold value THGa. During the period between timing intervals t51 and t52 in FIG. 42, the level of the throttle sensitivity Thg is larger than the threshold value THGa. Therefore, the computer 22 determines that the conditional of step 1113 is unmet. At step 1114, the computer 22 sets the standard value THGst as the final throttle sensitivity value Thga and carries out the operations following step 1107.

If the neuro computer 22 determines that the throttle sensitivity Thg at time interval t52 in FIG. 42 is less than the threshold value THGa, the conditional at step 1113 will have been met and the routine advances to step 1115 where the computer 22 sets the minimum value THGmin as the final throttle sensitivity Thga (i.e.,=0.5) and begins to process the operations at steps 1107 and following.

The final throttle sensitivity Thga, output to the computer 21 at step 1108, is maintained equal to the standard value THGst (i.e.,=1.0) during the period represented between t51 and t52, and is then switched to the minimum value THGmin (i.e.,=0.5) at time t52. Such a running condition indicates a nominal acceleration fluctuation level, e.g., when the driver DR repeatedly accelerates and stops within a short period of time such as on a congested road.

Should the driver DR set switch 20 after such nominal acceleration, that is, at time interval t53 shown in FIG. 42, the computer 22 determines that the conditional at step 1107 is met and advances to step 1116 were it sets the level of the flag F3 from "0" to "1". At step 1117, the computer 22 sets the standard value THGst as the final throttle sensitivity value Thga. That is, the computer 22 switches the final throttle sensitivity value Thga, previously maintained equal to the minimum value THGmin, to the standard value THGst. Then, the computer 22 carries out the operations of steps following step 1108.

Furthermore, the state of the reset switch 20, which is switched ON by the driver DR, will be automatically switched OFF at the execution of step 1106 in the successive control cycle. The above described operations are repeatedly carried out while the engine 2 is running. When the ignition key is manipulated to the OFF state in order to stop the engine 2, the computer 22 determines that the conditional at step 1109 is met and terminates the learning control routine.

Accordingly, the final throttle sensitivity Thga or target throttle angle Thga.S is set.

Figure 43:
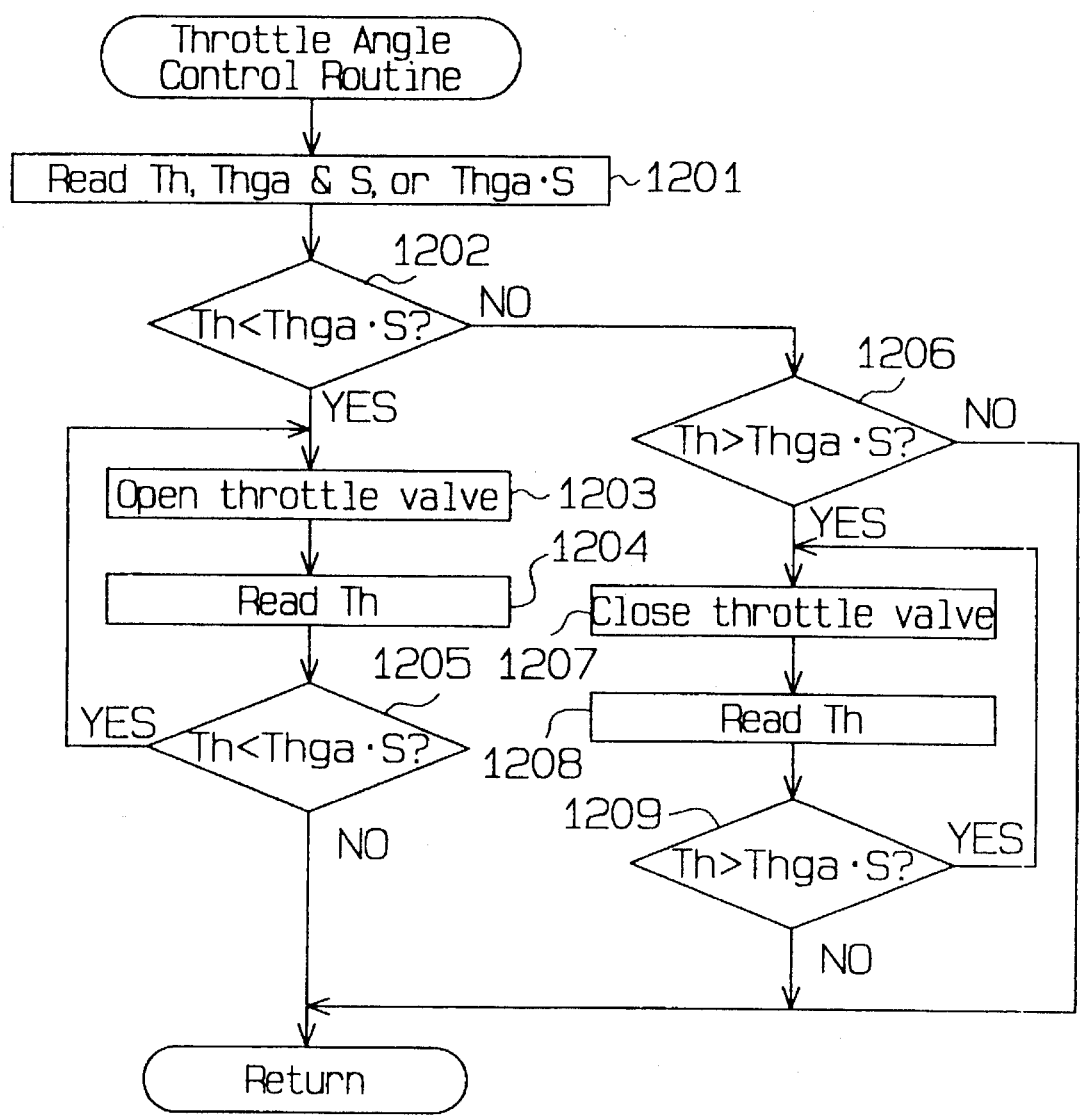

A throttle opening angle control routine carried out by the computer 21 based upon the above described final throttle sensitivity Thga and the accelerator stroke S at that time will now be described referring to FIG. 43.

After a predetermined period of time elapses from the last initiation cycle of this routine, the computer 21, at step 1202, reads the throttle opening angle Th based upon the signal transmitted from the throttle sensor 9. The computer 21 reads either the final throttle sensitivity value Thga or the target throttle opening angle Thga.S together with the accelerator stroke S from the computer 22. Should the final throttle sensitivity Thga and accelerator stroke S be the values read, the computer 21 computes the target throttle opening angle Thga.S by multiplying the Thga with S.

Next at step 1202, the computer 21 determines whether or not the current throttle opening angle Th is less than the target throttle opening angle Thga.S; if so, the computer 21 drives the DC motor 8 and rotates the throttle valve 7 open. At step 1204, the computer 21 reads the throttle opening angle Th based upon the signal transmitted from the throttle sensor 9.

At step 1205, the computer 21 determines whether or not the throttle opening angle Th is less than the target throttle opening angle Thga.S; if so, the computer 21 returns to step 1203, and repeatedly carries out the operations of steps 1203 through 1205 in order to further open the throttle valve 7. However, should opening angle Th be greater than the target throttle opening angle, the computer 21 at step 1205 determines that the throttle valve 7 does not need to be further opened and temporarily terminates the throttle opening angle control routine.

Alternatively, when the conditional at step 1202 as described above is not met, the computer 21 advances to step 1206 where it determines whether or not the current throttle opening angle Th is larger than the target throttle opening angle Thga.S. If such a condition does not exist at step 1206, the computer 21 determines that the throttle opening angle Th is equal to the target throttle opening angle Thga.S and temporarily terminates the routine. However should the conditional at 1206 be met, the computer 21, at step 1207, reverses DC motor 8 to close the throttle valve 7. Following this, at step 1208, the computer 21 reads the throttle opening angle Th based upon the signal transmitted from the throttle sensor 9.

At step 1209, the computer 21 again determines whether throttle opening angle Th is larger than the target throttle opening angle Thga.S. With this conditional met, the computer 21 returns to step 1207 and carries out the operations of steps 1207 through 1209 in order to further close the throttle valve 7. Should the conditional at step 1209 remain unsatisfied, the computer 21 determines that the throttle valve 7 does not require further closing and terminates the routine.

Accordingly, the throttle opening angle control routine selectively rotates the DC motor 8 to maintain the throttle opening angle Th in accordance with the target opening angle Thga.S, thereby maintaining adjustment of the throttle valve 7. Regulation of air flow through the air intake passage 3 to engine 2 is thus achieved allowing for the effective control of the drive power output of the engine 2.

Whenever full-scale rapid acceleration is required, the control of the drive power can be achieved by improving the acceleration control ability. Specifically, the final throttle sensitivity Thga, which is set to the minimum value THGmin (i.e.,=0.5), is prevented from gradually increasing with the passage of time. Any minimum change in the accelerator stroke S can thus effect a large change in vehicle speed V. Given a low throttle sensitivity Thg condition whenever vehicle 1 undergoes short accelerated movements, should the driver DR require rapid acceleration, the final throttle sensitivity Thga can be manually switched to the standard value THGst (i.e., maximum value). When, however, the driver DR desires a slower acceleration, the final throttle sensitivity Thga is adjusted lower to allow the driver DR a less onerous accelerator pedal manipulation.

According to the eighth embodiment, the throttle sensitivity Thg obtained based upon the throttle sensitivity model output Thx is not directly employed as the final throttle sensitivity Thga. The throttle sensitivity is compared with the threshold value THGa, and the result of the comparison controls whether the minimum value THGmin or the standard value THGst is selected and employed as the final throttle sensitivity Thga.

Therefore, even when an abnormally high value of Thg results from the error adjustment routine of the throttle sensitivity Thg, the standard value THGst is set as the final throttle sensitivity Thga. Therefore, any abnormally high value of final throttle sensitivity Thga is prevented from being output to the computer 21.

Ninth Embodiment

Figure 44:
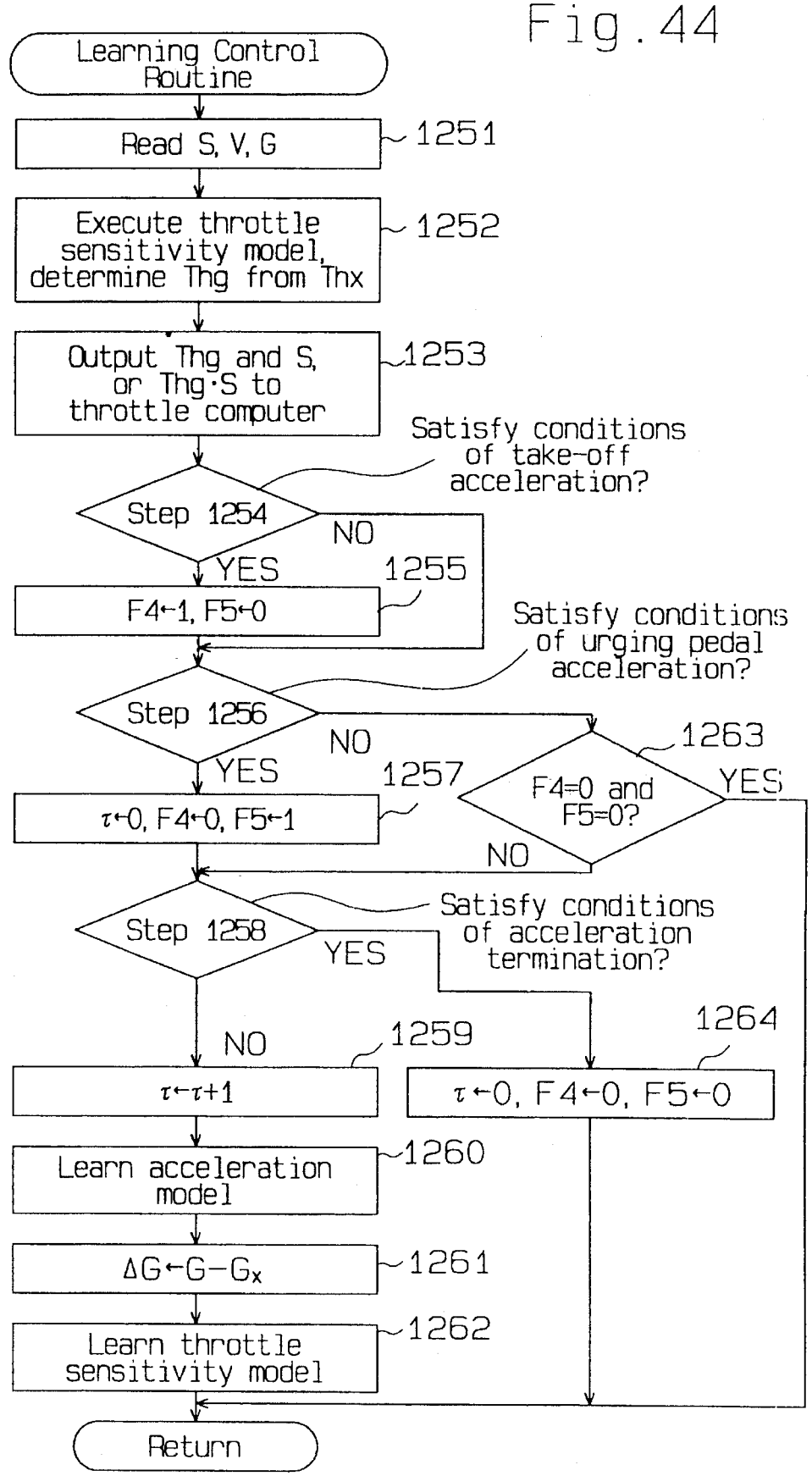
FIGS. 44 and 45 illustrate a ninth embodiment of the present invention.

The ninth embodiment according to the present invention will now be described referring to FIGS. 44 and 45.

The general structure of the driving force controller and throttle opening angle routine in this embodiment are substantially similar to that of the third embodiment (referred to FIGS. 16 and 17) and first embodiment (referred to FIG. 9) respectively, and thus their descriptions will be omitted. However, the operational contents of the learning control routine carried out by the computer 22 in the ninth embodiment differs from the first embodiment in that acceleration G is used as teaching data only during that time when the driver intends to accelerate the vehicle 1.

The operational contents of the learning control routine carried out by the computer 22 will now be described in detail referring to FIG. 44.

Each operation of the learning control routine is carried out based on a program counter, which counts the number of computations of the throttle sensitivity Thg between a time when the vehicle 1 starts accelerating and when it stops accelerating. A count value of τ results from the counting function and corresponds to the beginning and ending of the acceleration.

Acceleration is typically required when the vehicle 1 either takes off from a stopped condition, when the vehicle 1 passes other vehicles, or when the vehicle 1 follows an accelerating the vehicle at a constant distance.

Conditions for initiating acceleration takeoff are satisfactorily fulfilled if an initial acceleration takeoff level flag F4 is set to "0", if an initial urging pedal acceleration flag F5 is set to "0", and if the braking pedal 15 is not urged. Specifically, the conditions for initiating acceleration takeoff are when the stop lamp switch 14 is at a OFF state, when deviation ΔS of the accelerator stroke S (per unit time) is larger than a predetermined value (e.g., 3 percent (%)), and when the vehicle speed V is less than a predetermined value (e.g., 5 km/hr).

The initial acceleration level takeoff flag F4 indicates whether or not the conditions for acceleration takeoff are fulfilled. When the conditions are fulfilled, the level of acceleration takeoff flag F4 is set to "1"; otherwise flag F4 is set to "0".

The conditions for the initial urging pedal acceleration are met when the level of the stop lamp switch 14 is in the OFF state, when the deviation ΔS of the accelerator stroke S per unit time ΔT (e.g., 0.5 seconds) is larger than the predetermined value (e.g., 5 percent (%)), and when the vehicle speed V is less than a predetermined value (e.g., 5 km/hr).

The conditions for acceleration completion will be satisfied when one of following conditions is met.

(1) The conditions for the initial acceleration takeoff are satisfied and either the level of the initial acceleration takeoff flag F4 is equal to "1", or the conditions for the initial urging pedal acceleration initiation are met, flag F5 is equal to "1", and the stop lamp switch 14 is set to ON from the previous manipulation of the braking pedal 15.

(2) When a predetermined period of time elapses (e.g., 1 second) after the initial acceleration takeoff conditions are met, when the deviation value ΔS of the accelerator stroke S is less than a predetermined value (e.g., 10 percent (%)), and when the vehicle speed V is less than a predetermined value (e.g., 10 km/hr).

(3) When the conditions are met for either the initial acceleration takeoff or the initial urging pedal acceleration and the counted value τ equals a previously determined value 2 (e.g., 75).

For example, if the control cycle of the learning control routine is equal to 0.1 second and the first predetermined value T is equal to 75, a period of time (i.e., acceleration lasting time=request acceleration model and learning lasting time of the throttle sensitivity model) in which the counted value τ reaches the predetermined value T2 would be equal to 7.5 seconds. Furthermore, for each counted value τ, the levels of flag F4 and flag F5 are initialized to "0" when the ignition key is manipulated to the ON state for starting the engine 2.

When a predetermined period of time (i.e., 0.1 second) elapses from the initialization of the operations of last leaning control routine, the computer 22 carries out the operations of steps 1251 through 1253, which correspond to those of steps 101 through 103 in FIG. 8, respectively. At step 1251, the computer 22 reads the accelerator stroke S, acceleration G and vehicle speed V based on the signals output from the accelerator pedal sensor 11, acceleration sensor 12 and vehicle speed sensor 13, respectively. The computer 22 computes deviation ΔS according to the read accelerator stroke S. This deviation ΔS corresponds to the difference in values between the current and last accelerator stroke S.

At step 1252, the computer 22 carries out the throttle sensitivity model. That is, the computer 22 employs currently read accelerator stroke S and vehicle speed V as input values and computes the throttle sensitivity model output Thx with reference to the previously learned throttle sensitivity model characteristics. Then, the computer 22 computes the throttle sensitivity Thg through the above described equation (1) in accordance with the throttle sensitivity model output Thx.

At step 1253, the computer 22 outputs the current throttle sensitivity Thg and the accelerator stroke S to the computer 21. At this point, the computer 22 may compute the target throttle opening angle Thg.S by multiplying the throttle sensitivity Thg with the accelerator stroke S and output the result to the computer 21.

At step 1254, the computer 22 determines whether or not the conditions for the acceleration take-off initiation are satisfied; if so, the computer 22 sets the level of the flag F4 to "1", resets the level of flag F5 to "0" at step 1255, and then advances to step 1256. When the conditions of step 1254 remain unsatisfied, the computer 22 advances to step 1256 without carrying out the operation of step 1255.

Importantly, at step 1254 only the time of the initial acceleration takeoff is detected. Determining whether or not the acceleration takeoff is still under way is not performed. Therefore, if the conditions for the acceleration takeoff are satisfied and the level of the flag F4 is equal to "1", the computer 22 determines that the vehicle 1 is undergoing acceleration takeoff and skips the operation of step 1255.

At step 1256, the computer 22 determines whether or not the conditions for the initial urging pedal acceleration are met. If they are met, the computer 22 advances to step 1257, resets the values of counted value τ and flag F1 to "0", and sets the level of flag F5 to "1". If the vehicle 1 is undergoing acceleration takeoff and if the conditions for the initial urging pedal acceleration are satisfied, the computer 22 initializes τ and begins a new counting sequence.

On the other hand, if the determination conditions of step 1256 are not met, the computer 22 will advance to step 1263 and there determine if the level of both flags F4 and F5 are set to "0". If computer 22 finds both flag F4 and F5 equal to "0", it then determines that neither acceleration takeoff or urging pedal acceleration conditions exist and then terminates the learning control routine. After a particular period of time (i.e., 0.1 second) elapses from the beginning of the current leaning control routine, the computer 22 once again starts processing the operations described starting from step 1251.

Should both conditionals at step 1263 remain unmet, that is when the level of flag F1 or flag F2 is equal to "1", the computer 22 then determines that the vehicle 1 is either experiencing acceleration takeoff or an urging pedal acceleration condition and then advances to step 1258.

At step 1258, the computer 22 determines whether or not the conditions for acceleration termination are satisfied. If they are, the learning control routine advances to step 1264. Conversely, should vehicle 1 be experiencing acceleration takeoff or an urging pedal acceleration condition, the computer 22 advances to step 1259 where the value τ is increased by "1".

The computer 22 next carries out the operations of steps 1260 through 1262 in a manner similar to those taken in steps 104 and 105 of FIG. 8. At step 1260, the computer 22 carries out the learning of the particular acceleration model necessitated by the requirements of the driver DR. Here, the acceleration G of the vehicle 1 is set as master data to be compared with the accelerator stroke S and vehicle speed V in order to reduce the deviation within At step 1261, the computer 22 computes the deviation (i.e., acceleration deviation ΔG) between the acceleration G and the above-described request acceleration model output Gx. At step 1262, the computer 22 processes the learning of throttle sensitivity model wherein the acceleration deviation ΔG is set as an error signal. Computer 22 recognizes the correlation of the particular throttle opening angle Th, the accelerator stroke S and vehicle speed V as the throttle sensitivity model with acceleration deviation ΔG set as the error signal.

Following step 1262, the computer 22 temporarily suspends further operations until 0.1 second has elapsed from the beginning of the current learning control routine, at which point the learning routine begins again at step 1251.

At step 1264, the computer 22 resets the value of τ and the levels of flags F4 and F5 to "0" and temporarily suspends the operational routine starting from step 1251 until 0.1 second has elapsed since the beginning of the current control routine.

In addition, according to the ninth embodiment, the learning processes of acceleration and throttle sensitivity models are only carried out during the acceleration condition.

The computer 22 determines whether the vehicle is currently accelerating, decelerating or maintaining a constant speed, and learns the acceleration and throttle sensitivity models only when the acceleration running is detected. In this way, unnecessary throttle sensitivity adjustment Thg can be avoided.

Figure 45:
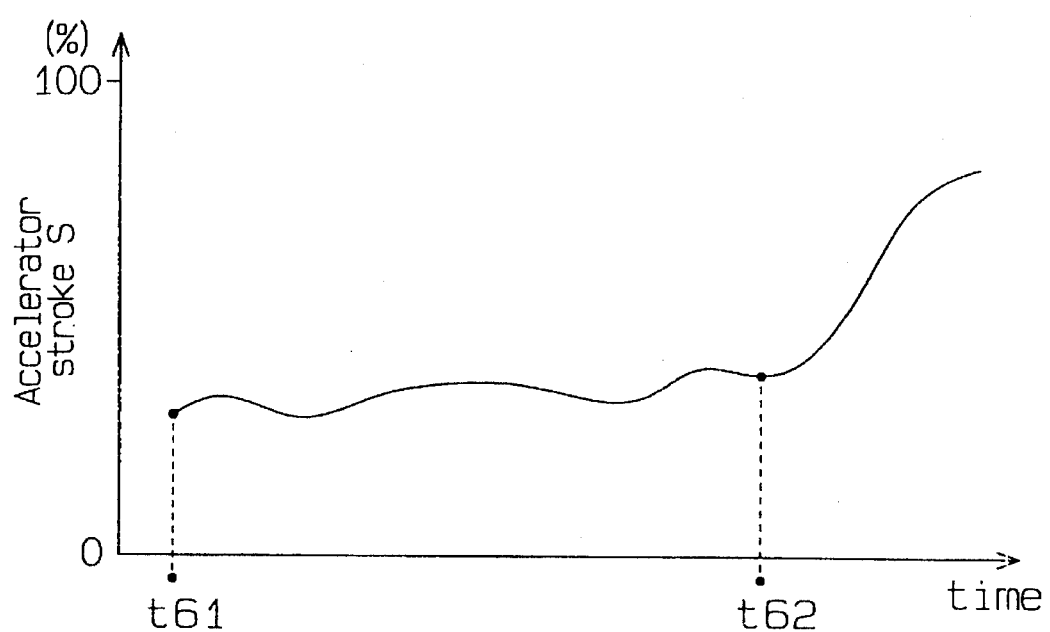

For example, assume the vehicle 1 is actually running at a constant speed, as shown in FIG. 45, between time t61 and t62. Since the vehicle is not accelerating, the processing or learning of acceleration and throttle sensitivity models are not carried out. Assume, however, the accelerator pedal 10 is sufficiently depressed as reflected at time t62. Here, the acceleration and throttle sensitivity models are processed and learned by neuro computer 22.

Despite the fact that throttle sensitivity Thg may have been determined prior to running the vehicle at a constant or decelerated running speed, throttle sensitivity Thg is never rewritten with a lower value. This arrangement differs from the conventional arrangement where the throttle sensitivity Thg is adjusted independent of the running condition of vehicle 1. As a result of the invention according to this embodiment, a comfortable driving environment may be securely achieved during accelerated running.

Tenth Embodiment

The tenth embodiment according to the present invention will now be described referring to FIG. 46 through 50.

As the throttle sensitivity Thg approaches a predetermined value over time, a new parameter called a learning value (δ), based on deviation ΔG, is set to a certain value larger or smaller than the deviation between G and Gx, i.e., ΔG.

Figure 46:
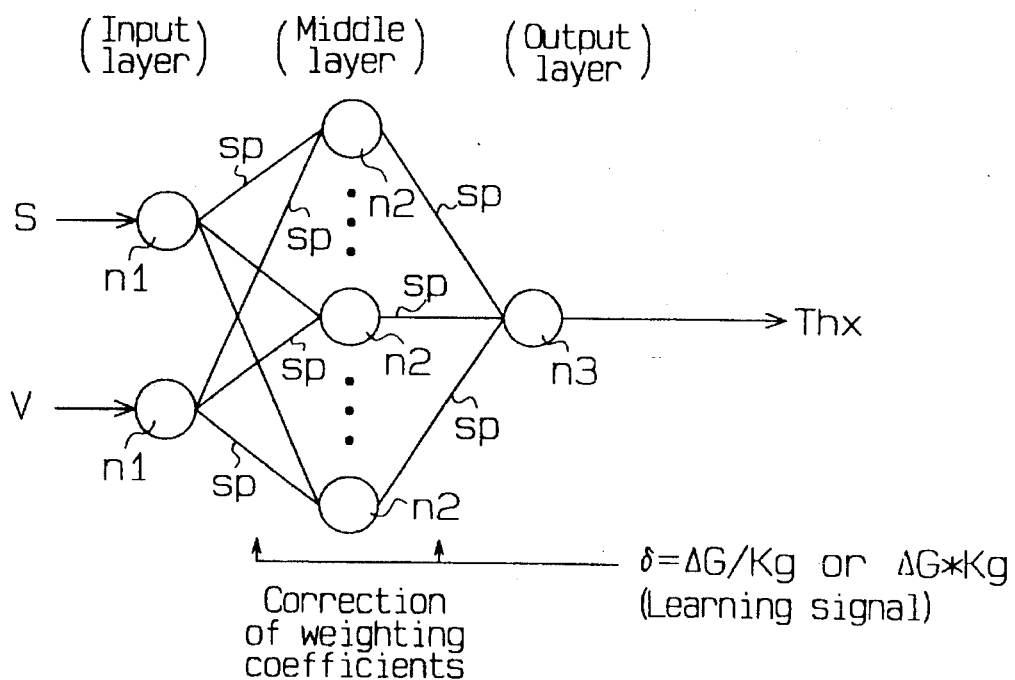
FIGS. 46 through 50 illustrate a tenth embodiment of the present invention.

As shown in FIG. 46, in a multiple layered type neural network the accelerator stroke S and vehicle speed V are input to each one of neurons n1 in an input layer. A throttle sensitivity model output Thx output from a neuron n3 is determined through the following manner. A learning value (δ) is obtained by multiplying the deviation ΔG by a correction factor (Kg) or by dividing the ΔG by a factor of Kg. The weight coefficients of all the synapses in neutrons n1, n2 and n3 are corrected based upon the learned value δ. Accordingly, the throttle sensitivity model output Thx is determined based upon the corrected weight coefficients of the synapses sp.

That is, the learned value δ is set by multiplying or dividing the acceleration G by the correction coefficient Kg. Correlation between the accelerator stroke S and vehicle speed V is learned as the throttle sensitivity model requested by the driver DR in order to decrease the learned value δ. The output result from the multiple layered type neural network is set as a throttle sensitivity model output Thx as shown in FIG. 6.

Figure 47:
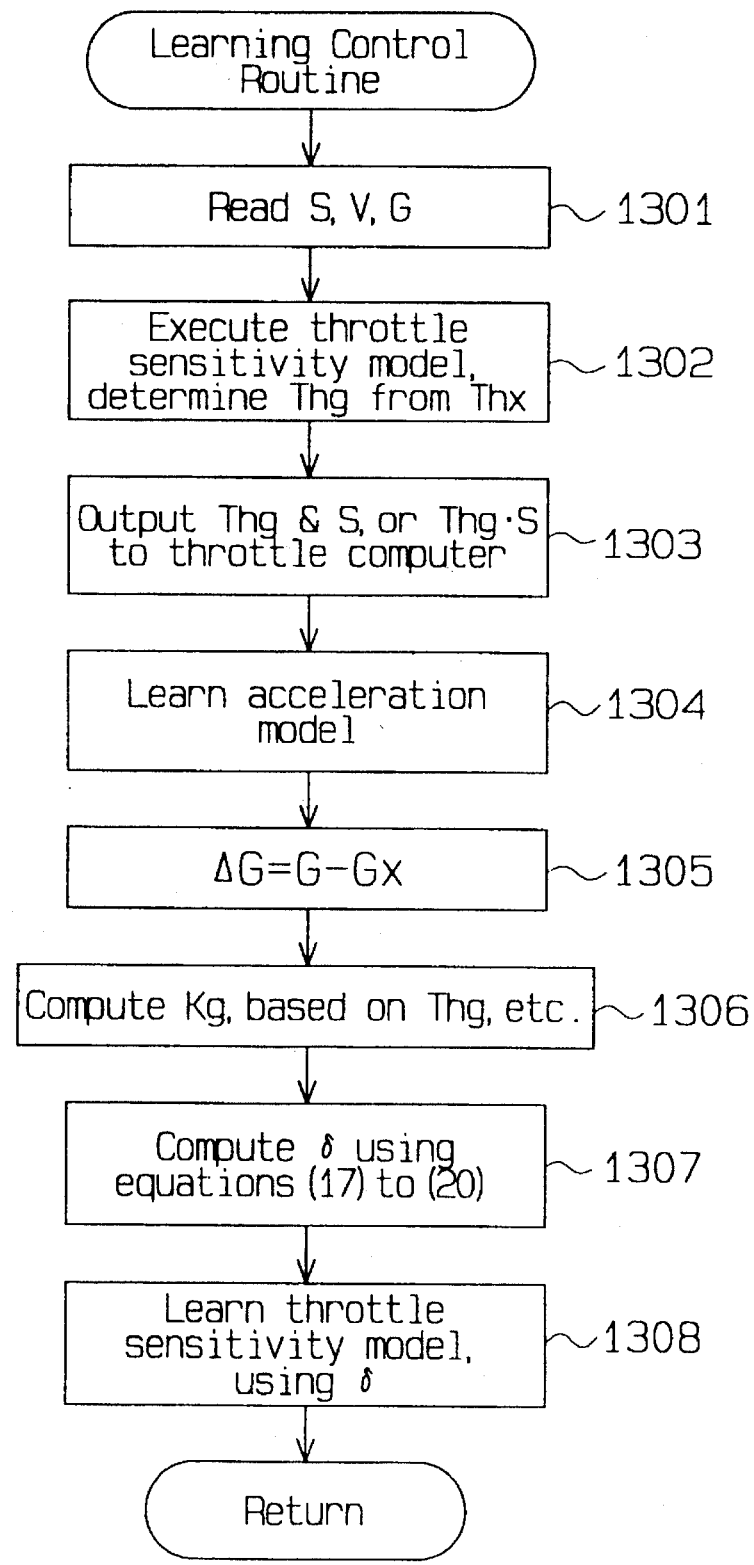

FIG. 47 shows the learning control routine that is carried out by the computer 22. After the elapse of a predetermined period of time (i.e., 0.1 second) from the beginning of the previous learning control routine, the computer 22 carries out the operations of steps 1301 through 1304, which correspond to steps 101 through 104 in FIG. 8, respectively.

At step 1301, the computer 22 reads accelerator stroke S, acceleration G and vehicle speed V in response to signals from the accelerator pedal sensor 11, acceleration sensor 12 and vehicle speed sensor 13, respectively.

Next the computer 22 at step 1302 carries out the operations of the throttle sensitivity model. In other words, the computer 22 sets the current values for accelerator stroke S and vehicle speed V as input values and computes a throttle sensitivity model output Thx referring to characteristics learned from the throttle sensitivity model. The computer 22 then computes a throttle sensitivity Thg through the above-described equation (1) according to the throttle sensitivity model output Thx.

At step 1303, the computer 22 outputs the computed throttle sensitivity Thg and accelerator stroke S to the computer 21. Alternatively, the computer 22 multiplies the throttle sensitivity Thg with the accelerator stroke S to compute a target throttle opening angle Thg.S and outputs the result to the computer 21.

At step 1304, the computer 22 learns the characteristics of the acceleration model as required by the driver DR with the acceleration G of the vehicle 1 being set as a master data. That is, the computer 22 learns the correlation between the acceleration stroke S and vehicle speed V as the acceleration model required by the driver DR in such a manner that the deviation between the acceleration G, detected by the sensor 12, and the master data is thereby minimized.

At step 1305, the computer 22 computes the deviation (i.e., acceleration deviation ΔG) between the acceleration G and the acceleration model output Gx.

At step 1306, the computer 22 determines the correction coefficient Kg through equation (16), described below, based upon the throttle sensitivity Thg computed in the current routine.

$$Kg = 1.0 + |Thgstd - Thg| * k2 \tag{16}$$

Figure 48:
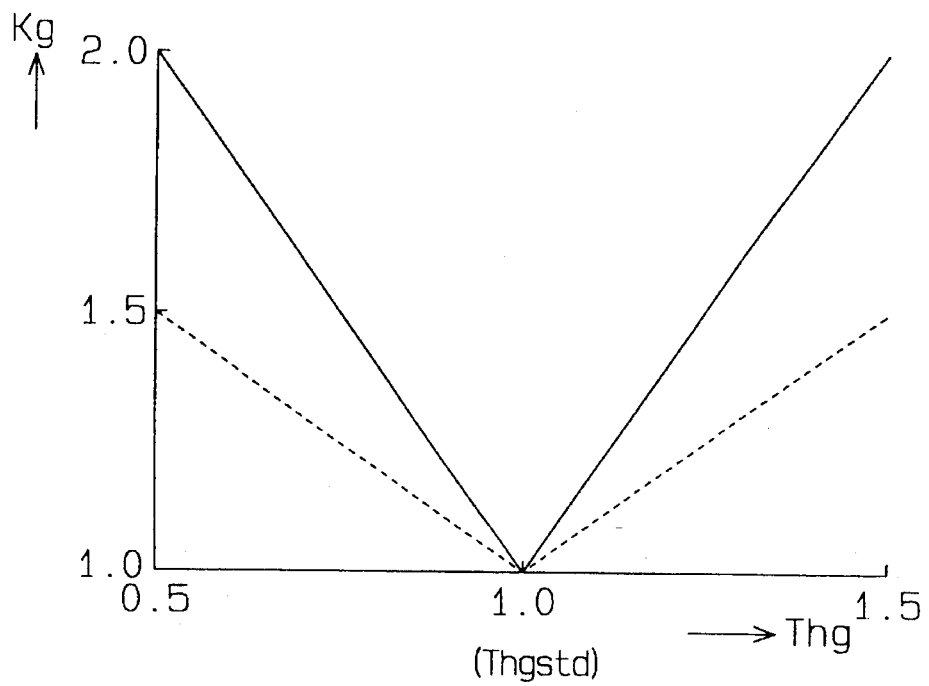

Here, Thgstd is a standard value, e.g., 1.0, and k2 is a positive constant value. The characteristic correction coefficient Kg varies as shown in FIG. 48. When the throttle sensitivity Thg equals a standard value (i.e., 1.0), the correction coefficient Kg becomes equal to 1.0, regardless of the value of k2. On the other hand, as the throttle sensitivity Thg departs from the standard value, the correction coefficient Kg becomes larger than the value equal to 1.0.

At step 1307, the computer 22 computes a learned value δ through equations (17) through (20), described below, based upon the acceleration deviation ΔG and correction coefficient Kg, which are computed in this cycle.

$$\text{If } Thg \leq Thgstd, \text{ and } \Delta G \leq \phi: \delta = \Delta G\ Kg \tag{17}$$

$$\text{If } Thg \leq Thgstd, \text{ and } \Delta G < \phi: \delta = \Delta G * Kg \tag{18}$$

$$\text{If } Thg < Thgstd, \text{ and } AF \geq \phi: \delta \Delta G * Kg \tag{19}$$

$$\text{If } Thg < Thgstd \text{ and } \Delta G < \phi: \delta = \Delta G / Kg \tag{20}$$

φ is an arbitrary constant (e.g., φ=0).

Learned value δ thus takes on the following characteristics. When the level of throttle sensitivity Thg is larger than "1" and the level of ΔG is larger than "0", or when the level of throttle sensitivity Thg is less than "1" and the level of ΔG is less than "0", the learned value δ is computed by dividing the acceleration deviation ΔG by the correction coefficient Kg. This results in a value δ, which is less than the value of acceleration coefficient ΔG. On the other hand, when the level of throttle sensitivity Thg is larger than "1" and the level of ΔG is less than "0", or when the level of throttle sensitivity Thg is less than "1" and the level of ΔG is larger than "1", the learned value δ is computed by multiplying the acceleration deviation ΔG with the correction coefficient Kg. This results in a value δ that is larger than the value of acceleration deviation ΔG.

At step 1308, the computer 22 carries out the learning processes of the throttle sensitivity model based upon the learned value δ computed in the current cycle. After the learning processes were carried out, the computer 22 does not carry out the operations at subsequent steps. The computer 22 does, however, learn the correlation of throttle opening angle Th, accelerator stroke S and vehicle speed V as the throttle sensitivity model in which the learned value δ is computed by multiplying or dividing the acceleration deviation ΔG by the correction coefficient Kg. In this way δ is used as a learning signal for correcting acceleration deviation ΔG.

For example, assume the solid straight line in FIG. 6 corresponds to an initial value of the throttle sensitivity model. When the driver DR depresses the accelerator pedal 10, thereby accelerating vehicle 1, the acceleration G of vehicle 1 is increased and the difference between the acceleration model Gx and the throttle sensitivity model is generated, as is the acceleration deviation ΔG. Accordingly, the learned value δ is computed through the above-described equations (17) through (20) based upon the acceleration deviation ΔG. When the learned value δ is set as the learning signal and when the learning processes are carried out with the intention to reduce the learned value, the throttle sensitivity model output Thx at that time will be a new throttle sensitivity model output Thx. The throttle sensitivity model will have changed from the initial value indicated by the solid line to that indicated by a broken line in FIG. 6. The correlation of throttle sensitivity model output Thx to the accelerator S and vehicle speed V is thereby learned as a continuous model rather than a partially discontinuous one.

Using this technique, the learning control routine can be processed using neural network technology. The weight coefficients of synapses sp are used as the acceleration and throttle sensitivity model characteristics which are stored in the backup RAM 26.

Therefore, according to the tenth embodiment, the deviation between the acceleration G and the request acceleration model output Gx is computed, and the correction coefficient Kg (i.e., without the case where the throttle sensitivity Thg is equal to "1") is determined. A plurality of learned values δ are computed, which correspond to the various conditions, based upon the acceleration deviation ΔG and correction coefficient Kg.

Figure 49:
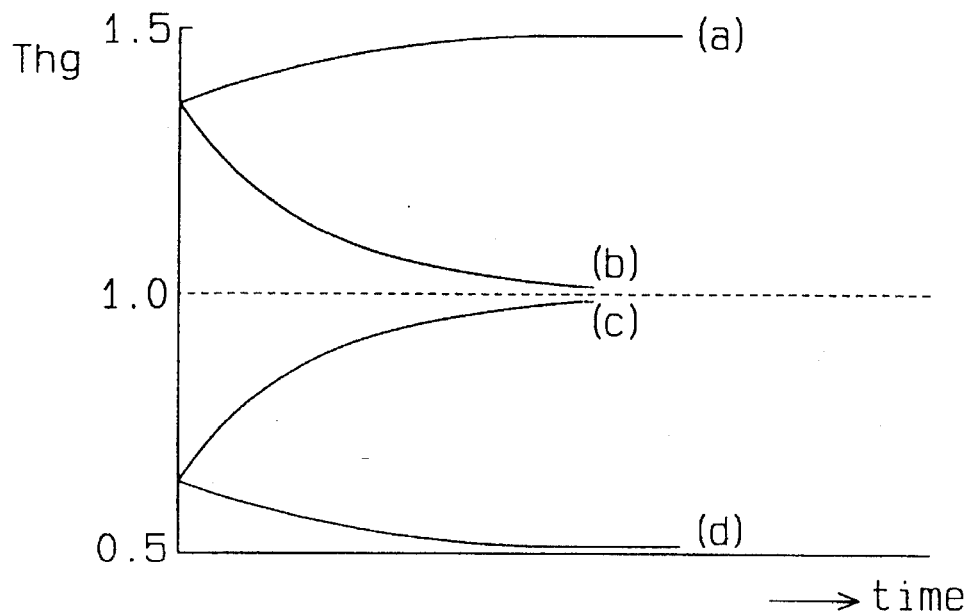

As shown in FIG. 49, when the level of throttle sensitivity Thg is larger than "1" and the level of acceleration deviation ΔG is larger than "0", the learned value δ is computed by dividing the acceleration deviation ΔG by the correction coefficient Kg. On the other hand, when the level of throttle sensitivity Thg is less than "1" and the level of acceleration deviation ΔG is less than "0", the learned value δ is computed by dividing the acceleration deviation ΔG with the correction coefficient Kg. When the throttle sensitivity Thg departs from the standard value (i.e.,=1.0), a value smaller than the acceleration deviation ΔG is set as the learned value δ and there is a decrease in the magnitude of the throttle sensitivity.

On the other hand, when the level of throttle sensitivity Thg is larger than "1.0" and the level of acceleration deviation ΔG is less than "0", the learned value δ is computed by multiplying the acceleration deviation ΔG with the correction coefficient Kg. When the level of throttle sensitivity Thg is less than "1" and the level of acceleration deviation ΔG is larger than "0", the learned value δ is computed by multiplying the acceleration deviation ΔG with the correction coefficient Kg. In other words, when the level of throttle sensitivity Thg approaches a standard value (i.e.,=1.0), a value larger than the acceleration deviation ΔG is set as the learned value δ and there is an increase in the magnitude of throttle sensitivity.

Figure 50:
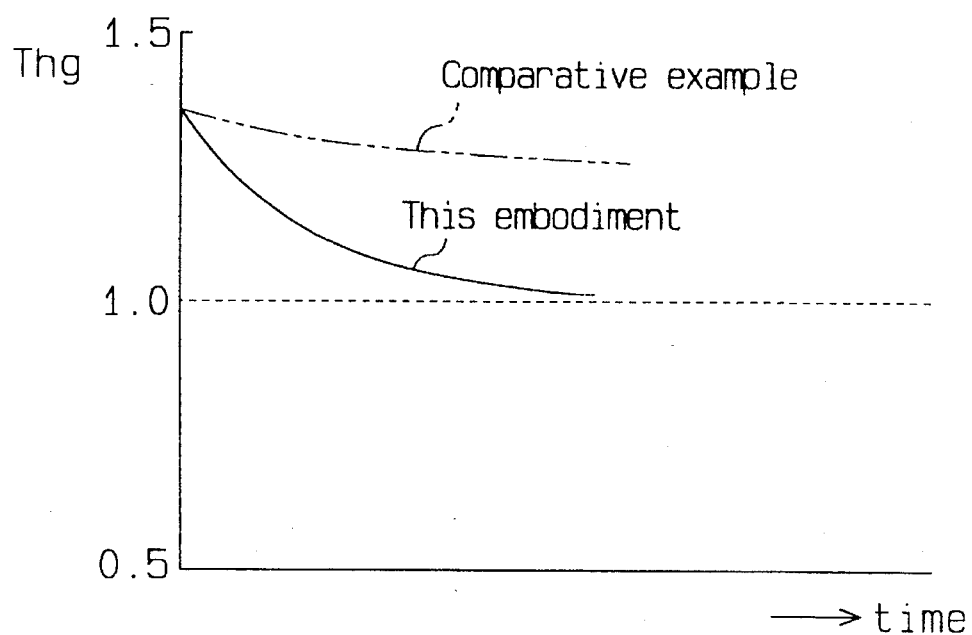

Therefore, according to the solid line shown in FIG. 50, for example, when the driver requests a low amount of acceleration under conditions of high throttle sensitivity Thg, the throttle sensitivity Thg is promptly decreased in order to decrease the rate with which the throttle opening angle Th changes. This allows the acceleration G to be promptly and precisely controlled in response to manipulation of the accelerator pedal 10.

Eleventh Embodiment

The eleventh embodiment according to the present invention will now be described referring to FIGS. 51 through 56.

In this embodiment, the response in the throttle sensitivity is increased using various learning control parameters including the accelerator stroke S to generate a the learning value (δ) which is set larger or smaller than the deviation level ΔG.

Figure 51:
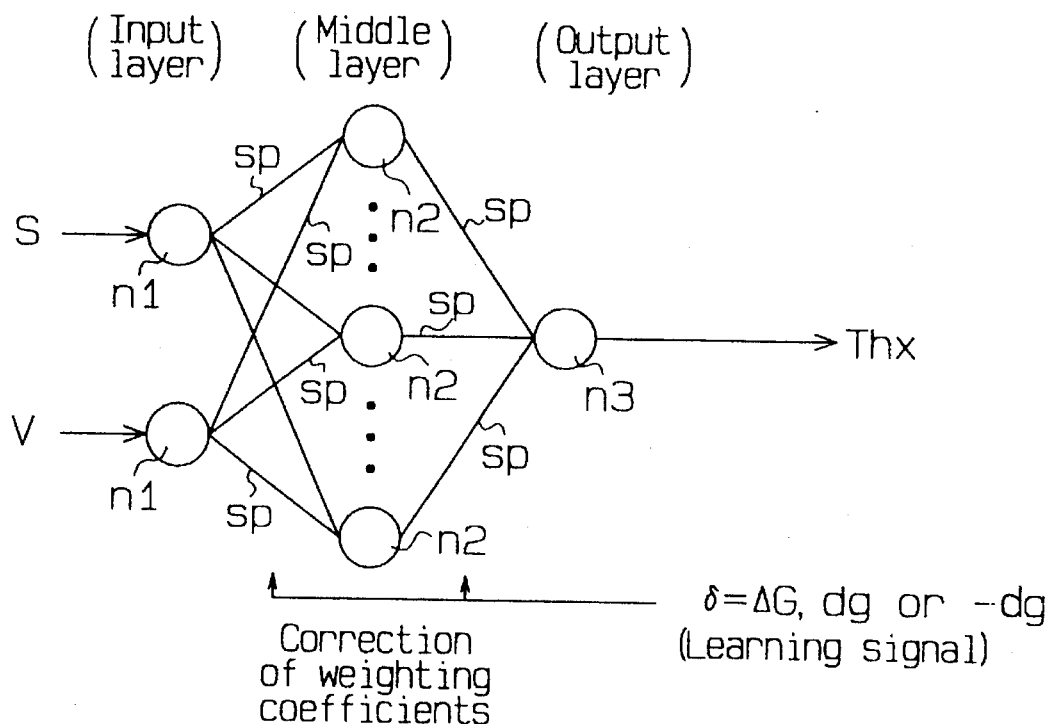
FIGS. 51 through 56 illustrate an eleventh embodiment of the present invention.
Figure 52:
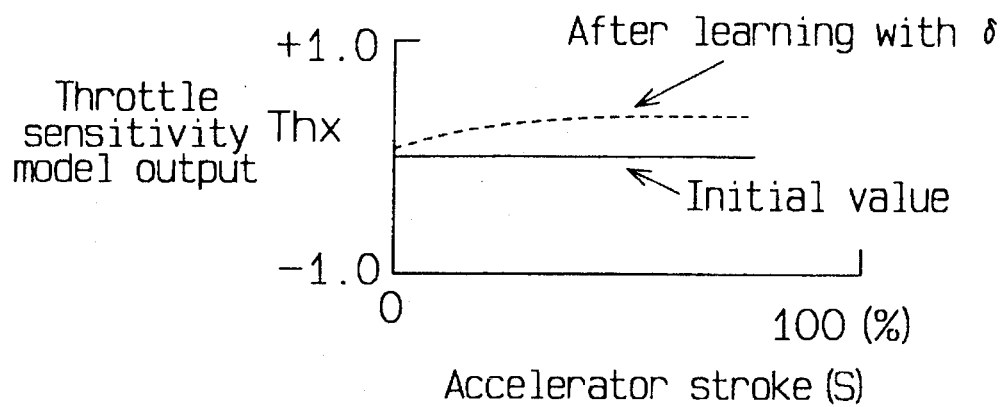
Figure 53:
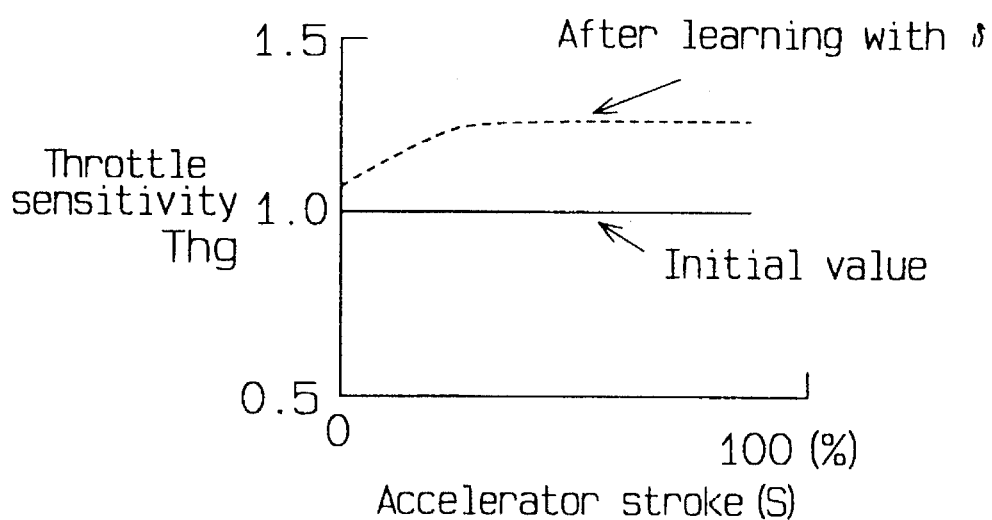

As shown in FIG. 51, according to a multiple layered neural network, accelerator stroke S and vehicle speed V are input to each one of neurons n1 in the input layer. A throttle sensitivity model output Thx, output from a neuron n3 in the output layer, is determined as follows. It is possible to use the acceleration deviation ΔG, first threshold value dg or second threshold value −dg as the learned value δ and to make corrections to the weight coefficients of all synapses sp in the neurons n1, n2 and n3 based on the learned value δ. Learned value δ is selected from the group consisting of "ΔG", "dg" and "−dg". Neuro computer 22 updates the output Thx from the neural net in order to minimize learning value δ and, from this, is able to provide an updated throttle sensitivity model having characteristics as shown in FIG. 52.

Figure 54:
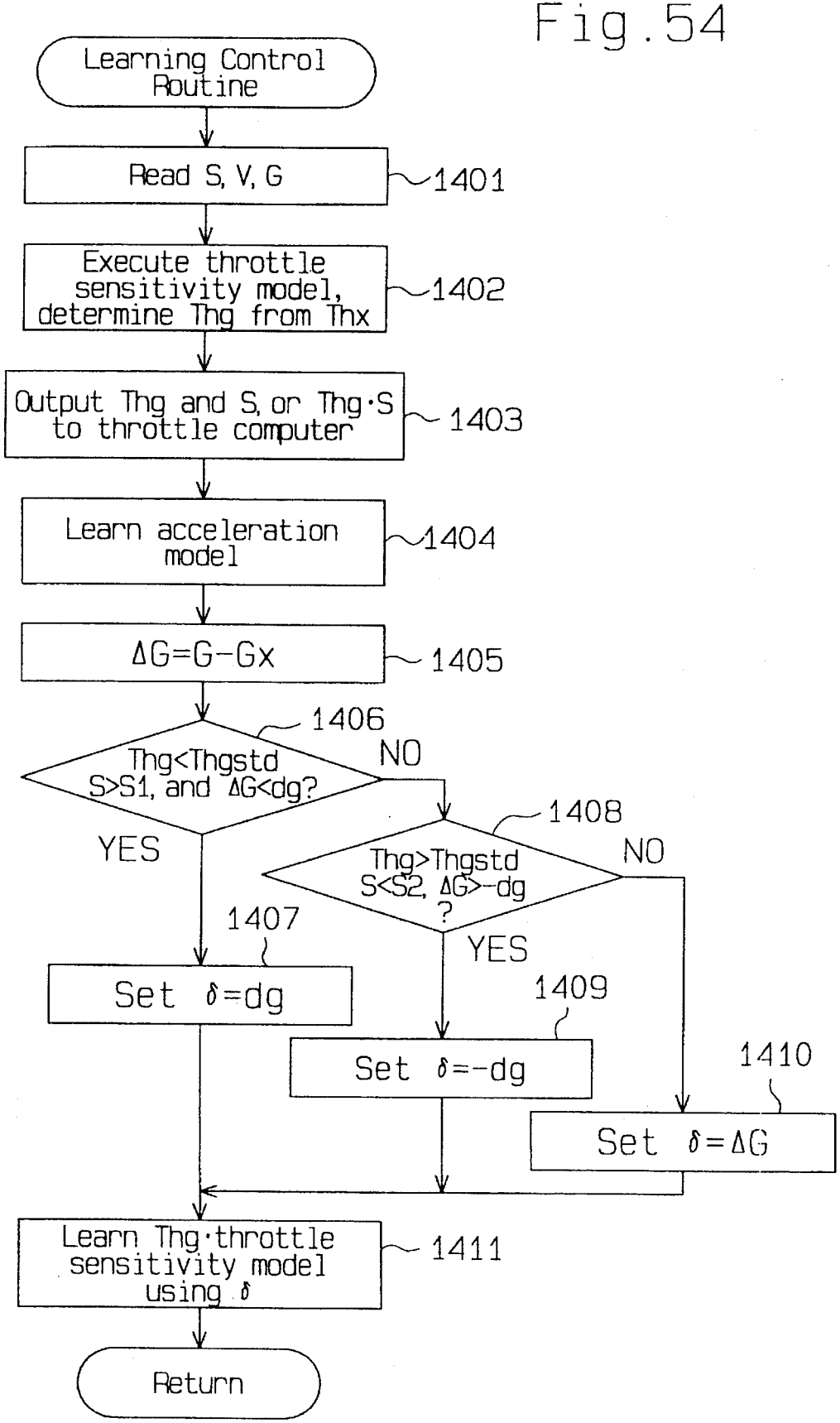

Operations of learning control routine carried out by the computer 22 will now be described referring to FIG. 54. After a predetermined period of time (i.e.,=0.1 second) has elapsed since the last routine was initiated, the computer 22 carries out the operations of steps 1401 through 1404 in a fashion similar to that performed in steps 101 through 104 in FIG. 8, respectively.

At step 1401, the computer 22 reads accelerator stroke S, acceleration G and vehicle speed V based upon signals from the accelerator pedal sensor 11, acceleration sensor 12 and vehicle speed sensor 13, respectively.

At step 1402, the computer 22 carries out the operations of throttle sensitivity model by reading input values for the accelerator stroke S and vehicle speed V. The throttle sensitivity model output Thx is computed using learned throttle sensitivity model characteristics as illustrated in FIG. 52. The computer 22 then computes a throttle sensitivity Thg through the equation (21), described below, based on the throttle sensitivity model output Thx.

$$Thg = a + Thx * k1 \tag{21}$$

a is a standard value that is set equal to 1.0 while k1 is a positive constant value for purposes of this embodiment.

At step 1403, the computer 22 outputs the throttle sensitivity Thg and accelerator stroke S, determined in this control cycle, to the computer 21. Alternatively, the computer 22 computes a target throttle opening angle Thg.S by multiplying the throttle sensitivity Thg with the accelerator stroke S for output to the computer 21.

At step 1404, the computer 22 processes learning of the acceleration model according to the acceleration requirements of driver DR with acceleration G being set as a master data. Specifically the model is learned by correlating data from acceleration G, accelerator stroke S and vehicle speed V. In this way the deviation between data for acceleration G and the master data is lessened.

At step 1405, the computer 22 computes the acceleration deviation ΔG as between the acceleration G data and the above described acceleration model output data Gx.

The computer 22 next, at step 1406, determines whether the current throttle sensitivity level Thg is less than the predetermined standard value Thgstd, whether the current accelerator stroke S is larger than the predetermined first value S1, and whether the currently computed acceleration deviation level ΔG is less than the first threshold value dg. S1 is herein set to a positive value as is the first threshold value dg, herein represented as dg=0.1(g) where (g) indicates a constant of acceleration due to gravity.

When the conditionals at step 1406 are met, the computer 22 advances to step 1407 and then sets the first threshold value dg as a learned value δ. When the conditionals at step 1406 are not satisfied, the computer 22 advances to step 1408 where it determines whether or not the current throttle sensitivity level Thg is larger than the predetermined standard value Thgstd, whether the level of accelerator stroke S read in this control cycle is less than the predetermined second value S2, and whether the level of acceleration deviation ΔG computed in this control cycle is larger than the second threshold value −dg. The second predetermined value S2 is set to a positive value while the second threshold value −dg is set to a negative value, e.g., −dg=−0.1(g) where (g) indicates a constant of acceleration due to gravity.

When the conditionals at step 1408 are satisfied, the computer 22 advances to step 1409 and then sets the second threshold value −dg as a learned value δ. Alternatively, when the conditionals at step 1408 are not satisfied, neuro computer 22 advances to step 1410, where it sets the level of acceleration deviation ΔG as a learned value δ.

At step 1411, the computer 22 next processes or learns the throttle' sensitivity model where the learned value δ is both determined from correlation of data from the throttle opening angle Th, the accelerator stroke S and vehicle speed V, and is also set as a learning signal. Following this, the learning control routine of this embodiment is temporarily suspended.

For example, the straight line drawn by a solid line in FIG. 52 indicates an initial value of the throttle sensitivity model. When the driver DR depresses the accelerator pedal 10 in order to increase the speed of the vehicle 1, the acceleration G of the vehicle 1 naturally increases, deviation data between the acceleration model output Gx and the acceleration G is generated, and acceleration deviation ΔG at the current time is computed. The learned value δ is set through one of the operations among steps 1407, 1409 or 1410, based upon the acceleration deviation ΔG and the accelerator stroke S.

When the learned value δ is set as a learning signal, and the learning processes are carried out in order to reduce the learned value δ, the current throttle sensitive model output Thx is updated from the initial value, indicated by the solid line in FIG. 52, to the value indicated by the broken line in FIG. 52. The entire correlation of the throttle sensitivity model output Thx with respect to the accelerator stroke S and vehicle speed V is learned as a continuous rather than a discontinuous model. Weight coefficients of synapses sp, as the characteristics of the acceleration and throttle sensitivity models, are rewritten and stored in the backup RAM 26.

In general terms, the deviation (i.e., acceleration deviation ΔG) between the acceleration G and the above-described acceleration model output Gx is computed, and a plurality of learned values δ corresponding to the various conditions are set based upon the acceleration deviation ΔG, throttle sensitivity Th and accelerator stroke S.

When the level of throttle sensitivity Thg is less than the standard value Thgstd, the level of accelerator stroke S becomes larger than the predetermined value S1, the level of acceleration deviation ΔG becomes less than the first threshold value dg, and the first threshold value dg is set as a learned value δ. Therefore, when the initial throttle sensitivity Thg is low and the magnitude of the depressed accelerator pedal 10 is large, the first threshold value dg, which is larger than the level of acceleration deviation ΔG, is set as a learned value δ.

Figure 55:
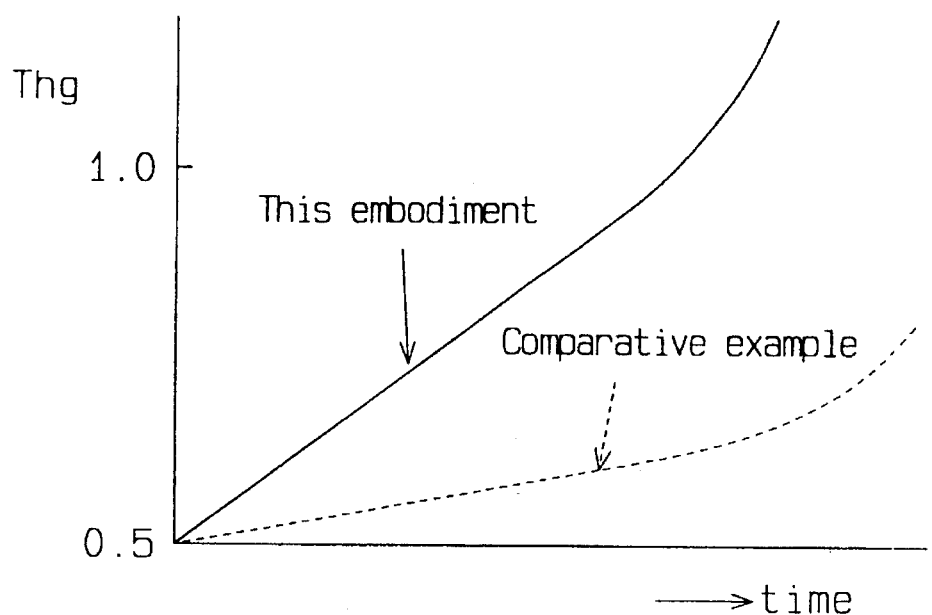

Therefore, as shown by the solid line in FIG. 55, for example, when acceleration by the driver DR is increased from when the throttle sensitivity Thg is low (e.g., throttle sensitivity Thg=0.5), the throttle sensitivity Thg is promptly increased so as to provide a more sensitive throttle opening angle Th response. For purposes of illustration this improved response is contrasted with a less responsive sensitivity angle opening represented by the broken line in FIG. 55. This means that acceleration G can be changed largely in response to the driver's depression of the accelerator pedal 10.

Figure 56:
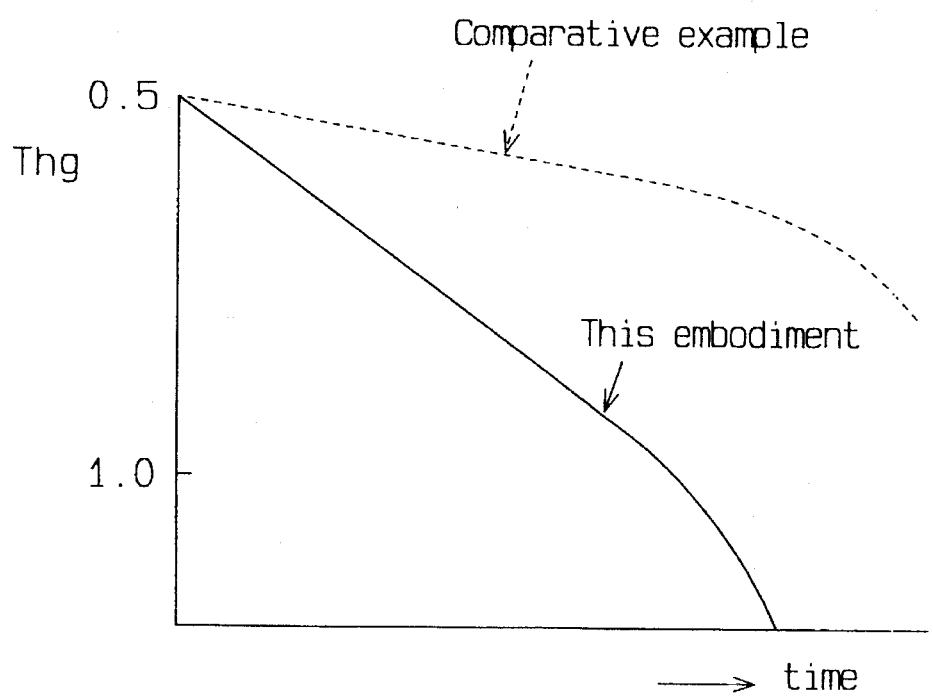

When the level of throttle sensitivity Thg is larger than the standard value Thgstd, the accelerator stroke level S is less than the second predetermined value S2, the level of acceleration deviation ΔG is larger than the second threshold value −dg, and the second threshold value −dg is set as a learned value δ. Given a slightly depressed accelerator pedal and a high initial throttle sensitivity Thg, the second threshold value −dg is set as learned value δ. Thus, when the driver DR requests less acceleration during a time when the throttle sensitivity Thg is high (e.g., throttle sensitivity Thg=1.5) as shown in FIG. 56, the throttle sensitivity Thg will be promptly decreased to lessen the throttle opening angle Th. This differs from the comparative example indicated by the broken line in FIG. 56. This illustrates that according to the present embodiment, the acceleration G can be changed by a small magnitude in response to the large magnitude of urged accelerator pedal 10.

Twelfth Embodiment

The twelfth embodiment according to the present invention will now be described referring to FIGS. 57 through 60.

According to the twelfth embodiment, when the throttle sensitivity level Thg exceeds its predetermined maximum or minimum limits, the learned value is set to "0". This forces the throttle sensitivity level Thg to either its upper or lower limit.

Figure 57:
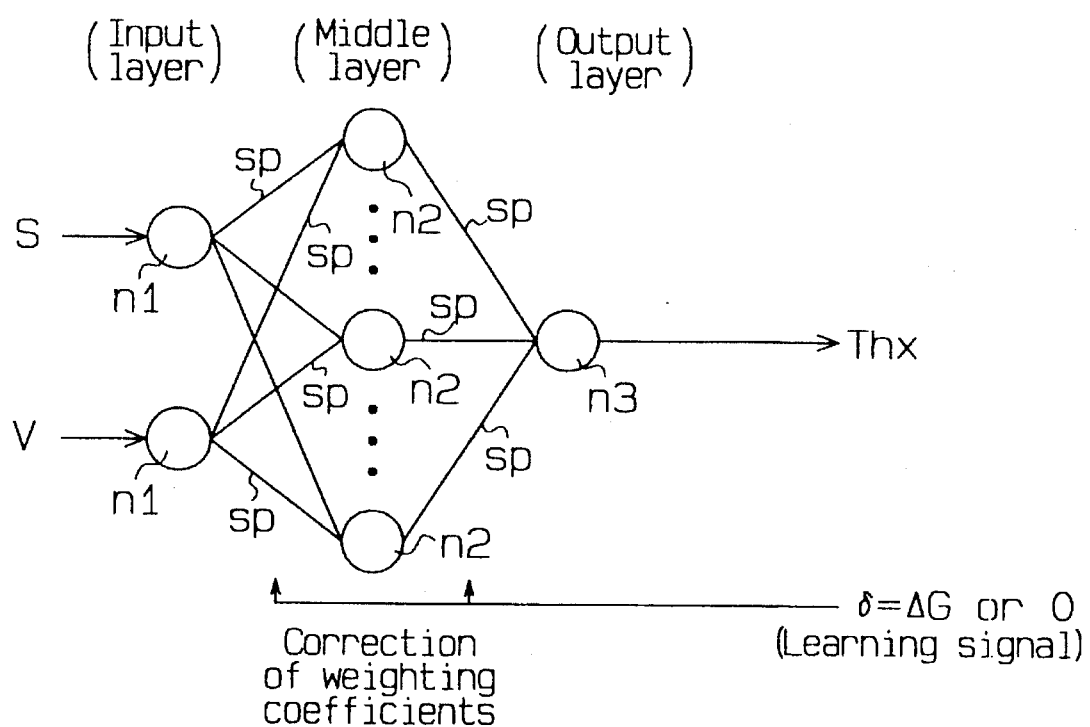
FIGS. 57 through 60 illustrate a twelfth embodiment of the present invention.

As shown in FIG. 57, according to a multiple layered neural network, accelerator stroke S and vehicle speed V are input to each one of neurons n1 in the input layer thereof. A throttle sensitivity model output Thx, output from a neuron n3 in the output layer, is determined using acceleration deviation ΔG as a learned value δ for correcting the coefficients of synapses sp of the neurons n1, n2 and n3. By correlating the throttle opening angle, the accelerator stroke S and vehicle speed V, a throttle sensitivity model is learned according to the requirements of the driver DR in order to minimize the learned value δ. The output from the multi layered neural network is employed as a throttle sensitivity model output Thx.

Figure 58:
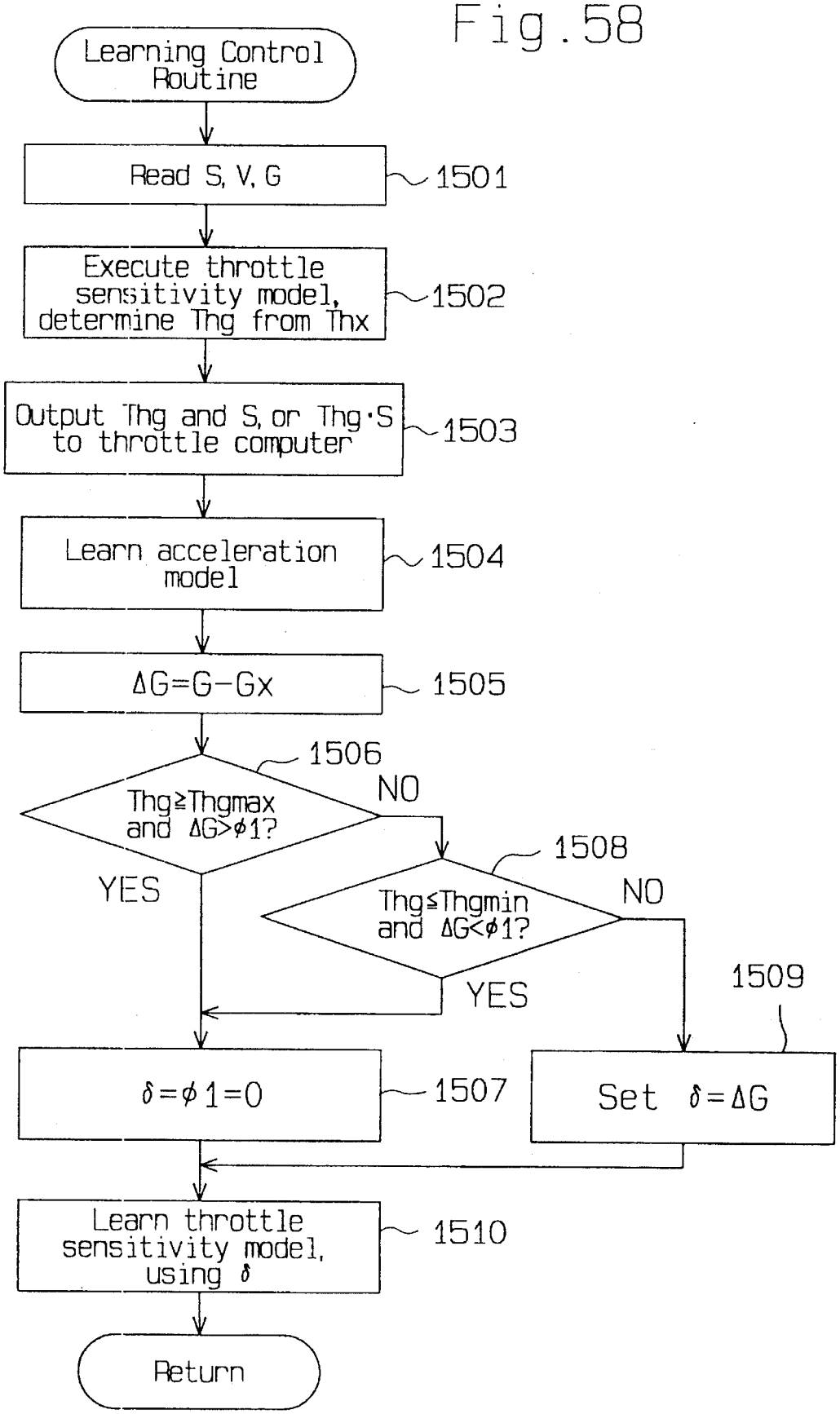

With reference to FIG. 58, computer 22 processes the steps at 1501 to 1504 after a predetermined period of time (i.e.,=0.1 second) has elapsed since the beginning of the last control routine. Steps 1501 through 1504 are similar to those of steps 101 through 104 in FIG. 8, respectively. At step 1501, the computer 22 reads accelerator stroke S, acceleration G and vehicle speed V based upon signals from the accelerator pedal sensor 11, acceleration sensor 12 and vehicle speed sensor 13.

At step 1502, the computer 22 initiates the throttle sensitivity model operation by reading values for the accelerator stroke S and the vehicle speed V. Throttle sensitivity model output Thx is computed by referring to characteristics of the learned throttle sensitivity model (referred to FIG. 52). The computer 22 then computes a throttle sensitivity Thg through the equation (21), described above, using throttle sensitivity model output Thx.

At step 1503, the computer 22 outputs currently determined values for the throttle sensitivity Thg and accelerator stroke S to the computer 21. Alternatively, the computer 22 computes a target throttle opening angle Thg.S by multiplying the throttle sensitivity by the accelerator stroke S, and outputs the result to the computer 21. At step 1504, the computer 22 carries out the learning process of the particular acceleration model required by the driver DR. Acceleration G is both correlated with accelerator stroke S and vehicle speed V to produce the acceleration model and is set as a master data. At step 1505, the computer 22 computes the acceleration deviation ΔG according to the acceleration G and the acceleration model output Gx. Next at step 1506, the computer 22 determines whether or not the current throttle sensitivity level Thg is larger than the predetermined upper limit Thgmax, here "1.5" of the sensitive adjustment region. Also at step 1506, the currently computed acceleration deviation ΔG is checked to determine whether it is larger than the predetermined value φ1, which according to the present embodiment is set to "0". Both the upper limit value Thgmax and the lower limit value Thgmin (i.e., Thgnin will be described afterward) of the sensitivity adjustment region are stored in the backup RAM 26.

With the conditionals at step 1506 satisfied, the computer 22 advances to step 1507 where it sets the learned value δ as a predetermined value φ1. Conversely, when the determining conditions of step 1506 are not met, the computer 22 advances to step 1508 and determines whether the currently determined throttle sensitivity level Thg is less than the predetermined lower limit value Thgmin of the sensitivity adjustment region. The acceleration deviation ΔG is set less than the predetermined value φ1 (i.e.,="0") and the lower limit value Thgmin is set to "0.5". Put differently, at step 1508 the computer 22 determines whether or not the level of throttle sensitivity Thg is less than the lower limit value Thgmin of the sensitivity adjustment region so that throttle sensitivity Thg is possibly further reduced.

When the determining conditions of step 1508 are satisfied, the computer 22 moves to step 1507 and then sets the learned value δ to the predetermined value δ i.e.,"0". When the determining conditions of step 1507 are not satisfied, the computer 22 advances to step 1509 where it sets the acceleration deviation ΔG as the learned value δ. At step 1510, the computer 22 out the learning processes of the throttle sensitivity model with learned value δ being used as a learning signal.

For illustration of this, the straight solid line provided in FIG. 52 indicates an initial value of the throttle sensitivity model. When the driver DR depresses the accelerator pedal 10 to increase the speed of the vehicle 1, a deviation between the request acceleration model output Gx and the acceleration G is generated and the current value for acceleration deviation ΔG is computed. The learned value δ is set through either one of operations of steps 1507 or 1509, based upon the acceleration deviation ΔG and the accelerator stroke S.

With the learned value δ set as a learning signal, in order to reduce the learned value δ, a new throttle sensitive model output Thx is generated. This is illustrated in FIG. 52 with the solid line representing the initial value and the broken line representing new model characteristics. Like previous embodiments, the correlation of the throttle sensitivity model output Thx with accelerator stroke S and vehicle speed V is learned as a continuous rather than a discontinuous model.

If the learned value δ is equal to "0", the learning processes are not actually carried out. In other words, when the throttle sensitivity Thg is larger than the upper limit value Thgmax, and when the acceleration deviation ΔG is larger than the predetermined value φ, the learned value δ is set as a predetermined value i.e., "0". Similarly for the case when the level of throttle sensitivity is less than the lower limit value Thgmin and the acceleration deviation ΔG is less than the predetermined value φ. Here also, the learned value δ is set as a predetermined value i.e., "0". In either case, the learning process is not actually out. The level of throttle sensitivity Thg is maintained equal to either the upper limit value Thgmax or the lower limit value Thgmin of the sensitivity adjustment region. Weight coefficients of synopses sp are stored in the backup RAM 26 as the characteristics of acceleration and throttle sensitivity models.

Thus, according to the twelfth embodiment, the learning processes are never actually carried out in the region above the upper limit value Thgmax. Consequently, the level of throttle sensitivity Thg never exceeds but rather is maintained at the upper limit value Thgmax.

Figure 59:
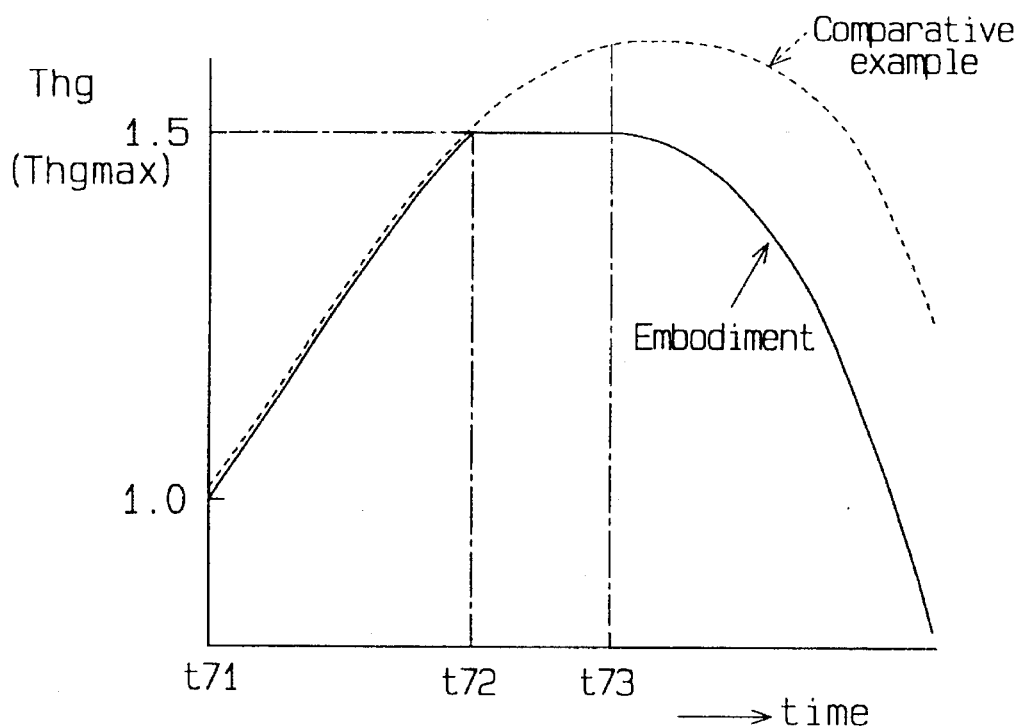

FIG. 59 is provided to illustrate the change in the throttle sensitivity Thg when the acceleration of vehicle 1 is rapidly decreased at time t71. The solid line in FIG. 59 indicates the present embodiment while the broken line indicates a contrasting control configuration. In the comparative example, the level of throttle sensitivity Thg increases from time t71 to time t72, where it reaches the upper limit value Thgmax, and it continues to increase until time 73. According to the present embodiment, however, after the throttle sensitivity reaches the upper limit value Thgmax at time t72, it remains constant at Thgmax until the acceleration required by driver DR begins to decrease at time t73. This advantageously allows for superior response in throttle sensitivity Thg, especially in situations necessitating a rapid decrease in sensitivity level Thg, since the throttle sensitivity Thg never exceeds the upper limit value Thgmax.

Likewise, the actual learning processes are never carried out in the region below the lower limit value Thgmin, so that the level of throttle sensitivity Thg never drops below the lower limit value Thgmin. In this case, the level of throttle sensitivity Thg is maintained at a value equal to the lower limit value Thgmin.

Figure 60:
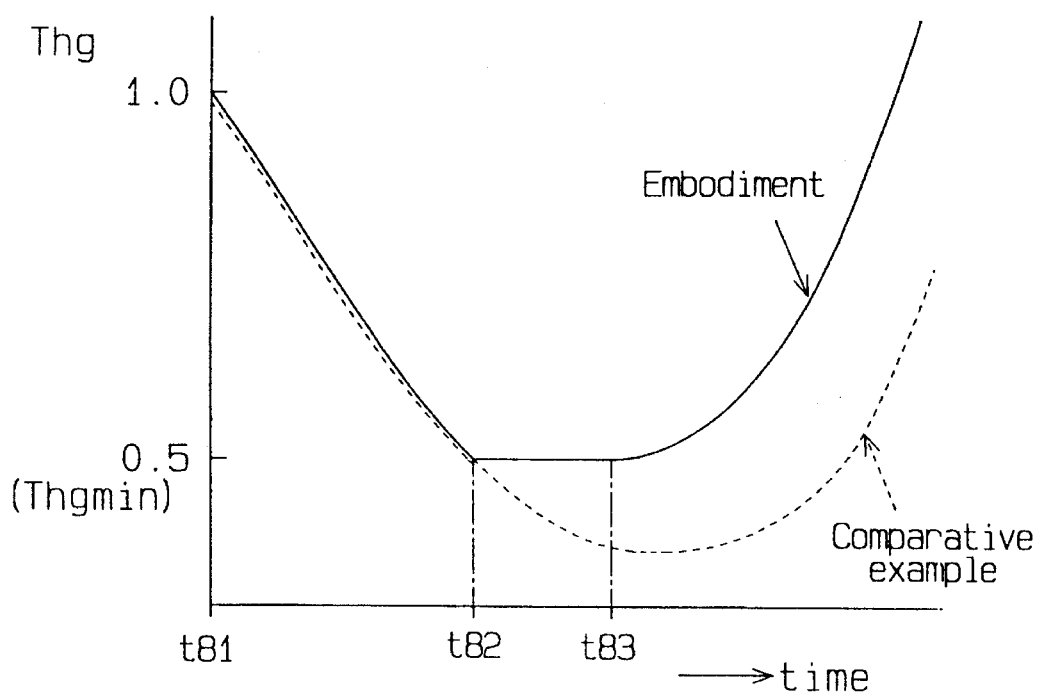

FIG. 60 shows the change in the throttle sensitivity Thg when the request acceleration is rapidly increased after a period of decreasing acceleration. The solid line in FIG. 60 indicates the actual embodiment, and the broken line thereof indicates the comparative embodiment.

According to the comparative embodiment, the throttle sensitivity Thg decreases from time t81, and reaches the lower limit value Thgmin at time t82. Thereafter, the throttle sensitivity Thg continuously decreases until time t83.

However, according to the present embodiment, the throttle sensitivity Thg decreases only until it reaches the lower limit value Thgmin at time t82, where remains at value Thgmin until an increase in acceleration is required by the driver DR. The present embodiment allows the throttle sensitivity Thg to undergo rapid increases since the throttle sensitivity Thg never drops below the lower limit value Thgmin. This results in a superior vehicle power control by means of improved throttle sensitivity to changes in acceleration required by the driver DR.

Thirteenth Embodiment

The thirteenth embodiment according to the present invention will now be described referring to FIGS. 61 and 62.

According to the thirteenth embodiment, a "learning rate" is employed in the learning control routine to improve the learning of the throttle sensitivity model by neuro computer 22 given a condition where a decreasing throttle sensitivity level Thg is larger than a predetermined standard value.

Figure 61:
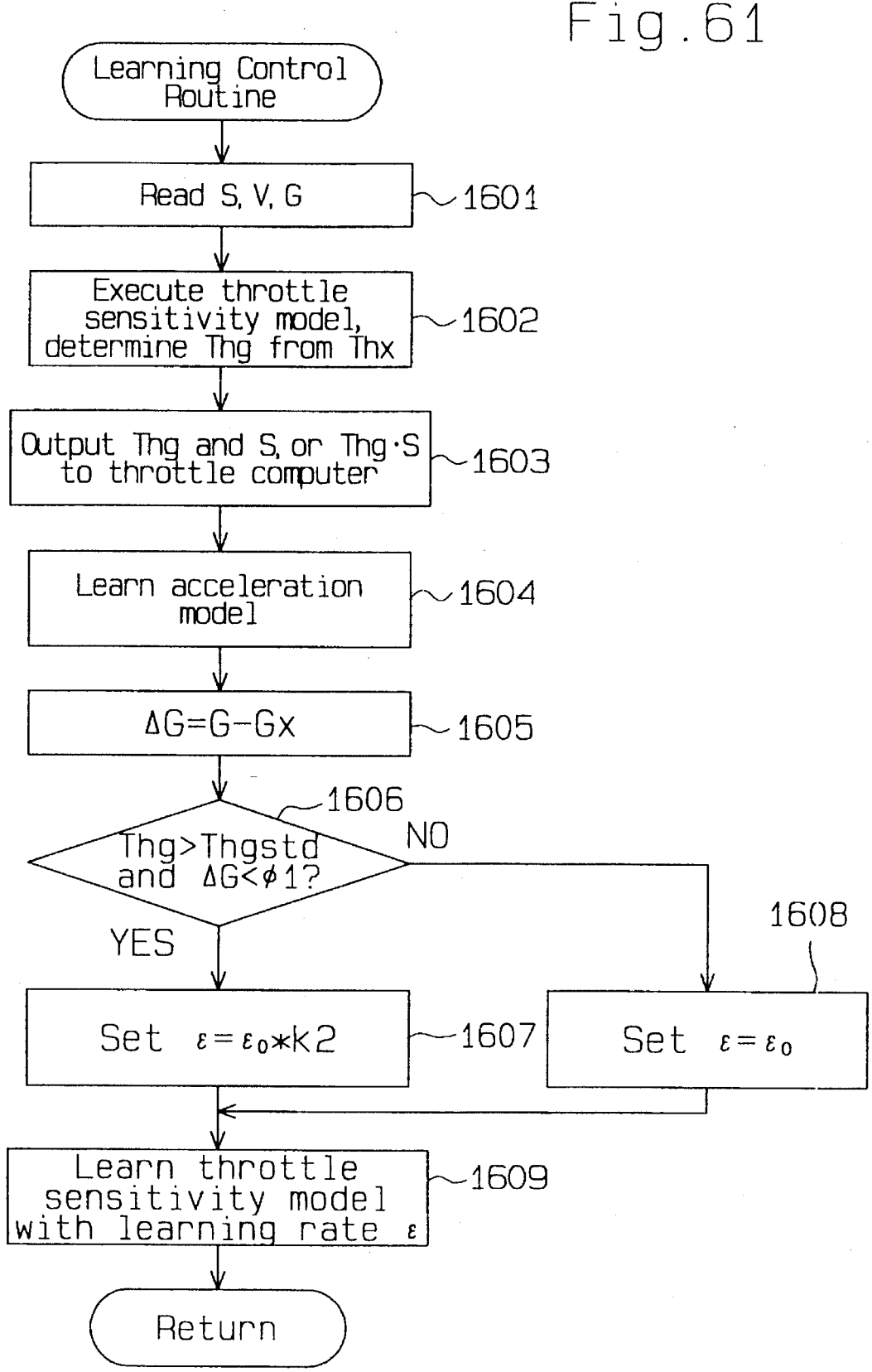
FIGS. 61 and 62 illustrate a thirteenth embodiment of the present invention.

FIG. 61 shows a learning control routine that is carried out by the neuro computer 22 according to the thirteenth embodiment. The learning program, which is stored in the ROM 24, uses the neural network technology and includes a data parameter called a "learning rate" ($\epsilon$). This new parameter supplements the use of the "weighting coefficients" used in previous embodiments in order to more accurately determine the throttle sensitivity level. Generally, in the field of Neural Network Technology the term "learning rate" describes the process by which previously acquired data is processed with newly acquired data to control the progression of subsequent computer routines. The learning rates in the first through twelfth embodiments are effectively a constant value and are therefore not referred to by the individual routines. However, the learning rate $\epsilon$ in the thirteenth embodiment varies according to vehicle conditions and, therefore, is used by the routine.

The learning control routine according to this embodiment is described in FIG. 61. The routine is initialized only after period of time (i.e., 0.1 second) after the beginning of the previous routine. In this embodiment, steps 1601 through 1604 are similar to the steps 101 through 104 of the routine described in FIG. 8.

At step 1601, the computer 22 reads accelerator stroke S, acceleration G and vehicle V, based on the accelerator pedal sensor 11, acceleration sensor 12 and vehicle speed sensor 13, respectively.

At step 1602, the computer 22 caries out the throttle sensitivity model. In other words, the computer 22 sets the currently read accelerator stroke S and vehicle speed V as input values and computes a throttle sensitivity model output Thx referring to the learned characteristics of the throttle sensitivity model (referred to FIG. 6). The computer 22 then computes a throttle sensitivity Thg through the above described equation (21) according to the throttle sensitivity model output Thx.

At step 1603, the computer 22 outputs the computed throttle sensitivity Thg and accelerators stroke S to the computer 21. Alternatively, the computer 22 multiplies the throttle sensitivity Thg by the accelerator stroke S to compute a target throttle opening angle Thg.S and outputs the result to the computer 21.

At step 1604, the computer 22 carries out the learning operation of the acceleration model according to the particular acceleration requirements of the driver DR. In the present embodiment acceleration G of the vehicle 1 is set as a master data. That is, the computer 22 learns the correlation between the acceleration stroke S and vehicle speed V such that the deviation between the acceleration G detected by the sensor 12 and the master data is effectively minimized.

At step 1605, the computer 22 computes the deviation (i.e., acceleration deviation $\Delta G$) between the acceleration G and the request acceleration model output Gx.

At step 1606, the computer 22 determines whether or not the level of throttle sensitivity Thg computed in this control cycle is larger than the predetermined standard value Thgstd and whether the acceleration deviation $\Delta G$ computed in this control cycle is less than the predetermined value $\phi 1$. The standard value Thgstd is, according to this embodiment, equal to "1.0" while the predetermined value $\phi 1$ is set equal to "0".

This in effect results in the computer 22, at step 1606, determining whether or not the throttle sensitivity Thg is decreasing from the condition where it is larger than "1.0". When the acceleration level becomes small enough, the acceleration deviation $\Delta G$ will be determined as a negative value.

When the conditional at step 1606 is satisfied, the computer 22 multiplies the standard learning rate $\epsilon_o$ by the constant value k2 and sets the result of this multiplication as a learning rate $\epsilon$. However, according to the thirteenth embodiment, the standard learning rate $\epsilon_o$ is equal to "0.2" and the constant value k2 is equal to "0.5". That is, at step 1607, the learning rate $\epsilon$ is set to

"0.2*0.5=0.1".

On the other hand, when the conditional at step 1608 is not met, the computer 22 sets the standard learning rate $\epsilon_o$ as the learning rate $\epsilon$. Therefore, at step 1608, the learning rate $\epsilon$ would be set to "0.2".

At step 1609, the computer 22 carries out the operations of the throttle sensitivity model using the learning rate $\epsilon$ set at either step 1607 or 1608 and with the acceleration deviation $\Delta G$ computed in this control cycle as an error signal. In other words, the computer 22 learns the correlation of throttle opening angle Th with respect to the accelerator stroke S and vehicle speed V as the throttle sensitivity model. After this, the computer 22 temporarily discontinues the learning control routine.

To illustrate the above explained routine, assume a solid straight line in FIG. 6 corresponds to an initial value of the throttle sensitivity model. When the driver DR depresses the accelerator pedal 10 in order to accelerate the vehicle 1, the acceleration G of vehicle 1 is increased and the difference between the acceleration model Gx and the throttle sensitivity model is generated so that the acceleration deviation $\Delta G$ at that time is computed. With $\Delta G$ set as an error signal, the throttle sensitivity model output Thx changes from the initial value indicated by the solid line to the characteristic indicated by the broken line in FIG. 7. That is, the entire correlation of throttle sensitivity model output Thx with respect to the accelerator S and vehicle speed V is learned as a continuous model rather than a discontinuous model.

However, in the case where the throttle sensitivity Thg is larger than the standard value Thgstd and the acceleration deviation ΔG is less than the predetermined value φ, the learning rate ε is set to a small value "0.1". Otherwise, the learning rate ε would be set to the relatively larger value "0.2". When the throttle sensitivity Thg is larger than the standard value Thgstd and the acceleration deviation ΔG is less than the predetermined value φ, the rate with which the stored throttle sensitivity data Thg is used increases.

Figure 62:
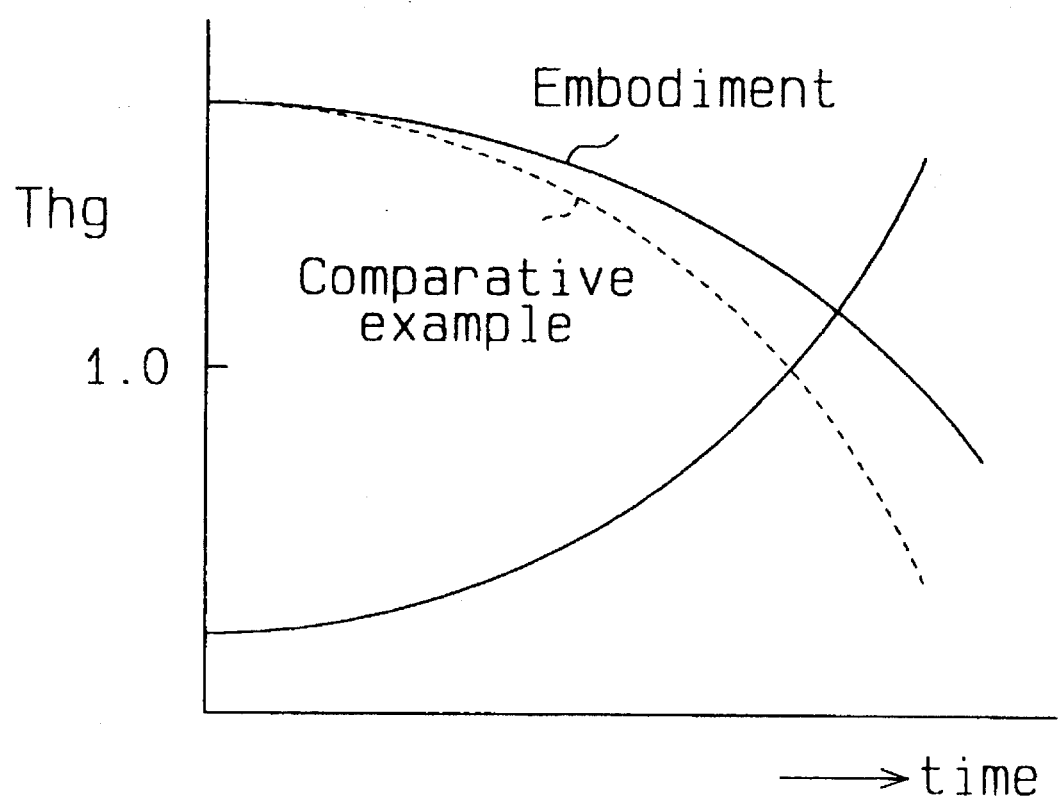

Therefore, as shown in FIG. 62, when the throttle sensitivity Thg decreases, the magnitude of the changing sensitivity is small compared to when the throttle sensitivity rate increases. In other words, the throttle sensitivity Thg becomes less sensitive for a longer period of time when Thg decreases versus the condition when Thg increases. Therefore, the changing rate of sensitivity can be preferably matched to the driver's intentions.

Although only thirteen embodiments of the present invention have been described in detail herein, it should be apparent to those skilled in the art that the present invention may be embodied in many other specific forms without departing from the spirit or scope of the invention. Particularly, it should be understood that the following modes may be applied.

According to the first through thirteenth embodiments, the gasoline engine 2 is employed as the power source of the vehicle 1. An electric motor such as a DC motor in an electric vehicle can be employed as a power source thereof. If the electric motor is employed, an electric current control circuit for controlling the currents to the electric motor should be employed in place of the linkless type throttle valve which is for controlling the output power from the engine 2.

According to the first through thirteenth embodiments, an accelerator lever or other manipulating parts can be employed in place of the accelerator pedal 10 that is manipulated by the driver DR.

According to the first through thirteenth embodiments, a sensor for detecting the magnitude of the force applied to the accelerator pedal 10 can be employed in place of the accelerator pedal sensor 11 that is for detecting the accelerator stroke S. Furthermore, both an accelerator pedal sensor for detecting the accelerator stroke S and a sensor for detecting the magnitude of the force applied to the accelerator pedal can be employed in combination.

According to the first through thirteenth embodiments, acceleration of the vehicle 1 is directly detected by means of the acceleration sensor 12. However, an acceleration G can be computed by taking time differential of vehicle speed V, detected by means of the vehicle speed sensor 13.

According to the first through thirteenth embodiments, throttle sensitivity Thg is computed through either equation (1) or equation (2) while a throttle sensitivity model outputted Thx is set as a correction value for the throttle sensitivity. The throttle sensitivity Thg can be directly output. If this arrangement is employed, an initial value thereof when the vehicle 1 is just to be shipped out of the factory is learned to output a standard value a.

According to the first through thirteenth embodiments, a multi layered neural network is employed as a neural network technology in the neuron computer 22. A mutual connection type neural network can also be employed.

According to the second embodiment, divisors M and N for the accelerator stroke S and vehicle speed V as parameters X and Y in the maps are set to "4", respectively. The divisors M and N can be preferably increased or deceased. However, when the divisors M and N are increased, the presumed error through the map is decreased and the operational period of time for learning becomes long.

According to the second embodiment, the function Wxy reflects the influence that one data section of the data map has from another section. The function Wxy may be replaced with a new function as the inverse of the squared distance ($1/Dxy^2$).

According to the second embodiment, the accelerator stroke S and vehicle speed V are equally divided as the parameters X and Y in each map. Parameters X and Y can be differentially divided. For example, a small region of accelerator stroke S can be finely divided.

According to the third embodiment, a standard value $THG_o$ of a learning control routine in FIG. 15 can be a mean value located between the minimum value THGmin and the maximum value THGmax of throttle opening angle Thg. The standard value $THG_o$ can be altered within a region that satisfies the abovedescribed condition with a value equaling "1.0".

Figure 16:
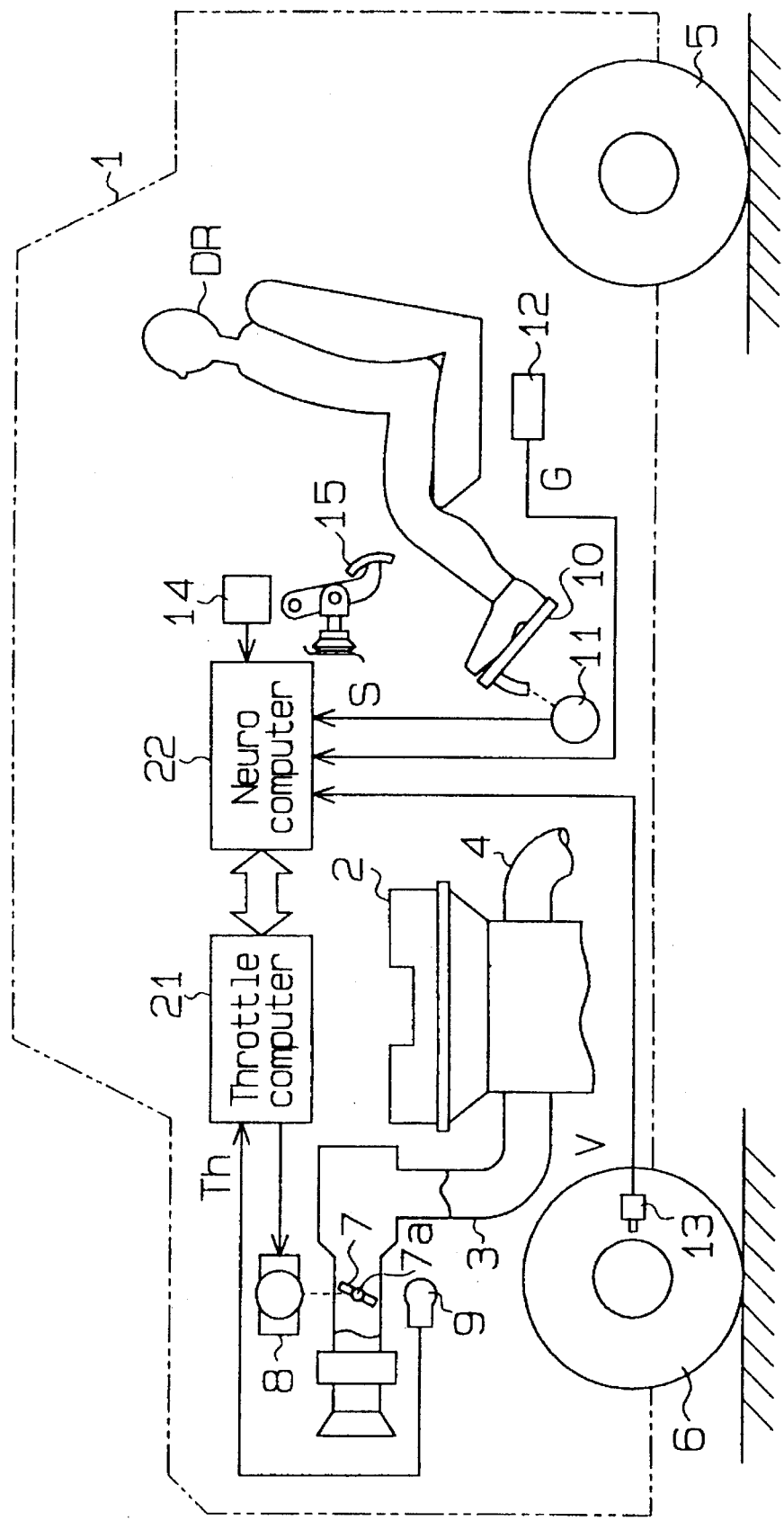
FIGS. 16 through 21 illustrate a third embodiment of the present invention.

According to the third embodiment, a correction coefficient mi for adjusting the throttle sensitivity Thg is set to correspond to the characteristic indicated in the map of FIG. 16. However, the characteristic can be changed. For example, as shown by a double-dotted broken line in FIG. 19, the correction coefficient mi can be set to a fixed value regardless of number of the adjusting operations carried out to adjust the throttle sensitivity. If this arrangement is employed, the throttle sensitivity Thg shown by the double dotted line in FIG. 20 is to be changed by a constant rate (in this case, decreasing).

According to the third embodiment, the throttle sensitivity Thg gradually converges to the standard value $THG_o$ as time elapses. However, the throttle sensitivity Thg can instantly converge to the standard value $THG_o$.

According to the fourth embodiment, when the absolute value of changing value as of accelerator stroke S and vehicle speed V are larger than arbitrary determined values respectively, it is determined to start learning. However, the learning processes can begin based upon conditions beside the above-described condition. For example, when the acceleration G is larger than the arbitrary determined value, it can be determined to begin the learning processes.

According to the fourth, fifth and sixth embodiments, when the count value Ti is initialized and the vehicle speed V and accelerator stroke S are larger than arbitrary determined values respectively, it can be determined that the learning processes are being carried out. For example, when a brake sensor for detecting the manipulation of the brake pedal is provided to the brake pedal, which is manipulated for controlling the vehicle 1, and when the brake sensor does not detect the manipulation of the brake pedal after the learning processes were carried out, it can be determined that learning processes are being carried out.

According to the fourth embodiment, when absolute values of changing values ΔS, ΔV and ΔGt are less than the arbitrary determined values respectively, it can be determined that the vehicle is in a constant speed driving condition. However, when any one of absolute values of changing magnitudes ΔS, ΔV and ΔGt is less than the arbitrary set value, it can be determined that the constant speed driving condition is being learned.

According to the fifth and sixth embodiments, when the absolute value of change value ΔS and vehicle speed V are larger than the arbitrary values respectively, it can be determined that the learning processes are underway. However, the determination for initiation of the learning processes can be determined, based upon when the acceleration g is larger than a predetermined value.

According to the fifth embodiment, a steering angle OS, larger than the predetermined value a, can last over the predetermined period of time β during that period when the vehicle 1 is determined to be turning. However, it can be determined immediately that the vehicle is turning.

According to fifth embodiment, the steered angle OS detected by means of the steering angle sensor is employed for detecting the turning condition of vehicle 1. However, the turning condition of vehicle 1 can be detected by means of Yaw rate sensor which is disposed in the vehicle 1. Furthermore, the turning condition of vehicle 1 can be detected based on the left and right directional accelerations detected by means of left and right acceleration sensors disposed in the vehicle. Furthermore, the steering angle OS detected by means of the steering angle sensor 8 and the Yaw rate detected by means of Yaw rate sensor can be combined to detect the turning condition. This combination can, with a high degree of accuracy, detect the vehicle's turning condition.

According to the sixth embodiment, a shift position SP, detected by means of the shift position sensor 15, is employed for detecting the reverse condition of the vehicle 1. However, as direction of forward or reverse rotation of front wheels can be detected by means of the vehicle speed sensor, the reverse driving condition of the vehicle can be determined based upon the detected rotational direction.

According to the sixth embodiment, the present invention is embodied in a vehicle having an automatic transmission. However, it can be embodied in a vehicle having a manual transmission. If this arrangement is employed, the shift position sensor detects the shift position of the manual transmission similar to the automatic transmission. When the shift position is in the reverse position, the throttle sensitivity preferable for reverse direction is employed. When the shift position is in the above first gear position, the learning processes of throttle sensitivity Thg will be carried out.

According to eighth embodiment, the push button type switch is employed as the reset switch 14. However, a lever or knob which is able to be connected or disconnected by rotating thereof, or various operative switches such as a toggle can be employed as the reset switch 14.

According to the eighth embodiment, when the engine 1 is to be activated or when the switch 14 is not manipulated, either one of the standard value THGst or the minimum value THGmin is set as the final throttle sensitivity Thga. The throttle sensitivity Thg computed in accordance with the throttle sensitivity model output Thx at that time can be directly set as the final throttle sensitivity Thga.

According to the ninth embodiment, the conditions for detecting the take-off and urging pedal acceleration respectively, the changing value ΔS should be set larger than the predetermined value. It can be altered in the following manner. The conditional can be satisfied when the changing value of acceleration G exceeds the predetermined value, or when the magnitude of urging force applied on the accelerator pedal exceeds the predetermined value in place of the accelerator stroke S in the above described condition (3). Furthermore, the above-described condition can be set to be satisfied when the changing value of urging force applied on the accelerator pedal exceeds the predetermined value.

According to the tenth embodiment, when the throttle sensitivity Thg approaches the standard value (i.e.,=1.0), the learned value δ can be computed by multiplying the acceleration deviation ΔG with the correction coefficient Kg. However, the learned value δ can be computed by adding the acceleration coefficient ΔG to the correction coefficient Kg.

Furthermore, according to the tenth embodiment, when the throttle sensitivity Thg departs from the standard value (i.e.,=1.0), the value δ is computed by dividing the acceleration deviation ΔG by the correction coefficient Kg. However, the learned value δ can be computed by subtracting the correction coefficient Kg from the acceleration deviation ΔG, or can be directly set the acceleration deviation ΔG as the learned value δ.

According to the tenth embodiment, the correction coefficient Kg is computed through the equation (16) based upon the throttle sensitivity Thg. However, the correction coefficient Kg can be computed through other equations or it can be set as a predetermined value.

According to the eleventh embodiment, given the conditions when the throttle sensitivity Thg is less than the standard value Thgstd, the accelerator stroke S is larger than the predetermined value S1, and the acceleration deviation ΔG is less than the first threshold value dg, then the first threshold value dg is set as the learned value δ. However, the learned value δ can be set to any value larger than the acceleration deviation ΔG.

Furthermore, according to the eleventh embodiment, under the conditions when the throttle sensitivity Thg is larger than the standard value Thgstd, the accelerator stroke S is less than the second predetermined value S2, and the accelerator deviation ΔG is larger (i.e., higher) than the second threshold value −dg, then the second threshold value −dg is set as the learned value δ. However, the throttle sensitivity Thg can be set to any negative value less than the acceleration deviation ΔG.

Furthermore, according to the eleventh embodiment, the acceleration deviation ΔG is directly set as the learned value δ. However, if the above-described condition is applied, the learned sensitivity value δ can be set to any value excluding the acceleration deviation ΔG.

According to the twelfth embodiment, when the throttle sensitivity Thg is larger than the upper limit value Thgmax and the acceleration deviation ΔG is larger than the predetermined value ϕ, or when the throttle sensitivity Thg is less than the lower limit value Thgmin and the acceleration deviation ΔG is less than the predetermined value ϕ, the learned value δ is set to the predetermined value δ (i.e,=0). However, the learned value δ can be set in the following manners. When the throttle sensitivity Thg is larger than the upper limit value Thgmax and the acceleration deviation ΔG is larger than the predetermined value ϕ the learned value δ can be set to the predetermined negative value and the throttle sensitivity Thg can be designed to gradually decrease. Given this condition, the throttle sensitivity Thg never exceeds the upper limit value Thgmax.

On the other hand, when the throttle sensitivity Thg is less than the lower limit value Thgmin and the acceleration deviation ΔG than the predetermined value ϕ, the learned value δ can be set to the predetermined positive value and the throttle sensitivity Thg can be designed to gradually increase. When such a case is employed, the throttle sensitivity Thg never goes below the lower limit value Thgmin.

According to the thirteenth embodiment, when the throttle sensitivity Thg is larger than the standard value Thgstd and the acceleration deviation ΔG is less than the predetermined value ϕ, the learning rate ε is set to "0.1". The learning rate ε is set to "0.2" in other conditions. However, the learning rate ε is not limited to any values described above. That is, the learning rate ε should, when under conditions where the throttle sensitivity Thg is larger than the standard value Thgstd and where the acceleration deviation ΔG the predetermined value ϕ, be less than under other conditions.

Therefore, the present examples and embodiments are to be considered as illustrative and not restrictive and the invention is not to be limited to the details given herein, but may be modified within the scope of the appended claims.

What is claimed is:

1. An apparatus for controlling the driving power of a motor vehicle having a power adjuster for regulating the power output from said motor vehicle according to control parameters set for said power adjuster, said vehicle further having an accelerator for manipulation by the vehicle's driver to regulate the power output from said motor at various vehicle speeds, the apparatus comprising:

means responsive to the manipulation of said accelerator for detecting the amount by which said accelerator is manipulated (S) and for outputting a signal representative of the detected accelerator manipulation amount;

means responsive to the vehicle speed for detecting the speed of the vehicle and for outputting a signal representative of the detected vehicle speed;

means responsive to the vehicle acceleration for detecting the acceleration of the vehicle (G) and for outputting a signal representative of the detected vehicle acceleration;

a first model learning means for constructing an acceleration model reflective of the driver's changing acceleration needs, and for determining the relationship among the manipulated amount of the accelerator, the vehicle speed, and the vehicle acceleration;

said first learning means including a first learning program for updating said acceleration model, and for generating a first output value (Gx) in response to the amount detected by said acceleration detecting means and said speed detecting means;

said first learning program being designed to calculate a deviation value ($\Delta G$) between said detected vehicle acceleration (G) and said first output (Gx), wherein said acceleration (G) is selected as teaching data, and where said first model learning means modifies said first output (Gx) to decrease said deviation ($\Delta G$) in order to provide an updated acceleration model;

second model learning means for constructing a sensitivity model used to regulate the power adjuster's control parameter, and for determining the relationship among the manipulated amount of the accelerator, the vehicle speed, and the control parameter;

said second model learning means including a second learning program for updating said sensitivity model, and for generating a second output (Thx) in response to the manipulated amount of the accelerator and the detected vehicle speed;

said second learning program being designed to modify said second output (Thx) in order to decrease said deviation ($\Delta G$) calculated by said first model learning means; and drive control means for controlling said power adjuster and vehicle driving power, said drive control means adjusting the control parameter by referring to a target control parameter determined on the basis of said second output (Thx) transmitted from said second model learning means.

2. The apparatus according to claim 1, wherein each of said first and second learning programs incorporates neural network computing means, and incorporates at least one weighting coefficient as variable data for use in its program; and wherein each of said first and second model learning means corrects the weighting coefficient data to decrease calculated deviation ($\Delta G$).

3. The apparatus according to claim 2, wherein each of said first and second learning programs incorporates an error feedback learning algorithm.

4. The apparatus according to claim 2, wherein a neuro network computing means having a central processing unit, a read only memory, and a random access memory is used to process said first and second learning means.

5. The apparatus according to claim 1, wherein said first model learning means stores a first data map correlating the detected accelerator manipulation amount (S), vehicle speed (V) and the first output (Gx) for an entire range of detected accelerator manipulation amounts (S) and vehicle speeds (V), and updates the entire first output (Gx), according to a plurality of predetermined calculation formulas; and wherein said second model learning means stores a second data map correlating the manipulation amount (S), the vehicle speed (V) and the second output (Thx), for an entire range of detected accelerator manipulation amounts (S) and vehicle speeds (V), and updates the entire second output (Thx), according to plurality of predetermined calculation formulas.

6. The apparatus according to claim 5, wherein a neuro network computing means having a central processing unit, a read only memory, and a random access memory is used to process said first and second learning means.

7. The apparatus according to claim 1, wherein said power adjuster is a pivotable throttle valve disposed in an air intake passage connected to the engine, and wherein said control parameter is an opening angle of said throttle valve.

8. The apparatus according to claim 1, wherein said accelerator comprises a accelerator pedal, and wherein the manipulated amount of the accelerator is a changing stroke of said accelerator pedal.

9. The apparatus according to claim 1 further comprising a low pass filter connecting said acceleration detecting means to said first model learning means, for attenuating high frequency signal components in the detection signal provided from said acceleration detecting means, each of said high frequency signal components having a higher frequency than a predetermined frequency.

10. The apparatus according to claim 1, wherein said target control parameter is obtained by multiplying the manipulated amount of said accelerator by said second output (Thx) generated by said second model learning means; and wherein said drive control means executes a control routine using feedback from said power adjuster so that said control parameter approaches a target control parameter.

11. The apparatus according to claim 1 further comprising:

means for detecting a cessation in said vehicle's acceleration, for determining whether a predetermined acceleration cessation condition is satisfied and for generating a signal representative thereof indicative that the vehicle acceleration has ceased and that the vehicle is traveling at a constant speed; and first data alteration means for selecting data to be employed by said drive control means for determining the target control parameter, wherein when said first data alteration means receives the signal from said acceleration cessation detection means, said first data alteration means provides a predetermined reference value ($THG_0$).

12. The apparatus according to claim 11, wherein said predetermined reference value ($THG_0$) is an arithmetical average between a value (THG$_{max}$) corresponding to a maximum target control parameter and a value (THG$_{min}$) corresponding to a minimum target control parameter.

13. The apparatus according to claim 11, wherein a neuro network computing means having a central processing unit, a read only memory, and a random access memory is used to process said first and second learning means, said acceleration cessation detection means, and said first data alteration means.

14. The apparatus according to claim 11 further comprising: an initial drive movement detection means for determining whether a predetermined initial drive movement condition is satisfied, said drive movement condition being indicative of when the vehicle speed is greater than a predetermined value, wherein said drive movement detection means outputs a signal when said vehicle satisfies said initial drive movement condition;

said first and second model learning means continuously updating said acceleration model and sensitivity model from when they receive said initial drive movement signal until they receive the signal from said acceleration cessation detection means.

15. The apparatus according to claim 11, wherein said first data alteration means changes the data to be employed by said drive control means so that the value of said data approaches said reference value (THG$_0$) by using a correction data ($\Delta$Thg) as a function of the number of times in changes of said second output (Thx).

16. The apparatus according to claim 1 further comprising:

second data alteration means for selecting data to be employed by said drive control means so as to decide the target control parameter; and said second data alteration means for determining whether the vehicle is in a constant speed cruising state according to when predetermined referential data is provided to said control means by said second data alteration means.

17. The apparatus according to claim 16, wherein a neuro network computing means having a central processing unit, a read only memory, and a random access memory is used to process said first and second learning means and said second data alteration means.

18. The apparatus according to claim 1 further comprising:

turn detection means for detecting the turning movement of the vehicle, and for outputting a signal indicative of the turning movement;

third data alteration means for selecting data to be employed by said drive control means for determining the target control parameter and for determining the occasion of a vehicle's turning movement, based on the signal from said turn detection means; and said third data alteration means providing a predetermined referential data for the vehicle's turning movement.

19. The apparatus according to claim 18, wherein said turn detection means includes a sensor for detecting the angle with which said vehicle's steering wheel is turned.

20. The apparatus according to claim 18, wherein a neuro network computing means having a central processing unit, a read only memory, and a random access memory is used to process said first and second learning means and said third data alteration means.

21. The apparatus according to claim 1 further comprising:

reverse detection means for detecting the reverse movement of the vehicle, said reverse detection means outputting a signal when said vehicle is moving in a reverse direction;

a fourth data alteration means for selecting data to be employed by said drive control means for determining the target control parameter, said fourth data alteration means determining the occurrence of the vehicle's reverse movement based on the signal from said reverse detection means; and said fourth data alteration means providing a predetermined referential data for the vehicle's reverse movement.

22. The apparatus according to claim 21, wherein said vehicle is provided with a transmission; and wherein said reverse detection means includes a drive range selector.

23. The apparatus according to claim 21, wherein a neuro network computing means having a central processing unit, a read only memory, and a random access memory is used to process said first and second learning means and said fourth data alteration means.

24. The apparatus according to claim 21, wherein said vehicle includes at least one drive wheel, a motor, and a transmission;

said apparatus further including a neutral detection means for detecting when said transmission is in a neutral drive range, said neutral detection means outputting a signal when said transmission is in a neutral drive range; and wherein said second model learning means stops updating said sensitivity model when said second model learning means receives signals provided by both said reverse and neutral detection means.

25. The apparatus according to claim 24, wherein said transmission of the vehicle is a automatic transmission; and wherein said neutral detection means is responsive to a drive range selector, said selector for switchable selecting one of a plurality of shift positions, said positions comprising a neutral and parking range.

26. The apparatus according to claim 24 further comprising:

fifth data alteration means for selecting data to be employed by said drive control means for determining the target control parameter, wherein when said fifth data alteration means provides data to said drive control means when said vehicle is in a neutral drive state.

27. The apparatus according to claim 26, wherein said fifth data alteration means calculates at least one of the change in acceleration ($\Delta$Gt) and the change in vehicle speed ($\Delta$V) at a predetermined period of time; and wherein said fifth data alteration means set said referential data for the neutral condition to a constant value, when said change in acceleration and speed is larger than a predetermined standard value.

28. The apparatus according to claim 1 further comprising:

a drive start detection means for determining whether a predetermined drive start condition is satisfied which suggests that the drive of the little moving vehicle has been substantially started, and for generating a signal indicative of satisfying the drive start condition;

an acceleration end detection means for determining whether a predetermined acceleration end condition is satisfied which suggests that the acceleration of the vehicle has been just completed in order for the vehicle to be transferred to a constant cruising speed, and for generating a signal indicative of satisfying the acceleration end condition; and a time measuring means for measuring period of time from when said acceleration end detection means initially receives said drive start detection signal to the time when said time measuring means receives the signal from said acceleration end detection means, wherein when said measured period of time is shorter than a predetermined period of time and when said second output (Thx) on receiving the signal from said acceleration end detection means is smaller than a predetermined value, said second model learning means provides a previous second output (Thx) which is updated upon receiving the signal from said acceleration end detection means in the preceding control cycle.

29. The apparatus according to claim 28, wherein a neuro network computing means having a central processing unit, a read only memory, and a random access memory is used to process said first and second model learning means and said time measuring means.

30. The apparatus according to claim 1 further comprising:

driver instruction means to be manipulated by a vehicle's driver for intentionally selecting the referential data to be employed by said drive control means, wherein said instruction means outputs a signal indicative of the driver's instruction; and sixth data alteration means for selecting the referential data used by the drive control means to decide a target control parameter, wherein when said sixth data alteration means receives said instruction signal from said instruction means, the sixth data alteration means sets referential data to an instructed data by the driver in accordance with the instruction signal.

31. The apparatus according to claim 30, wherein said sixth data alteration means further compares a predetermined threshold value (THGa) with the referential data to be employed by said drive control means; and wherein said sixth data alteration means further sets the referential data to a first value (THGmin) smaller than said threshold value (THGa) when the compared referential data is smaller than said threshold value (THGa), and sets the referential data to a second value (THGst), which is greater than said threshold value (THGa), when the compared referential data is equal to or greater than said threshold value (THGa).

32. The apparatus according to claim 30, wherein said driver instruction means includes a reset switch.

33. The apparatus according to claim 30, wherein a neuro network computing means having a central processing unit, a read only memory, and a random access memory is used to process said first and second model learning and said sixth data alteration means.

34. The apparatus according to claim 1 further comprising:

acceleration beginning detection means for determining the occasion of the vehicle's initial acceleration, said acceleration beginning detection means outputting a signal when the vehicle begins to accelerate; and means for detecting a cessation in said vehicle's acceleration, for determining whether a predetermined acceleration cessation condition is satisfied and for generating a signal representative thereof indicative that the vehicle acceleration has ceased and that the vehicle is traveling at a constant speed and wherein said first model learning means continuously functions from a time when it receives said signal from said acceleration beginning detection means to a time when said first model learning means receives the signal from said acceleration cessation detecting means.

35. The apparatus according to claim 34, wherein a neuro network computing means having a central processing unit, a read only memory, and a random access memory is used to process said first and second model learning means.

36. The apparatus according to claim 1, wherein said second model learning means calculates a learning value ($\delta$) based on said deviation ($\Delta G$) calculated by said first model learning means and supplied to said second model learning means by said first model learning means, and wherein said second model learning means corrects said second output (Thx) to decrease said learning value ($\delta$) for updating said sensitivity model.

37. The apparatus according to claim 36 further comprising:

first comparison means for comparing a predetermined standard value (Thgstd) with a sensitivity value (Thg) determined from said second output (Thx) of said second model learning means, said first comparison means outputting a signal indicative of the result of the comparison; and a first setting means for setting the learning value ($\delta$) used by said second model learning means, said first setting means having as input the signal from said first comparison means for determining whether, over time, the value of said sensitivity value (Thg) approaches said standard value (Thgstd), wherein said first setting means sets the learning value, when the sensitivity value (Thg) approaches to said standard value (Thgstd), to a value greater than said deviation ($\Delta G$) as calculated by said first model learning means.

38. The apparatus according to claim 37, wherein said first setting means executes the setting of said learning value ($\delta$), based on a correction coefficient (Kg) as a function of a deviation between the sensitivity value (Thg) and standard value (Thgstd).

39. The apparatus according to claim 38, wherein said correction coefficient (Kg) is calculated according to the following formula: Kg=1.0+|Thgstd−Thg|*k2 wherein "Thgstd" is a standard value, "Thg" is a sensitivity value, and "k2" is a positive constant value, whereby said correction coefficient is always set to at least 1.0.

40. The apparatus according to claim 39, wherein said first setting means sets the learning value ($\delta$) to a value which is obtained:

by dividing said deviation ($\Delta G$) by said coefficient (Kg), in the case where Thgstd$\geq$Thg and $\Delta G \geq \phi$;

by dividing said deviation ($\Delta G$) by said coefficient (Kg), in the case where Thgstd<Thg and $\Delta G < \phi$;

by multiplying said deviation ($\Delta G$) by said coefficient (Kg), in the case where Thgstd$\geq$Thg and $\Delta G < \phi$; and by multiplying said deviation ($\Delta G$) by said coefficient (Kg), in the case where Thgstd<Thg and $\Delta G \geq \phi$, wherein said "$\phi$" is a constant value, and whereby the learning value is set to a value greater than said deviation ($\Delta G$) as calculated by said first model learning means.

41. The apparatus according to claim 37, wherein a neuro network computing means having a central processing unit, a read only memory, and a random access memory is used to process said first and second model learning means.

42. The apparatus according to claim 36 further comprising:

second comparison means for comparing a predetermined standard value (Thgstd) with a sensitivity value (Thg) based on said second output (Thx) from said second model learning means, said second comparison means further outputting a signal indicative of the result of the comparison;

third comparison means for comparing the detected accelerator manipulation amount (S) from said accelerator manipulation detecting means with a predetermined first amount (S1) and a predetermined second amount (s2), said second amount (S2) being smaller than said first amount (S1), and for outputting a signal indicative of the result of the comparison;

fourth comparison means for comparing said deviation ($\Delta G$) with a predetermined third amount (dg) and a predetermined fourth amount (−dg), said fourth amount (−dg) being smaller than said third amount (dg), and for outputting a signal indicative of the result of the comparison; and second setting means for setting the learning value ($\delta$) to be employed by said second model learning means, based on information transmitted thereto from said second, third, and fourth comparison means, wherein said second setting means sets the learning value to a positive value greater than said deviation ($\Delta G$) under conditions when the sensitivity value (Thg) is smaller than the standard value (Thgstd), when said detected manipulation amount (S) is larger than said first amount (S1) and when said deviation ($\Delta G$) is smaller than said third amount (dg), and wherein said second setting means sets the learning value to a negative value smaller than said deviation ($\Delta G$) under conditions when the sensitivity value (Thg) is larger than the standard value (Thgstd), when said detected manipulation amount (s) is smaller than said second amount (S2), and when said deviation ($\Delta G$) is larger than said fourth amount (−dg).

43. The apparatus according to claim 42, wherein said positive value is equal to said third amount (dg), and wherein said negative value is equal to said fourth amount (−dg).

44. The apparatus according to claim 42, wherein a neuro network computing means having a central processing unit, a read only memory, and a random access memory is used to process said first and second model learning means, said second, third and fourth comparison means and said second setting means.

45. The apparatus according to claim 36 further comprising:

memory means for storing a maximum value (Thgmax) and minimum value (Thgmin) of the sensitivity values (Thg) based on said second output (Thx) from said second model learning means;

fifth comparison means for comparing the sensitivity value (Thg) with said maximum value (Thgmax) and minimum value (Thgmin), and for outputting a signal indicative of the result of the comparison;

sixth comparison means for comparing the deviation ($\Delta G$) with a predetermined value ($\phi 1$), and for outputting a signal indicative of the result of the comparison; and third setting means for setting the learning value ($\delta$) to be employed by said second model learning means, based on data provided thereto from said fifth and sixth comparison means, wherein said third setting means sets the learning value to a first constant value for preventing said sensitivity value from increasing over the present sensitivity value, when said sensitivity value (Thg) is at least said maximum value (Thgmax) and when said deviation ($\Delta G$) is larger than said predetermined value ($\phi 1$), and wherein said third setting means sets the learning value to a second constant value for preventing said sensitivity value from decreasing below the present sensitivity value, when said sensitivity value (Thg) is at most said minimum value (Thgmin) and when said deviation ($\Delta G$) is smaller than said predetermined value ($\phi 1$).

46. The apparatus according to claim 45, wherein said first constant value is equal to said second constant value.

47. The apparatus according to claim 46, wherein said predetermined value ($\phi 1$) is equal to said first and second constant values.

48. The apparatus according to claim 47, wherein said predetermined value ($\phi 1$) and said first and second constant values are equal to zero.

49. The apparatus according to claim 45, wherein a neuro network computing means having a central processing unit, a read only memory, and a random access memory is used to process said first and second model learning means, said memory means, said fifth and sixth comparison means and said third setting means.

50. The apparatus according to claim 1 further comprising:

said second learning program incorporating neural network technology, and incorporating a learning rate ($\epsilon$) as variable data for use in its program, whereby said second model learning means updates the sensitivity model thereof in accordance with the learning rate ($\epsilon$);

seventh comparison means for comparing the deviation ($\Delta G$) with a predetermined first value ($\phi 1$), and for generating a signal indicative of the result of the comparison;

eighth comparison means for comparing the second output (Thx) updated by said second model learning means with a predetermined standard value (Thgstd), and for generating a signal indicative of the result of the comparison; and means for altering the setting of the learning rate ($\epsilon$), wherein when the deviation ($\Delta G$) is smaller than said first value ($\phi 1$) and when the second output (Thx) is larger than said standard value (Thgstd), said rate alteration means sets the learning rate to an another rate different from an initial rate which is initially set in said second learning program.

51. The apparatus according to claim 50, wherein said another rate is smaller than said initial rate.

52. The apparatus according to claim 50, wherein a neuro network computing means having a central processing unit, a read only memory, and a random access memory is used to process said first and second model learning means, said seventh and eighth comparison means and said rate alteration means.

* * * * *

UNITED STATES PATENT AND TRADEMARK OFFICE
CERTIFICATE OF CORRECTION

PATENT NO. : 5,532,929
DATED : July 2, 1996
INVENTOR(S) : Tatsuya Hattori et al.

It is certified that error appears in the above-indentified patent and that said Letters Patent is hereby corrected as shown below:

Column 52, line 66, change "a" (1st occurrence) to --$\alpha$--.

Column 67, line 5, after "measuring" (second occurrence) insert --a--.

Signed and Sealed this

Eighth Day of July, 1997

Attest:

BRUCE LEHMAN

*Attesting Officer*  *Commissioner of Patents and Trademarks*